US012659991B2

(12) United States Patent
Ghanbarinejad et al.

(10) Patent No.: US 12,659,991 B2
(45) Date of Patent: Jun. 16, 2026

(54) UNLICENSED SPECTRUM ACCESS IN INTEGRATED ACCESS AND BACKHAUL

(71) Applicant: Lenovo (Singapore) Pte. Ltd., New Tech Park (SG)

(72) Inventors: Majid Ghanbarinejad, Chicago, IL (US); Vijay Nangia, Woodridge, IL (US); Hyejung Jung, Northbrook, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 65 days.

(21) Appl. No.: 18/699,521

(22) PCT Filed: Oct. 10, 2022

(86) PCT No.: PCT/IB2022/059702
§ 371 (c)(1),
(2) Date: Apr. 8, 2024

(87) PCT Pub. No.: WO2023/058007
PCT Pub. Date: Apr. 13, 2023

(65) Prior Publication Data
US 2024/0405836 A1 Dec. 5, 2024

Related U.S. Application Data

(60) Provisional application No. 63/254,016, filed on Oct. 8, 2021.

(51) Int. Cl.
H04L 1/02 (2006.01)
H04B 7/06 (2006.01)
(Continued)

(52) U.S. Cl.
CPC ...... H04W 74/0808 (2013.01); H04B 7/0697 (2013.01); H04B 7/15528 (2013.01); H04W 84/047 (2013.01)

(58) Field of Classification Search
CPC ....... H04L 1/0618; H04L 1/06; H04L 1/0071; H04B 7/0417; H04B 7/024;
(Continued)

(56) References Cited

U.S. PATENT DOCUMENTS 12,225,614 B2 * 2/2025 Koskinen .............. H04W 76/19
2021/0266962 A1 8/2021 Chendamarai et al.
(Continued)

FOREIGN PATENT DOCUMENTS

WO 2020209340 A1 10/2020

OTHER PUBLICATIONS

PCT/IB2022/059702, "Notification of Transmittal of the International Search Report and the Written Opinion of the International Searching Authority, or the Declaration", International Searching Authority, Jan. 3, 2023, pp. 1-16.
(Continued)

*Primary Examiner* — Khai Tran
(74) *Attorney, Agent, or Firm* — Kunzler Needham Hilton

(57) ABSTRACT

Apparatuses, methods, and systems are disclosed for unlicensed spectrum access in integrated access and backhaul. An apparatus (800) includes a processor (805) and a memory (810) coupled to the processor (805). The processor (805) is configured to sense a shared medium by using a first entity of the apparatus (800). The processor (805) is configured to transmit, using the first entity of the apparatus (800), a first plurality of signals for a first duration and over the shared medium in response to the sensed shared medium being in an idle state. The processor (805) is configured to transmit, based at least in part on a second entity of the apparatus (800) being allowed to use the shared medium without sensing the shared medium, a second plurality of signals for a second duration and over the shared medium using the second entity of the apparatus (800).

20 Claims, 12 Drawing Sheets

(51) Int. Cl.
    *H04B 7/155*          (2006.01)
    *H04W 74/0808*     (2024.01)
    *H04W 84/04*       (2009.01)
(58) Field of Classification Search
    CPC ......... H04W 74/0808; H04W 72/1268; H04W
                                92/18; H04W 72/54
    USPC ................................. 375/267, 260, 262, 299
    See application file for complete search history.

(56)               References Cited

U.S. PATENT DOCUMENTS

| 2022/0022252 A1* | 1/2022 | Lee | ....................... H04W 24/08 |
| 2022/0210828 A1 | 6/2022 | Murayama et al. | |
| 2023/0060998 A1* | 3/2023 | Saha | ................. H04W 74/0833 |
| 2024/0008077 A1* | 1/2024 | Han | ................. H04W 74/0816 |

OTHER PUBLICATIONS

"RAN 1 Chairman's Notes", 3GPP TSG RAN WG1 Meeting #102-e, Aug. 17-28, 2020, pp. 1-204.
S. Mohebi et al., "The challenges of Scheduling and Resource Allocation in IEEE 802.11ad/ay", IEEE MedComNet 2020, Jun. 2020, pp. 1-4.
Itri, "Discussion on multi-beam operation", 3GPP TSG RAN WG1#106bis-e R1-2110243, Oct. 11-19, 2021, pp. 1-7.
Qualcomm, "Rel-18 IAB—New use cases to enhance RAN topology", 3GPP TSG RAN Rel-18 workshop RWS-210020, Jun. 28-Jul. 2, 2021, pp. 1-8.
3GPP, "3rd Generation Partnership Project; Technical Specification Group Radio Access Network; Study on requirements for NR beyond 52.6 GHZ (Release 16)", 3GPP TR 38.807 V16.1.0, Mar. 2021, pp. 1-68.
3GPP, "3rd Generation Partnership Project; Technical Specification Group Radio Access Network; NR; Study on Integrated Access and Backhaul; (Release 16)", 3GPP TR 38.874 V16.0.0, Dec. 2018, pp. 1-111.
3GPP, "3rd Generation Partnership Project; Technical Specification Group Radio Access Network; Study on NR-based access to unlicensed spectrum (Release 16)", 3GPP TR 38.889 V16.0.0, Dec. 2018, pp. 1-119.
3GPP, "3rd Generation Partnership Project; Technical Specification Group Radio Access Network; Service requirements for the 5G system; Stage 1 (Release 18)", 3GPP TS 22.261 V18.3.0, Jun. 2021, pp. 1-91.

3GPP, "3rd Generation Partnership Project; Technical Specification Group Radio Access Network; Physical layer procedures for shared spectrum channel access (Release 16)", 3GPP TS 37.213 V16.6.0, Jun. 2021, pp. 1-27.
3GPP, "3rd Generation Partnership Project; Technical Specification Group Radio Access Network; NR; Integrated access and backhaul radio transmission and reception (Release 16)", 3GPP TS 38.174 V16.3.0, Jun. 2021, pp. 1-304.
3GPP, "3rd Generation Partnership Project; Technical Specification Group Radio Access Network; NR; Physical channels and modulation (Release 16)", 3GPP TS 38.211 V16.7.0, Sep. 2021, pp. 1-134.
3GPP, "3rd Generation Partnership Project; Technical Specification Group Radio Access Network; NR; Multiplexing and channel coding (Release 16)", 3GPP TS 38.212 V16.6.0, Jun. 2021, pp. 1-153.
3GPP, "3rd Generation Partnership Project; Technical Specification Group Radio Access Network; NR; Physical layer procedures for control (Release 16)", 3GPP TS 38.213 V16.7.0, Sep. 2021, pp. 1-188.
3GPP, "3rd Generation Partnership Project; Technical Specification Group Radio Access Network; NR; Physical layer procedures for data (Release 16)", 3GPP TS 38.214 V16.6.0, Jun. 2021, pp. 1-172.
3GPP, "3rd Generation Partnership Project; Technical Specification Group Radio Access Network; NR; Physical layer measurements (Release 16)", 3GPP TS 38.215 V16.4.0, Dec. 2020, pp. 1-25.
3GPP, "3rd Generation Partnership Project; Technical Specification Group Radio Access Network; NR; Medium Access Control (MAC) protocol specification (Release 16)", 3GPP TS 38.321 V16.5.0, Jun. 2021, pp. 1-157.
3GPP, "3rd Generation Partnership Project; Technical Specification Group Radio Access Network; NR; Radio Resource Control (RRC) protocol specification (Release 16)", 3GPP TS 38.331 V16.5.0, Jun. 2021, pp. 1-959.
3GPP, "3rd Generation Partnership Project; Technical Specification Group Radio Access Network; NG-RAN; Xn general aspects and principles (Release 16)", 3GPP TS 38.420 V16.0.0, Jul. 2020, pp. 1-16.
3GPP, "3rd Generation Partnership Project; Technical Specification Group Radio Access Network; NG-RAN; Xn application protocol (XnAP) (Release 16)", 3GPP TS 38.423 V16.6.0, Jul. 2021, pp. 1-464.
3GPP, "3rd Generation Partnership Project; Technical Specification Group Radio Access Network; Ng-Ran; F1 general aspects and principles (Release 16)", 3GPP TS 38.470 V16.5.0, Jul. 2021, pp. 1-17.
3GPP, "3rd Generation Partnership Project; Technical Specification Group Radio Access Network; NG-RAN; F1 application protocol (F1AP) (Release 16)", 3GPP TS 38.473 V16.6.0, Jul. 2021, pp. 1-463.

* cited by examiner

100

Operator Aggregation Site
gNB-CU
Regional Core
Regional Computing

Local Aggregation Site
Intra-RAN Local Breakout
Edge Computing gNB-DU gNB-DU IAB-Node

TRP

FR2/4

FR2/4

FR2/4

FR2/4

FR1

900

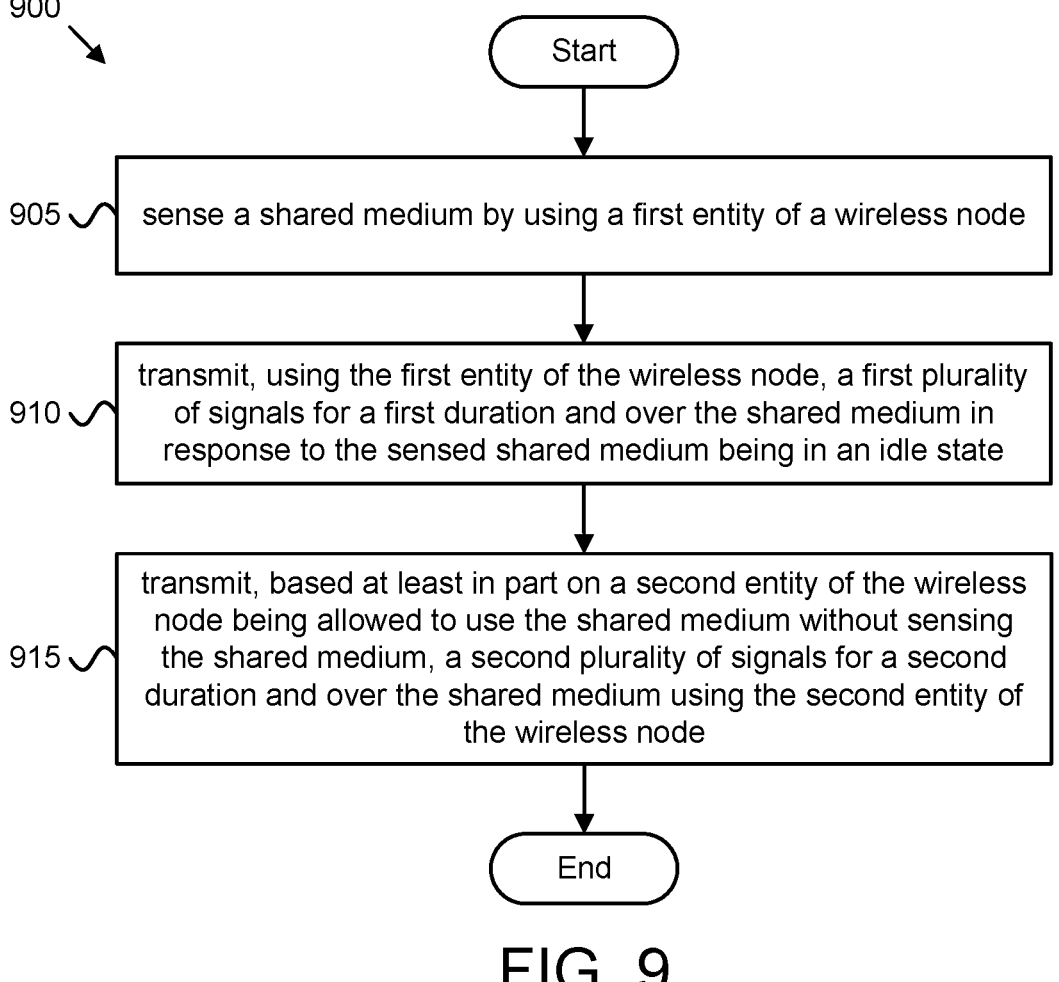

Start 905    sense a shared medium by using a first entity of a wireless node 910    transmit, using the first entity of the wireless node, a first plurality of signals for a first duration and over the shared medium in response to the sensed shared medium being in an idle state 915    transmit, based at least in part on a second entity of the wireless node being allowed to use the shared medium without sensing the shared medium, a second plurality of signals for a second duration and over the shared medium using the second entity of the wireless node End

FIG. 9

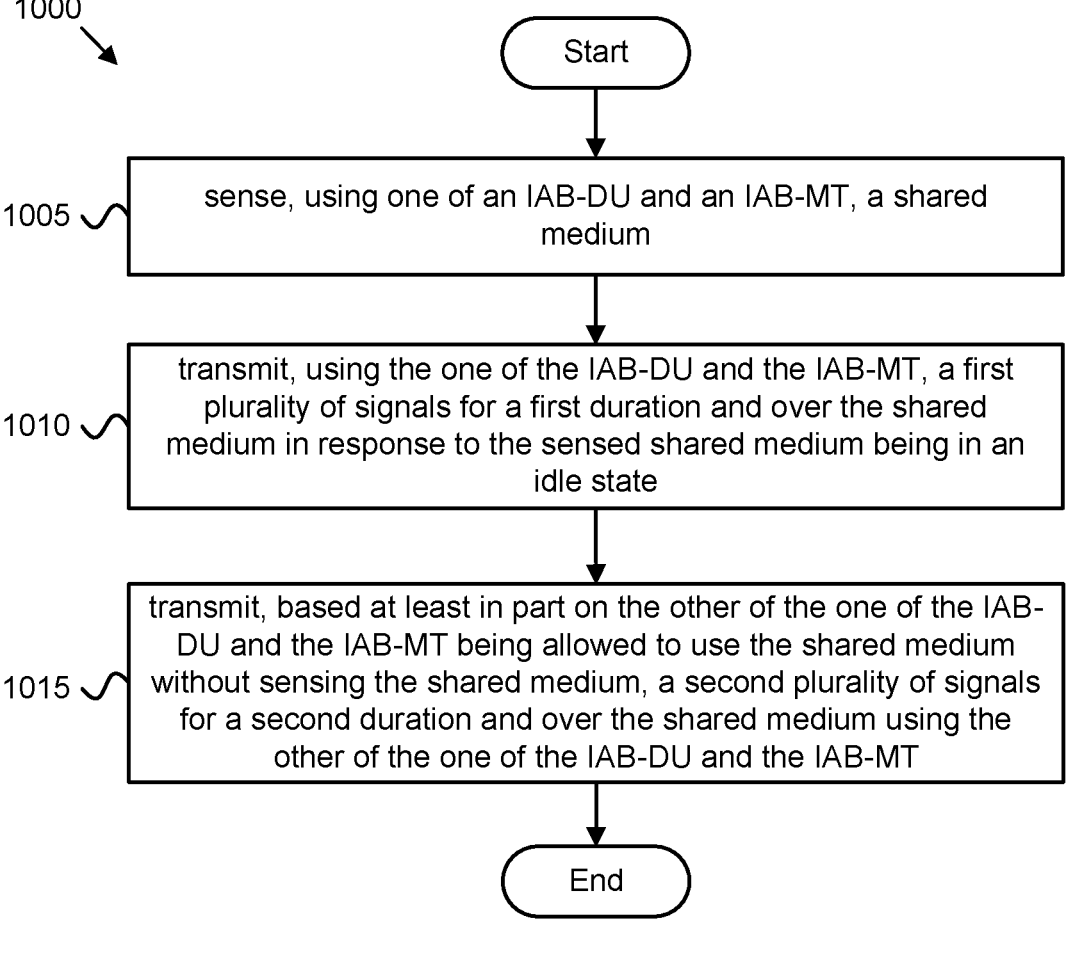

1000

Start

1005 — sense, using one of an IAB-DU and an IAB-MT, a shared medium

1010 — transmit, using the one of the IAB-DU and the IAB-MT, a first plurality of signals for a first duration and over the shared medium in response to the sensed shared medium being in an idle state 1015 — transmit, based at least in part on the other of the one of the IAB-DU and the IAB-MT being allowed to use the shared medium without sensing the shared medium, a second plurality of signals for a second duration and over the shared medium using the other of the one of the IAB-DU and the IAB-MT End

FIG. 10

UNLICENSED SPECTRUM ACCESS IN INTEGRATED ACCESS AND BACKHAUL

CROSS-REFERENCE TO RELATED APPLICATIONS

This application claims priority to U.S. Provisional Patent Application No. 63/254,016 entitled "APPARATUSES, METHODS, AND SYSTEMS FOR UNLICENSED SPECTRUM ACCESS IN INTEGRATED ACCESS AND BACKHAUL" and filed on Oct. 8, 2021, for Majid Ghanbarinejad, et al., which is incorporated herein by reference.

FIELD

The subject matter disclosed herein relates generally to wireless communications and more particularly relates to unlicensed spectrum access in integrated access and backhaul ("IAB").

BACKGROUND

In wireless networks, IAB may be utilized to increase deployment flexibility and reduce wireless network (e.g., 5G) rollout costs. It allows service providers to reduce cell planning and spectrum planning efforts while utilizing the wireless backhaul technology.

BRIEF SUMMARY

Disclosed are solutions for unlicensed spectrum access in integrated access and backhaul. The solutions may be implemented by apparatus, systems, methods, or computer program products.

In one embodiment, a first apparatus includes a processor and a memory coupled to the processor. In one embodiment, the processor is configured to cause the apparatus to sense a shared medium by using a first entity of the apparatus. In one embodiment, the processor is configured to cause the apparatus to transmit, using the first entity of the apparatus, a first plurality of signals for a first duration and over the shared medium in response to the sensed shared medium being in an idle state. In one embodiment, the processor is configured to cause the apparatus to transmit, based at least in part on a second entity of the apparatus being allowed to use the shared medium without sensing the shared medium, a second plurality of signals for a second duration and over the shared medium using the second entity of the apparatus.

In one embodiment, a first method senses a shared medium by using a first entity of a wireless node. In one embodiment, the first method transmits, using the first entity of the wireless node, a first plurality of signals for a first duration and over the shared medium in response to the sensed shared medium being in an idle state. In one embodiment, the first method transmits, based at least in part on a second entity of the wireless node being allowed to use the shared medium without sensing the shared medium, a second plurality of signals for a second duration and over the shared medium using the second entity of the wireless node.

In one embodiment, a second apparatus includes a processor and a memory coupled to the processor. In one embodiment, the processor is configured to cause the wireless network node to sense, using one of an IAB-DU and an IAB-MT, a shared medium. In one embodiment, the processor is configured to transmit, using the one of the IAB-DU and the IAB-MT, a first plurality of signals for a first duration and over the shared medium in response to the sensed shared medium being in an idle state. In one embodiment, the processor is configured to transmit, based at least in part on the other of the one of the IAB-DU and the IAB-MT being allowed to use the shared medium without sensing the shared medium, a second plurality of signals for a second duration and over the shared medium using the other of the one of the IAB-DU and the IAB-MT.

In one embodiment, a second method senses, using one of an IAB-DU and an IAB-MT, a shared medium. In one embodiment, the second method transmits, using the one of the IAB-DU and the IAB-MT, a first plurality of signals for a first duration and over the shared medium in response to the sensed shared medium being in an idle state. In one embodiment, the second method transmits, based at least in part on the other of the one of the IAB-DU and the IAB-MT being allowed to use the shared medium without sensing the shared medium, a second plurality of signals for a second duration and over the shared medium using the other of the one of the IAB-DU and the IAB-MT.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 9 is a flowchart diagram illustrating one embodiment of a method for unlicensed spectrum access in integrated access and backhaul; and FIG. 10 is a flowchart diagram illustrating one embodiment of a method for unlicensed spectrum access in integrated access and backhaul.

DETAILED DESCRIPTION

Figure 1:
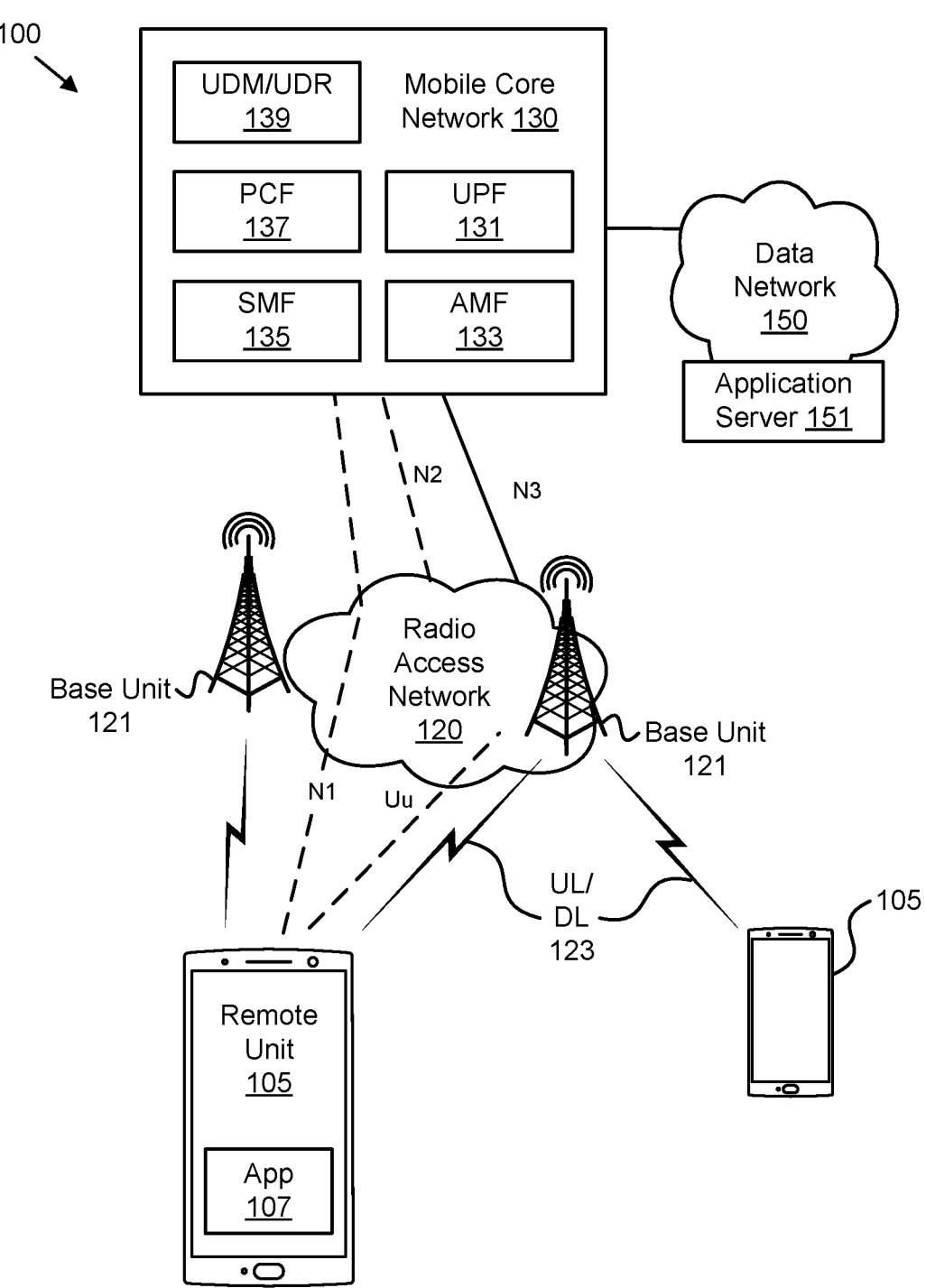
FIG. 1 is a schematic block diagram illustrating one embodiment of a wireless communication system for unlicensed spectrum access in integrated access and backhaul.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized.

The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/ acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for unlicensed spectrum access in integrated access and backhaul. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

In one embodiment, an IAB node may comprise functionalities such as an IAB-distributed unit ("DU") and an IAB-mobile terminal ("MT"). This functionality split may or may not be realized by a hardware split, e.g., the IAB-DU and the IAB-MT may or may not share hardware such as antennas and radio frequency ("RE") chains. In the case that an IAB-DU and an IAB-MT are collocated, they may cooperate in tasks such as interference management and channel access in unlicensed spectrum.

The abundant free spectrum at the frequency range 52.6-71 GHz makes it an appealing candidate for wireless backhaul, which includes IAB systems specified in 3GPP Rel-16/17. Indeed, the technical report TR 38.807, which is incorporated herein by reference, mentions IAB as a use case for channel access in FR2/4:

The use case mainly is applied for backhauling deployment when optical or dedicated wireless backhaul is unavailable or inconvenient. Such backhauling can take advantage from the currently developed NR IAB, where some nodes serve both backhaul and access. In this use case, devices operate with line of sight ("LOS") under most conditions, though obstruction of the LOS may occur occasionally, so directional transmission can extend the distance between the gNBs.

There are already lots of commercial deployments of backhaul applications using the bands above 52.6 GHz. Compared with the lower frequency bands, the abundance of available spectrum can support higher capacity for both wireless access link and backhaul link. Low latency requirement can also be satisfied by NR flexible frame structure.

Where a wired connection is not a feasible option, various wireless technologies e.g. point to point ("PTP") microwave links are used to offer backhaul/relay service. 3GPP Rel-16 offers backhaul/relay service under the IAB umbrella. However, this service is presently limited to carrier frequency below 52.6 GHz. NR operating in carrier frequency above 52.6 GHz NR should extend such capabilities to this higher frequency range. Here, the expectation is for a single node (e.g. gNB) to offer broadband services to a few devices (e.g. UE) or to offer relay services (up to certain hops) to a few devices (e.g. other nodes) or a combination thereof. The expected coverage range is approximately 300m to 500m.

Figure 2A:
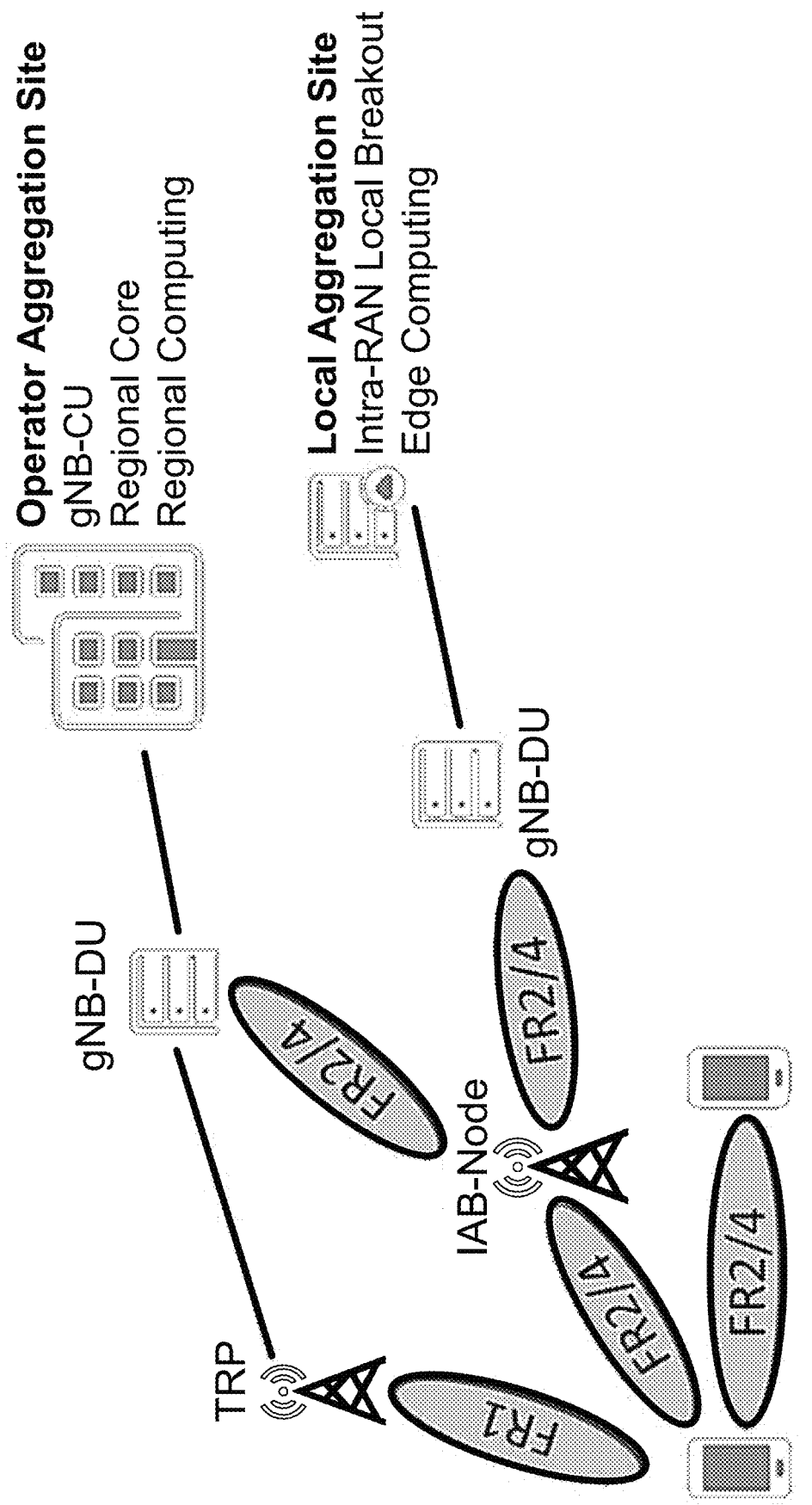
FIG. 2A depicts an example of an integrated access and backhaul system.

A distributed architecture including the flexible deployment of access points using IAB can be used to support both intra-RAN local breakout/edge computing services on a private network and mobile broadband ("MBB")/voice services on a public network with a common control plane/management framework. This architecture can apply to multiple use cases, especially for the ease of deploying cost-effective enterprise and industrial Private Networks. An illustration is shown in FIG. 2A, where FR1 refers to wireless link using carrier frequencies below 7 GHz and "FR2/4" terminology in the figure refers to wireless link using carrier frequency above 7 GHz.

Abundance of millimeter wave spectrum along with the native deployment of massive multiple input multiple output ("MIMO") or multi-narrow-beam systems in NR creates an opportunity to develop and deploy IAB links. The benefits of IAB are crucial during network rollout and MBB network growth. SA1 has already established service requirements for wireless self-backhauling (TS 22.261, Service requirement for the 5G System, Section 6.12.2, incorporated herein by reference).

These requirements are:

The 5G network shall enable operators to support wireless self-backhaul using NR and Evolved Universal Terrestrial Radio Access ("E-UTRA").

The 5G network shall support flexible and efficient wireless self-backhaul both for indoor and outdoor scenarios.

The 5G network shall support flexible partitioning of radio resources between access and backhaul functions.

The 5G network shall support the autonomous configuration of access and wireless self-backhaul functions.

The 5G network shall support multi-hop wireless self-backhauling to enable a flexible extension of range and coverage area.

The 5G network shall support autonomous adaptation on wireless self-backhaul network topologies to minimize service disruptions.

The 5G network shall support topologically redundant connectivity on the wireless self-backhaul to enhance reliability and capacity and reduce latency.

One challenge to utilize the said spectrum for IAB is coexistence. The shared spectrum around 60 GHz is possibly used by other systems in the vicinity the IAB system, e.g., IEEE 802.11ad/ay systems. These systems find their main use cases indoors for establishing personal basic service sets ("PBSS") as well as an air interface for realizing wireless backhaul as one of the main target use cases for development of enhanced directional multi-gigabit ("EDMG") systems.

While listen-before-talk ("LBT") mechanisms are devised to allow proper coexistence of the NR-U systems with other systems sharing the spectrum, operation of IAB at unlicensed 60 GHz spectrum introduces new challenges:

Wireless backhaul at 60 GHz aims at high directivity, hence requiring directional channel sensing and channel access, the progress of which is currently uncertain in 3GPP RAN TSG.

IAB nodes comprise multiple functionalities, which may not operate simultaneously, thus introducing gaps in channel sensing and channel access.

The subject matter proposed in this disclosure aims at addressing these issues. Several embodiments take advantage of DU-MT collocation at an JAB node for channel sensing and channel access in unlicensed spectrum at high frequencies.

FIG. 1 depicts a wireless communication system 100 supporting unlicensed spectrum access in integrated access and backhaul, according to embodiments of the disclosure. In one embodiment, the wireless communication system 100 includes at least one remote unit 105, a radio access network ("RAN") 120, and a mobile core network 130. The RAN 120 and the mobile core network 130 form a mobile communication network. The RAN 120 may be composed of a base unit 121 with which the remote unit 105 communicates using wireless communication links 115. Even though a specific number of remote units 105, base units 121, wireless communication links 115, RANs 120, and mobile core networks 130 are depicted in FIG. 1, one of skill in the art will recognize that any number of remote units 105, base units 121, wireless communication links 115, RANs 120, and mobile core networks 130 may be included in the wireless communication system 100.

In one implementation, the RAN 120 is compliant with the 5G system specified in the Third Generation Partnership Project ("3GPP") specifications. For example, the RAN 120 may be a New Generation Radio Access Network ("NG-RAN"), implementing NR RAT and/or 3GPP Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 130.

In some embodiments, the remote units 105 communicate with an application server via a network connection with the mobile core network 130. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 130 via the RAN 120. The mobile core network 130 then relays traffic between the remote unit 105 and the application server (e.g., the content server 151 in the packet data network 150) using the PDU session. The PDU session represents a logical connection between the remote unit 105 and the User Plane Function ("UPF") 131.

In order to establish the PDU session (or PDN connection), the remote unit 105 must be registered with the mobile core network 130 (also referred to as "attached to the mobile core network" in the context of a Fourth Generation ("4G") system). Note that the remote unit 105 may establish one or more PDU sessions (or other data connections) with the mobile core network 130. As such, the remote unit 105 may have at least one PDU session for communicating with the packet data network 150, e.g., representative of the Internet. The remote unit 105 may establish additional PDU sessions for communicating with other data networks and/or other communication peers.

In the context of a 5G system ("5GS"), the term "PDU Session" a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 130 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR-U operation, the base unit 121 and the remote unit 105 communicate over unlicensed radio spectrum.

In one embodiment, the mobile core network 130 is a 5GC or an Evolved Packet Core ("EPC"), which may be coupled to a packet data network 150, like the Internet and private data networks, among other data networks. A remote unit 105 may have a subscription or other account with the mobile core network 130. Each mobile core network 130 belongs to a single public land mobile network ("PLMN"). The present disclosure is not intended to be limited to the implementation of any particular wireless communication system architecture or protocol.

The mobile core network 130 includes several network functions ("NFs"). As depicted, the mobile core network 130 includes at least one UPF 131. The mobile core network 130 also includes multiple control plane ("CP") functions including, but not limited to, an Access and Mobility Management Function ("AMF") 133 that serves the RAN 120, a Session Management Function ("SMF") 135, a Network Exposure Function ("NEF"), a Policy Control Function ("PCF") 137, a Unified Data Management function ("UDM") and a User Data Repository ("UDR").

The UPF(s) 131 is responsible for packet routing and forwarding, packet inspection, QoS handling, and external PDU session for interconnecting Data Network ("DN"), in the 5G architecture. The AMF 133 is responsible for termination of NAS signaling, NAS ciphering & integrity protection, registration management, connection management, mobility management, access authentication and authorization, security context management. The SMF 135 is responsible for session management (i.e., session establishment, modification, release), remote unit (i.e., UE) IP address allocation & management, DL data notification, and traffic steering configuration for UPF for proper traffic routing.

The NEF is responsible for making network data and resources easily accessible to customers and network partners. Service providers may activate new capabilities and expose them through APIs. These APIs allow third-party authorized applications to monitor and configure the network's behavior for a number of different subscribers (i.e., connected devices with different applications). The PCF 137 is responsible for unified policy framework, providing policy rules to CP functions, access subscription information for policy decisions in UDR.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 139.

In various embodiments, the mobile core network 130 may also include an Authentication Server Function ("AUSF") (which acts as an authentication server), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 130 may include an authentication, authorization, and accounting ("AAA") server.

In various embodiments, the mobile core network 130 supports different types of mobile data connections and different types of network slices, wherein each mobile data connection utilizes a specific network slice. Here, a "network slice" refers to a portion of the mobile core network 130 optimized for a certain traffic type or communication service. A network instance may be identified by a single-network slice selection assistance information ("S-NSSAI,") while a set of network slices for which the remote unit 105 is authorized to use is identified by network slice selection assistance information ("NSSAI").

Here, "NSSAI" refers to a vector value including one or more S-NSSAI values. In certain embodiments, the various network slices may include separate instances of network functions, such as the SMF 135 and UPF 131. In some embodiments, the different network slices may share some common network functions, such as the AMF 133. The different network slices are not shown in FIG. 1 for ease of illustration, but their support is assumed. Where different network slices are deployed, the mobile core network 130 may include a Network Slice Selection Function ("NSSF") which is responsible for selecting of the Network Slice instances to serve the remote unit 105, determining the allowed NSSAI, determining the AMF set to be used to serve the remote unit 105.

Although specific numbers and types of network functions are depicted in FIG. 1, one of skill in the art will recognize that any number and type of network functions may be included in the mobile core network 130. Moreover, in an LTE variant where the mobile core network 130 comprises an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 133 may be mapped to an MME, the SMF 135 may be mapped to a control plane portion of a PGW and/or to an MME, the UPF 131 may be mapped to an SGW and a user plane portion of the PGW, the UDM/UDR 139 may be mapped to an HSS, etc.

While FIG. 1 depicts components of a 5G RAN and a 5G core network, the described embodiments apply to other types of communication networks and RATs, including IEEE 802.11 variants, Global System for Mobile Communications ("GSM", i.e., a 2G digital cellular network), General Packet Radio Service ("GPRS"), UMTS, LTE variants, CDMA 2000, Bluetooth, ZigBee, Sigfox, and the like.

In the following descriptions, the term "gNB" is used for the base station but it is replaceable by any other radio access node, e.g., RAN node, eNB, Base Station ("BS"), Access Point ("AP"), NR, etc. Further the operations are described mainly in the context of 5G NR. However, the proposed solutions/methods are also equally applicable to other mobile communication systems.

Figure 2B:
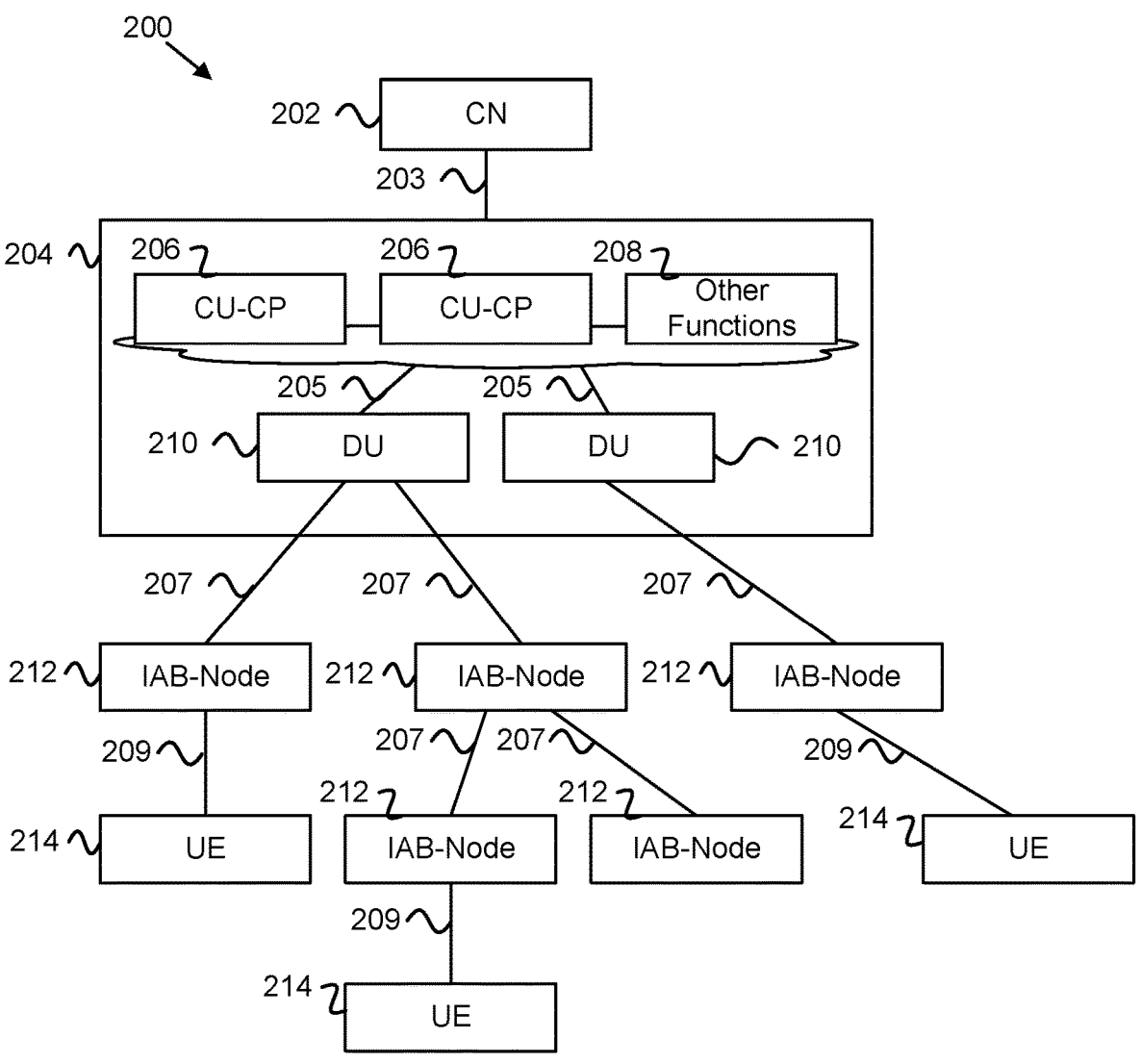
FIG. 2B depicts an example of an IAB system in standalone mode.

FIG. 2B illustrates an example of an IAB system 200. The core network 202 is connected to an IAB donor 204 of an IAB system 200 through a backhaul link 203, which is typically wired. The IAB donor 204 comprises a central unit ("CU") 206 that communicates with all the distributed units ("DUs") 210 in the system through an F1 interface 205. The IAB donor 204 is a single logical node that may comprise a set of functions 208 such as gNB-DU, gNB-CU-CP, gNB-CU-UP, and so on. In a deployment, the IAB donor 204 can be split according to these functions, which can all be either collocated or non-collocated.

Each JAB node 212 is functionally split into at least a distributed unit ("DU") and a mobile terminal ("MT"). An MT of an IAB node 212 is connected to a DU 210 of a parent node, which may be another IAB node 212 or an IAB donor 204.

A Uu link between an MT of an IAB node 212 (called an IAB-MT) and a DU 210 of a parent node (called an IAB-DU) is called a wireless backhaul link 207. In the wireless backhaul link 207, in terms of functionalities, the MT is similar to user equipment ("UE") 214 and the DU 210 of the parent node is similar to a base station in a conventional cellular wireless access link. Therefore, a link from an MT to a serving cell that is a DU 210 of a parent link is called an uplink, and a link in the reverse direction is called a downlink. For the sake of brevity, in the rest of this disclosure, embodiments may simply refer to an uplink or a downlink between IAB nodes 212, an upstream link or a downstream link of an IAB node 212, a link between a node and its parent node, a link between a node and its child node, and so on without a direct reference to an IAB-MT, IAB-DU, serving cell, and so on.

Each IAB donor 204 or IAB node 212 may serve UEs 214 through access links 209. IAB systems 200 are designed to allow multi-hop communications, e.g., a UE 214 may be connected to the core network 202 through an access link 209 and multiple backhaul links 207 between JAB nodes 212 and an IAB donor 204. For the rest of this disclosure, unless stated otherwise, an "IAB node" may generally refer to an IAB node 212 or an IAB donor 204.

Figure 2C:
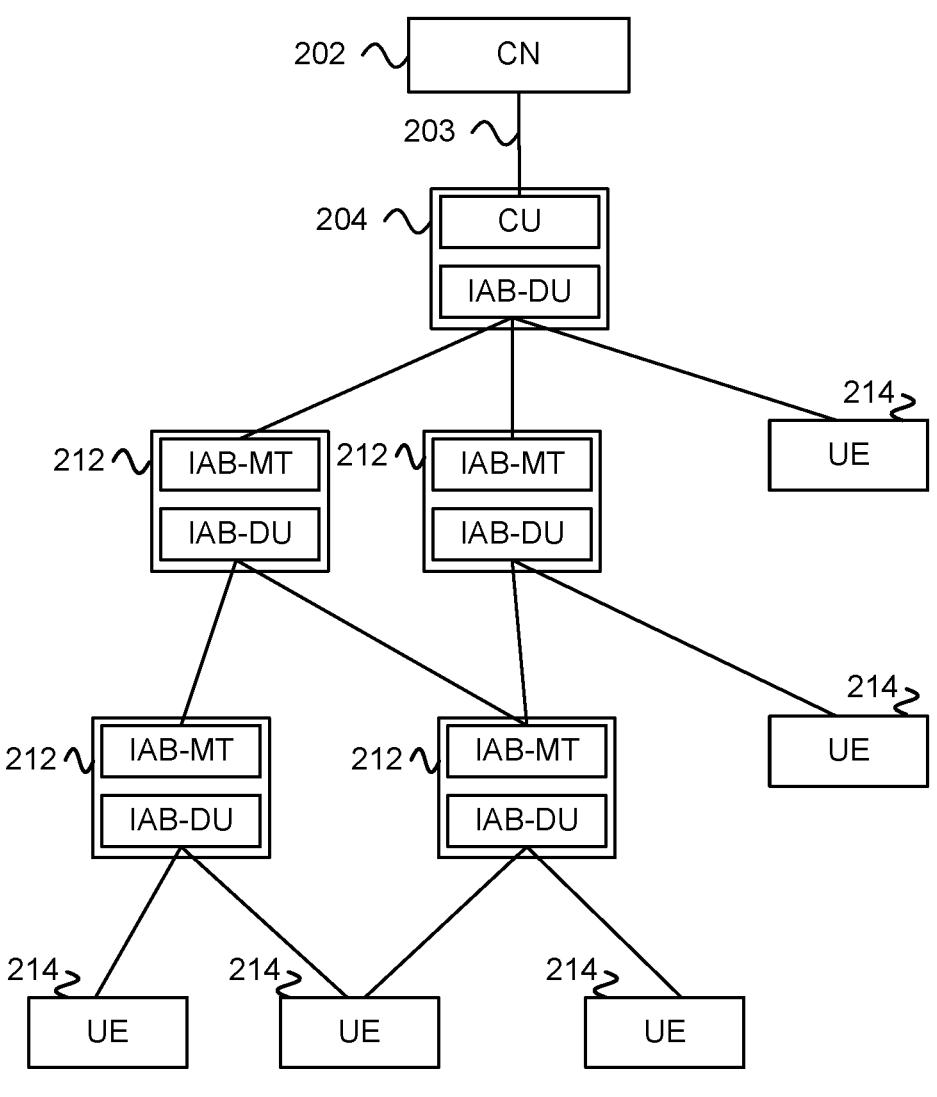
FIG. 2C illustrates the functional splits of an IAB donor and IAB nodes.

FIG. 2C is a block diagram illustrating one embodiment of a summary of a CU/DU split in an IAB donor 204 and a DU/MT split in IAB nodes 212. FIG. 2C illustrates the functional splits of an IAB donor 204 and JAB nodes 212. In this figure, an IAB node 212 or a UE 214 can be served by more than one serving cell as they support dual connectivity ("DC").

A node, link, or the like, closer to the IAB donor 204 and/or the core network 202 is called an upstream node or link. For example, a parent node of a subject node is an upstream node of the subject node and the link to the parent node is an upstream link with respect to the subject node. Similarly, a node or link farther from the IAB donor 204 and/or the core network 202 is called a downstream node or link. For example, a child node of a subject node is a downstream node of the subject node and the link to the child node is a downstream link with respect to the subject node.

The following table summarizes the terminology used in this disclosure for the sake of brevity versus the description that may appear in the standard specifications.

| Phrase | Description |
|---|---|
| Wireless backhaul link | A connection between an MT of an IAB node and a DU of a serving cell |
| Wireless access link | A connection between a UE and (a DU of) a serving cell |
| IAB-node/IAB node | RAN node that supports NR access links to UEs and NR backhaul links to parent nodes and child nodes |
| IAB-MT | IAB-node function that terminates the Uu interface to the parent node |
| IAB-DU | gNB-DU functionality supported by the IAB-node to terminate the NR access interface to UEs and next-hop IAB-nodes, and to terminate the F1 protocol to the gNB-CU functionality on the IAB-donor |
| IAB-donor/IAB donor | gNB that provides network access to UEs via a network of backhaul and access links |
| Parent [IAB] node | An IAB node or IAB donor that comprises a serving cell of the subject node. In some examples, IAB-MT's next hop neighbour node; the parent node may be an IAB-DU of an IAB-node or an IAB-donor. |
| Child [IAB] node | An IAB node that identifies the subject node as a serving cell. In some examples, IAB-DU's next hop neighbour node; the child node is also an IAB-node. In some embodiments, a UE or an enhanced UE or an IAB-enhanced UE may perform similarly to a child IAB node. |
| Sibling [IAB] node | An IAB node that has a common parent with the subject node |
| Uplink (of a wireless link) | A link from an MT to a DU of a parent node |
| Downlink (of a wireless backhaul link) | A link from a DU to an MT of a child node |
| Upstream node/link/etc. | A node/link/etc. (topologically) closer to the IAB donor/core network. Direction toward a parent node in an IAB topology. |

-continued

| Phrase | Description |
|---|---|
| Downstream node/link/ etc. | A node/link/etc. (topologically) farther from the IAB donor/core network. Direction toward a child node or UE in an IAB topology. |

Furthermore, an "operation" or a "communication," where appropriate, may refer to a transmission or a reception in an uplink (or upstream) or a downlink (or downstream). Then, the terms "simultaneous operation" or "simultaneous communications" may refer to multiplexing/duplexing transmissions and/or receptions by a node through one or multiple antennas/panels. Details of the simultaneous operation, if not described explicitly, should be understood from the context.

In one embodiment, channel access schemes for NR-based access for unlicensed spectrum can be classified into the following categories:

Category 1: Immediate transmission after a short switching gap

This is used for a transmitter to immediately transmit after a switching gap inside a channel occupancy time ("COT").

The switching gap from reception to transmission is to accommodate the transceiver turnaround time and is no longer than 16 μs.

Category 2: LBT without random back-off

The duration of time that the channel is sensed to be idle before the transmitting entity transmits is deterministic.

Category 3: LBT with random back-off with a contention window of fixed size

The LBT procedure has the following procedure as one of its components. The transmitting entity draws a random number N within a contention window. The size of the contention window is specified by the minimum and maximum value of N.

The size of the contention window is fixed. The random number N is used in the LBT procedure to determine the duration of time that the channel is sensed to be idle before the transmitting entity transmits on the channel.

Category 4: LBT with random back-off with a contention window of variable size

The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

For different transmissions in a COT and different channels/signals to be transmitted, different categories of channel access schemes can be used. The categories defined above may be abbreviated to Cat1, Cat2, Cat3, and Cat4, respectively.

Regarding channel access procedure, the following sections are taken verbatim from TS 37.213 (v16.6.0), Section 4, which is incorporated herein by reference. Section numbers 4.0 to 4.2.3.1 are copied directly from the TS. Definitions in this section apply to the rest of this disclosure unless stated otherwise. Unless otherwise noted, the definitions below are applicable for the following terminologies used in this specification:

A channel refers to a carrier or a part of a carrier consisting of a contiguous set of resource blocks ("RBs") on which a channel access procedure is performed in shared spectrum.

A channel access procedure is a procedure based on sensing that evaluates the availability of a channel for performing transmissions. The basic unit for sensing is a sensing slot with a duration $T_{sl}$=9 us. The sensing slot duration $T_{sl}$ is considered to be idle if an eNB/gNB or a UE senses the channel during the sensing slot duration, and determines that the detected power for at least 4 us within the sensing slot duration is less than energy detection threshold $X_{Thresh}$. Otherwise, the sensing slot duration $T_{sl}$ is considered to be busy.

A channel occupancy refers to transmission(s) on channel(s) by eNB/gNB/UE(s) after performing the corresponding channel access procedures in this clause.

A Channel Occupancy Time refers to the total time for which eNB/gNB/UE and any eNB/gNB/UE(s) sharing the channel occupancy perform transmission(s) on a channel after an eNB/gNB/UE performs the corresponding channel access procedures described in this clause. For determining a Channel Occupancy Time, if a transmission gap is less than or equal to 25 us, the gap duration is counted in the channel occupancy time. A channel occupancy time can be shared for transmission between an eNB/gNB and the corresponding UE(s).

A DL transmission burst is defined as a set of transmissions from an eNB/gNB without any gaps greater than 16 us. Transmissions from an eNB/gNB separated by a gap of more than 16 us are considered as separate DL transmission bursts. An eNB/gNB can transmit transmission(s) after a gap within a DL transmission burst without sensing the corresponding channel(s) for availability.

A UL transmission burst is defined as a set of transmissions from a UE without any gaps greater than 16 us. Transmissions from a UE separated by a gap of more than 16 us are considered as separate UL transmission bursts. A UE can transmit transmission(s) after a gap within a UL transmission burst without sensing the corresponding channel(s) for availability.

A discovery burst refers to a DL transmission burst including a set of signal(s) and/or channel(s) confined within a window and associated with a duty cycle. The discovery burst can be any of the following:

Transmission(s) initiated by an eNB that includes a primary synchronization signal ("PSS"), secondary synchronization signal ("SSS") and cell-specific reference signal(s) ("CRSs") and may include non-zero power ("NZP") channel state information ("CSI") reference signals ("CSI-RS").

Transmission(s) initiated by a gNB that includes at least an SS/PBCH block consisting of a PSS, SSS, physical broadcast channel ("PBCH") with associated demodulation reference signal ("DM-RS") and may also include control resource sets ("CORESET") for physical downlink control channel ("PDCCH") scheduling physical downlink shared channel ("PDSCH") with SIB1, and PDSCH carrying SIB1 and/or NZP CSI-RS.

Regarding downlink channel access procedures, an eNB operating LAA Scell(s) on channel(s) and a gNB performing transmission(s) on channel(s) shall perform the channel access procedures described in this clause for accessing the channel(s) on which the transmission(s) are performed. In one embodiment, $X_{Thresh}$ for sensing is adjusted as described in clause 4.1.5 when applicable. A gNB performs channel access procedures in this clause unless the higher layer parameter ChannelAccessMode-r16 is provided and ChannelAccessMode-r16='semistatic'.

Regarding type 1 DL channel access procedures, this clause describes channel access procedures to be performed by an eNB/gNB where the time duration spanned by the sensing slots that are sensed to be idle before a downlink transmission(s) is random. The clause is applicable to the following transmissions:

Transmission(s) initiated by an eNB including PDSCH/PDCCH/EPDCCH, or

Any transmission(s) initiated by a gNB.

The eNB/gNB may transmit a transmission after first sensing the channel to be idle during the sensing slot durations of a defer duration $T_d$ and after the counter N is zero in step 4. The counter N is adjusted by sensing the channel for additional sensing slot duration(s) according to the steps below:

1. set $N=N_{init}$, where $N_{init}$ is a random number uniformly distributed between 0 and $CW_p$, and go to step 4;
2. if N>0 and the eNB/gNB chooses to decrement the counter, set N=N−1;
3. sense the channel for an additional sensing slot duration, and if the additional sensing slot duration is idle, go to step 4; else, go to step 5;
4. if N=0, stop; else, go to step 2.
5. sense the channel until either a busy sensing slot is detected within an additional defer duration $T_d$ or all the sensing slots of the additional defer duration $T_d$ are detected to be idle;
6. if the channel is sensed to be idle during all the sensing slot durations of the additional defer duration $T_d$, go to step 4; else, go to step 5;

If an eNB/gNB has not transmitted a transmission after step 4 in the procedure above, the eNB/gNB may transmit a transmission on the channel, if the channel is sensed to be idle at least in a sensing slot duration $T_{sl}$ when the eNB/gNB is ready to transmit and if the channel has been sensed to be idle during all the sensing slot durations of a defer duration $T_d$ immediately before this transmission. If the channel has not been sensed to be idle in a sensing slot duration $T_{sl}$ when the eNB/gNB first senses the channel after it is ready to transmit or if the channel has been sensed to be not idle during any of the sensing slot durations of a defer duration $T_d$ immediately before this intended transmission, the eNB/gNB proceeds to step 1 after sensing the channel to be idle during the sensing slot durations of a defer duration $T_d$.

The defer duration $T_d$ consists of duration $T_f=16$ us immediately followed by $m_p$ consecutive sensing slot durations $T_{sl}$, and $T_f$ includes an idle sensing slot duration $T_{sl}$ at start of $T_f$. $CW_{min,p} \leq CW_p \leq CW_{max,p}$ is the contention window. $CW_p$ adjustment is described in clause 4.1.4. $CW_{min,p}$ and $CW_{max,p}$ are chosen before step 1 of the procedure above. $m_p$, $CW_{min,p}$, and $CW_{max,p}$ are based on a channel access priority class p associated with the eNB/gNB transmission, as shown in Table 4.1.1-1.

An eNB/gNB shall not transmit on a channel for a Channel Occupancy Time that exceeds $T_{m\ cot,p}$ where the channel access procedures are performed based on a channel access priority class p associated with the eNB/gNB transmissions, as given in Table 4.1.1-1.

If an eNB/gNB transmits discovery burst(s) as described in clause 4.1.2 when N>0 in the procedure above, the eNB/gNB shall not decrement N during the sensing slot duration(s) overlapping with discovery burst(s). A gNB may use any channel access priority class for performing the procedures above to transmit transmission(s) including discovery burst(s) satisfying the conditions described in this clause. A gNB shall use a channel access priority class applicable to the unicast user plane data multiplexed in PDSCH for performing the procedures above to transmit transmission(s) including unicast PDSCH with user plane data.

For p=3 and p=4, if the absence of any other technology sharing the channel can be guaranteed on a long term basis (e.g. by level of regulation), $T_{m\ cot,p}=10$ ms, otherwise, $T_{m\ cot,p}=8$ ms.

TABLE 4.1.1-1

| Channel Access Priority Class ("CAPC") | | | | | |
|---|---|---|---|---|---|
| Channel Access Priority Class (p) | $m_p$ | $CW_{min,p}$ | $CW_{max,p}$ | $T_{mcot,p}$ | allowed $CW_p$ sizes |
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Regarding regional limitations on channel occupancy time, in Japan, for example, if an eNB/gNB has transmitted a transmission after N=0 in step 4 of the procedure above, the eNB/gNB may transmit the next continuous transmission, for duration of maximum $T_j=4$ ms, immediately after sensing the channel to be idle for at least a sensing interval of $T_{js}=34$ us and if the total sensing and transmission time is not more than $$1000 \cdot T_{mcot} + \left\lceil \frac{T_{mcot}}{T_j} - 1 \right\rceil \cdot T_{js}\ us.$$

The sensing interval $T_{js}$ consists of duration $T_f=16$ us immediately followed by two sensing slots and $T_f$ includes an idle sensing slot at start of $T_f$. The channel is considered to be idle for $T_{js}$ if it is sensed to be idle during the sensing slot durations of $T_{js}$.

Regarding type 2 DL channel access procedures, this section describes channel access procedures to be performed by an eNB/gNB where the time duration spanned by sensing slots that are sensed to be idle before a downlink transmission(s) is deterministic. If an eNB performs Type 2 DL channel access procedures, it follows the procedures described in clause 4.1.2.1. Type 2A channel access procedures as described in clause 4.1.2.1 are only applicable to the following transmission(s) performed by an eNB/gNB:

Transmission(s) initiated by an eNB including discovery burst and not including PDSCH where the transmission(s) duration is at most 1 ms, or Transmission(s) initiated by a gNB with only discovery burst or with discovery burst multiplexed with non-unicast information, where the transmission(s) duration is at most 1 ms, and the discovery burst duty cycle is at most 1/20, or Transmission(s) by an eNB/gNB following transmission(s) by a UE after a gap of 25 us in a shared channel occupancy as described in clause 4.1.3.

Type 2B or Type 2C DL channel access procedures as described in clause 4.1.2.2 and 4.1.2.3, respectively, are applicable to the transmission(s) performed by a gNB following transmission(s) by a UE after a gap of 16 us or up to 16 us, respectively, in a shared channel occupancy as described in clause 4.1.3.

Regarding Type 2A DL channel access procedures, an eNB/gNB may transmit a DL transmission immediately after sensing the channel to be idle for at least a sensing interval $T_{short\_dl}=25$ us. $T_{short\_dl}$ consists of a duration $T_f=16$ us immediately followed by one sensing slot and $T_f$ includes a sensing slot at start of $T_f$. The channel is considered to be idle for $T_{short\_dl}$ if both sensing slots of $T_{short\_dl}$ are sensed to be idle.

Regarding Type 2B DL channel access procedures, a gNB may transmit a DL transmission immediately after sensing the channel to be idle within a duration of $T_f=16$ us. $T_f$ includes a sensing slot that occurs within the last 9 us of $T_f$. The channel is considered to be idle within the duration $T_f$ if the channel is sensed to be idle for a total of at least 5us with at least 4 us of sensing occurring in the sensing slot.

Regarding Type 2C DL channel access procedures, when a gNB follows the procedures in this clause for transmission of a DL transmission, the gNB does not sense the channel before transmission of the DL transmission. The duration of the corresponding DL transmission is at most 584 us.

Regarding DL channel access procedures in a shared channel occupancy, for the case where an eNB shares a channel occupancy initiated by a UE, the eNB may transmit a transmission that follows an autonomous physical uplink shared channel ("PUSCH") transmission by the UE if 'COT sharing indication' in AUL-UCI in subframe n indicates '1', an eNB may transmit a transmission in subframe n+X, where X is subframeOffsetCOT-Sharing, including PDCCH but not including PDSCH on the same channel immediately after performing Type 2A DL channel access procedures in clause 4.1.2.1, if the duration of the PDCCH is less than or equal to duration of two OFDM symbols and it shall contain at least AUL-DFI or UL grant to the UE from which the PUSCH transmission indicating COT sharing was received.

If a gNB shares a channel occupancy initiated by a UE using the channel access procedures described in clause 4.2.1.1 on a channel, the gNB may transmit a transmission that follows a UL transmission on scheduled resources or a PUSCH transmission on configured resources by the UE after a gap as follows:

The transmission shall contain transmission to the UE that initiated the channel occupancy and can include non-unicast and/or unicast transmissions where any unicast transmission that includes user plane data is only transmitted to the UE that initiated the channel occupancy.

If the higher layer parameters ul-toDL-COT-ShoringED-Threshold-r16 is not provided, the transmission shall not include any unicast transmissions with user plane data and the transmission duration is not more than the duration of 2, 4 and 8 symbols for subcarrier spacing of 15, 30 and 60 kHz of the corresponding channel, respectively.

If the gap is up to 16 us, the gNB can transmit the transmission on the channel after performing Type 2C DL channel access as described in clause 4.1.2.3.

If the gap is 25 us or 16 us, the gNB can transmit the transmission on the channel after performing Type 2A or Type 2B DL channel access procedures as described in clause 4.1.2.1 and 4.1.2.2, respectively.

For the case where a gNB shares a channel occupancy initiated by a UE with configured grant PUSCH transmission, the gNB may transmit a transmission that follows the configured grant PUSCH transmission by the UE as follows:

If the higher layer parameter ul-toDL-COT-SharingED-Threshold-r16 is provided, the UE is configured by cg-COT-SharingList-r16 where cg-COT-SharingList-r16 provides a table configured by higher layer. Each row of the table provides a channel occupancy sharing information given by higher layer parameter CG-COT-Sharing-r16. One row of the table is configured for indicating that the channel occupancy sharing is not available.

If the 'COT sharing information' in CG-UCI detected in slot n indicates a row index that corresponds to a CG-COT-Sharing-r16 that provides channel occupancy sharing information, the gNB can share the UE channel occupancy assuming a channel access priority class p=channelAccessPriority-r16, starting from slot n+O, where O=offset-r16 slots, for a duration of D=duration-r16 slots where duration-r16, offset-r16, and channelAccessPriority-r16 are higher layer parameters provided by CG-COT-Sharing-r16.

If the higher layer parameter ul-toDL-COT-SharingED-Threshold-r16 is not provided, and if 'COT sharing information' in CG-UCI indicates '1', the gNB can share the UE channel occupancy and start the DL transmission X=cg-COT-SharingOffset-r16 symbols from the end of the slot where CG-UCI is detected, where cg-COT-SharingOffset-r16 is provided by higher layer. The transmission shall not include any unicast transmissions with user plane data and the transmission duration is not more than the duration of 2, 4 and 8 symbols for subcarrier spacing of 15, 30 and 60 kHz of the corresponding channel, respectively.

For the case where a gNB uses channel access procedures as described in clause 4.1.1 to initiate a transmission and shares the corresponding channel occupancy with a UE that transmits a transmission as described in clause 4.2.1.2, the gNB may transmit a transmission within its channel occupancy that follows the UE's transmission if any gap between any two transmissions in the gNB channel occupancy is at most 25 us. In this case the following applies:

If the gap is 25 us or 16 us, the gNB can transmit the transmission on the channel after performing Type 2A or 2B DL channel access procedures as described in clause 4.1.2.1 and 4.1.2.2, respectively.

If the gap is up to 16 us, the gNB can transmit the transmission on the channel after performing Type 2C DL channel access as described in clause 4.1.2.3.

Regarding contention window adjustment procedures, if an eNB/gNB transmits transmissions including PDSCH that are associated with channel access priority class p on a channel, the eNB/gNB maintains the contention window value $CW_p$ and adjusts $CW_p$ before step 1 of the procedure described in clause 4.1.1 for those transmissions as described in this clause.

Regarding contention window adjustment procedures for transmissions by eNB, if an eNB transmits transmissions including PDSCH that are associated with channel access priority class p on a channel, the eNB maintains the contention window value $CW_p$ and adjusts $CW_p$ before step 1 of the procedure described in clause 4.1.1 for those transmissions using the following steps:

1. for every priority class $p \in \{1,2,3,4\}$ set $CW_p = CW_{min,p}$ 2. if at least $Z=80\%$ of hybrid automatic repeat request ("HARQ")-acknowledgement ("ACK") values corresponding to PDSCH transmission(s) in reference subframe k are determined as NACK, increase $CW_p$ for every priority class $p \in \{1,2,3,4\}$ to the next higher allowed value and remain in step 2; otherwise, go to step 1.

Reference subframe k is the starting subframe of the most recent transmission on the channel made by the eNB, for which at least some HARQ-ACK feedback is expected to be available. The eNB shall adjust the value of $CW_p$ for every priority class $p \in \{1,2,3,4\}$ based on a given reference subframe k only once.

For determining Z, if the eNB transmission(s) for which HARQ-ACK feedback is available start in the second slot of subframe k, HARQ-ACK values corresponding to PDSCH transmission(s) in subframe k+1 are also used in addition to the HARQ-ACK values corresponding to PDSCH transmission(s) in subframe k.

if the HARQ-ACK values correspond to PDSCH transmission(s) on an LAA SCell that are assigned by (E)PDCCH transmitted on the same LAA SCell, if no HARQ-ACK feedback is detected for a PDSCH transmission by the eNB, or if the eNB detects 'DTX', 'NACK/DTX' or 'any' state, it is counted as NACK.

if the HARQ-ACK values correspond to PDSCH transmission(s) on an LAA SCell that are assigned by (E)PDCCH transmitted on another serving cell, if the HARQ-ACK feedback for a PDSCH transmission is detected by the eNB, 'NACK/DTX' or 'any' state is counted as NACK, and 'DTX' state is ignored.

if no HARQ-ACK feedback is detected for a PDSCH transmission by the eNB if physical uplink control channel ("PUCCH") format 1b with channel selection is expected to be used by the UE, 'NACK/DTX' state corresponding to 'no transmission' as described in Clauses 10.1.2.2.1, 10.1.3.1 and 10.1.3.2.1 is counted as NACK, and 'DTX' state corresponding to 'no transmission' is ignored.

Otherwise, the HARQ-ACK for the PDSCH transmission is ignored.

if a PDSCH transmission has two codewords, the HARQ-ACK value of each codeword is considered separately bundled HARQ-ACK across M subframes is considered as M HARQ-ACK responses.

If the eNB transmits transmissions including PDCCH/EPDCCH with downlink control information ("DCI") format 0A/0B/4A/4B and not including PDSCH that are associated with channel access priority class p on a channel starting from time $t_0$, the eNB maintains the contention window value $CW_p$ and adjusts $CW_p$ before step 1 of the procedure described in clause 4.1.1 for those transmissions using the following steps:

1. for every priority class $p \in \{1,2,3,4\}$ set $CW_p = CW_{min,p}$ 2. if less than 10% of the UL transport blocks scheduled by the eNB using Type 2 channel access procedure (described in clause 4.2.1.2) in the time interval between to and $t_0 + T_{CO}$ have been received successfully, increase $CW_p$ for every priority class $p \in \{1,2,3,4\}$ to the next higher allowed value and remain in step 2; otherwise, go to step 1.

$T_{CO}$ is computed as described in clause 4.2.1.0.3.

Regarding contention window adjustment procedures for DL transmissions by gNB, if a gNB transmits transmissions including PDSCH that are associated with channel access priority class p on a channel, the gNB maintains the contention window value $CW_p$ and adjusts $CW_p$ before step 1 of the procedure described in clause 4.1.1 for those transmissions using the following steps:

1. For every priority class $p \in \{1,2,3,4\}$, set $CW_p = CW_{min,p}$.

2. If HARQ-ACK feedback is available after the last update of $CW_p$, go to step 3. Otherwise, if the gNB transmission after procedure described in clause 4.1.1 does not include a retransmission or is transmitted within a duration $T_w$ from the end of the reference duration corresponding to the earliest DL channel occupancy after the last update of $CW_p$, go to step 5; otherwise go to step 4.

3. The HARQ-ACK feedback(s) corresponding to PDSCH(s) in the reference duration for the latest DL channel occupancy for which HARQ-ACK feedback is available is used as follows:

a. If at least one HARQ-ACK feedback is 'ACK' for PDSCH(s) with transport block based feedback or at least 10% of HARQ-ACK feedbacks is 'ACK' for PDSCH CBGs transmitted at least partially on the channel with code block group based feedback, go to step 1; otherwise go to step 4.

4. Increase $CW_p$ for every priority class $p \in \{1,2,3,4\}$ to the next higher allowed value.

5. For every priority class $p \in \{1,2,3,4\}$, maintain $CW_p$ as it is; go to step 2.

The reference duration and duration $T_w$ in the procedure above are defined as follows:

The reference duration corresponding to a channel occupancy initiated by the gNB including transmission of PDSCH(s) is defined in this clause as a duration starting from the beginning of the channel occupancy until the end of the first slot where at least one unicast PDSCH is transmitted over all the resources allocated for the PDSCH, or until the end of the first transmission burst by the gNB that contains unicast PDSCH(s) transmitted over all the resources allocated for the PDSCH, whichever occurs earlier. If the channel occupancy includes a unicast PDSCH, but it does not include any unicast PDSCH transmitted over all the resources allocated for that PDSCH, then, the duration of the first transmission burst by the gNB within the channel occupancy that contains unicast PDSCH(s) is the reference duration for CWS adjustment.

$T_w = \max(T_A, T_B + 1 \text{ ms})$ where $T_B$ is the duration of the transmission burst from start of the reference duration in ms and $T_A = 5$ ms if the absence of any other technology sharing the channel cannot be guaranteed on a long-term basis (e.g. by level of regulation), and $T_A = 10$ ms otherwise.

If a gNB transmits transmissions using Type 1 channel access procedures associated with the channel access priority class p on a channel and the transmissions are not associated with explicit HARQ-ACK feedbacks by the corresponding UE(s), the gNB adjusts CW, before step 1 in the procedures described in subclause 4.1.1, using the latest $CW_p$ used for any DL transmissions on the channel using Type 1 channel access procedures associated with the channel access priority class p. If the corresponding channel access priority class p has not been used for any DL transmissions on the channel, $CW_p = CW_{min,p}$ is used.

Regarding common procedures for CWS adjustments for DL transmissions, the following applies to the procedures described in clauses 4.1.4.1 and 4.1.4.2:

If $CW_p=CW_{max,p}$, the next higher allowed value for adjusting $CW_p$ is $CW_{max,p}$.

If the $CW_p=CW_{max,p}$ is consecutively used K times for generation of $N_{init}$, $CW_p$ is reset to $CW_{min,p}$ only for that priority class p for which $CW_p=CW_{max,p}$ is consecutively used K times for generation of $N_{init}$. K is selected by eNB/gNB from the set of values {1, 2, . . . , 8} for each priority class $p \in \{1,2,3,4\}$.

Regarding energy detection threshold adaptation procedures, an eNB/gNB accessing a channel on which transmission(s) are performed, shall set the energy detection threshold ($X_{Thresh}$) to be less than or equal to the maximum energy detection threshold $X_{Thresh\_max}$. $X_{Thresh\_max}$ is determined as follows:

If the absence of any other technology sharing the channel can be guaranteed on a long-term basis (e.g. by level of regulation) then:

$$X_{Thresh\_max} = \min\left\{ \begin{array}{l} T_{max} + 10 \text{ dB,} \\ X_r \end{array} \right\}$$

$X_r$ is maximum energy detection threshold defined by regulatory requirements in dBm when such requirements are defined, otherwise $X_r=T_{max}+10$ dB;

otherwise, $$X_{Thresh\_max} =$$

$$\max\left\{ \begin{array}{l} -72 + 10 \cdot \log 10(BW \text{ MHz}/20 \text{ MHz}) \text{ dBm,} \\ \min\left\{ \begin{array}{l} T_{max}, \\ T_{max} - T_A + (P_H + 10 \cdot \log 10(BW \text{ MHz}/20 \text{ MHz}) - P_{TX}) \end{array} \right\} \end{array} \right\}$$

where:

$T_A=5$ dB for transmissions including discovery burst(s) as described in clause 4.1.2, and $T_A=10$ dB otherwise;

$P_H=23$ dBm;

$P_{TX}$ is the set maximum eNB/gNB output power in dBm for the channel;

eNB/gNB uses the set maximum transmission power over a single channel irrespective of whether single channel or multi-channel transmission is employed $T_{max}$ (dBm)=$10 \cdot \log 10$ ($3.16228 \cdot 10^{-8}$ (mW/MHz) $\cdot$BWMHz (MHz));

BWMHz is the single channel bandwidth in MHz.

Regarding uplink channel access procedures, a UE performing transmission(s) on LAA Scell(s), an eNB scheduling or configuring UL transmission(s) for a UE performing transmission(s) on LAA Scell(s), and a UE performing transmission(s) on channel(s) and a gNB scheduling or configuring UL transmission(s) for a UE performing transmissions on channel(s) shall perform the procedures described in this clause for the UE to access the channel(s) on which the transmission(s) are performed.

In this clause, transmissions from a UE are considered as separate UL transmissions, irrespective of having a gap between transmissions or not, and $X_{Thresh}$ for sensing is adjusted as described in clause 4.2.3 when applicable. A UE performs channel access procedures in this clause unless the higher layer parameter ChannelAccessMode-r16 is provided and ChannelAccessMode-r16='semistatic'. If a UE fails to access the channel(s) prior to an intended UL transmission to a gNB, Layer 1 notifies higher layers about the channel access failure.

Regarding channel access procedures for uplink transmission(s), A UE can access a channel on which UL transmission(s) are performed according to one of Type 1 or Type 2 UL channel access procedures. Type 1 channel access procedure is described in clause 4.2.1.1. Type 2 channel access procedure is described in clause 4.2.1.2.

If a UL grant scheduling a PUSCH transmission indicates Type 1 channel access procedures, the UE shall use Type 1 channel access procedures for transmitting transmissions including the PUSCH transmission unless stated otherwise in this clause. A UE shall use Type 1 channel access procedures for transmitting transmissions including the autonomous or configured grant PUSCH transmission on configured UL resources unless stated otherwise in this clause.

If a UL grant scheduling a PUSCH transmission indicates Type 2 channel access procedures, the UE shall use Type 2 channel access procedures for transmitting transmissions including the PUSCH transmission unless stated otherwise in this clause. A UE shall use Type 1 channel access procedures for transmitting sounding reference signal ("SRS") transmissions not including a PUSCH transmission. UL channel access priority class p=1 in Table 4.2.1-1 is used for SRS transmissions not including a PUSCH.

If a DL assignment triggering SRS but not scheduling a PUCCH transmission indicates Type 2 channel access procedures, the UE shall use Type 2 channel access procedures. If a UE is scheduled by an eNB/gNB to transmit PUSCH and SRS in contiguous transmissions without any gaps in between, and if the UE cannot access the channel for PUSCH transmission, the UE shall attempt to make SRS transmission according to uplink channel access procedures specified for SRS transmission.

If a UE is scheduled by a gNB to transmit PUSCH and one or more SRSs by a single UL grant in non-contiguous transmissions, or a UE is scheduled by a gNB to transmit PUCCH and/or SRSs by a single DL assignment in non-contiguous transmissions, the UE shall use the channel access procedure indicated by the scheduling DCI for the first UL transmission scheduled by the scheduling DCI. If the channel is sensed by the UE to be continuously idle after the UE has stopped transmitting the first transmission, the UE may transmit further UL transmissions scheduled by the scheduling DCI using Type 2 channel access procedures or Type 2A UL channel access procedures without applying a CP extension if the further UL transmissions are within the gNB Channel Occupancy Time. Otherwise, if the channel sensed by the UE is not continuously idle after the UE has stopped transmitting the first UL transmission or the further UL transmissions are outside the gNB Channel Occupancy Time, the UE may transmit the further UL transmissions using Type 1 channel access procedure, without applying a CP extension.

A UE shall use Type 1 channel access procedures for PUCCH transmissions unless stated otherwise in this clause. If a DL grant determined according to Clause 9.2.3 in TS38.213 or a random access response ("RAR") message for successRAR scheduling a PUCCH transmission indicates Type 2 channel access procedures, the UE shall use Type 2 channel access procedures.

When a UE uses Type 1 channel access procedures for PUCCH transmissions or PUSCH only transmissions without UL-SCH, the UE shall use UL channel access priority class p=1 in Table 4.2.1-1. A UE shall use Type 1 channel access procedure for PRACH transmissions and PUSCH transmissions without user plane data related to random access procedure that initiate a channel occupancy. In this case, UL channel access priority class p=1 in Table 4.2.1-1 is used for PRACH transmissions, and UL channel access priority class used for PUSCH transmissions is determined.

When a UE uses Type 1 channel access procedures for PUSCH transmissions on configured resource, the UE determines the corresponding UL channel access priority p in Table 4.2.1-1. When a UE uses Type 1 channel access procedures for PUSCH transmissions with user plane data indicated by a UL grant or related to random access procedure where the corresponding UL channel access priority p is not indicated, the UE determines p in Table 4.2.1-1 following the same procedures as for PUSCH transmission on configured resources using Type 1 channel access procedures.

When a UE uses Type 2A, Type 2B, or Type 2C UL channel access procedures for PUSCH transmissions indicated by a UL grant or related to random access procedures where the corresponding UL channel access priority p is not indicated, the UE assumes that the channel access priority class p=4 is used by the gNB for the Channel Occupancy Time. A UE shall not transmit on a channel for a Channel Occupancy Time that exceeds $T_{ulm\ cot,p}$ where the channel access procedure is performed based on the channel access priority class p associated with the UE transmissions, as given in Table 4.2.1-1.

The total Channel Occupancy Time of autonomous uplink transmission(s) obtained by the channel access procedure in this clause, including the following DL transmission if the UE sets 'COT sharing indication' in AUL-UCI to '1' in a subframe within the autonomous uplink transmission(s) as described in Clause 4.1.3, shall not exceed $T_{ulm\ cot,p}$, where $T_{ulm\ cot,p}$ is given in Table 4.2.1-1.

TABLE 4.2.1-1

| Channel Access Priority Class (CAPC) for UL | | | | | |
|---|---|---|---|---|---|
| Channel Access Priority Class (p) | $m_p$ | $CW_{min,p}$ | $CW_{max,p}$ | $T_{ulmcot,p}$ | allowed $CW_p$ sizes |
| 1 | 2 | 3 | 7 | 2 ms | {3, 7} |
| 2 | 2 | 7 | 15 | 4 ms | {7, 15} |
| 3 | 3 | 15 | 1023 | 6ms or 10 ms | {15, 31, 63, 127, 255, 511, 1023} |
| 4 | 7 | 15 | 1023 | 6ms or 10 ms | {15, 31, 63, 127, 255, 511, 1023} |

NOTE 1:
For p = 3,4, $T_{ulmcot,p}$ = 10 ms if the higher layer parameter absenceOfAnyOtherTechnology-r14 or absenceOfAnyOtherTechnology-r16 is provided, otherwise, $T_{ulmcot,p}$ = 6 ms.
NOTE 2:
When $T_{ulmcot,p}$ = 6 ms it may be increased to 8 ms by inserting one or more gaps. The minimum duration of a gap shall be 100 us. The maximum duration before including any such gap shall be 6 ms.

Regarding channel access procedures and UL related signaling, and particularly Channel access procedures upon detection of a common DCI, If a UE detects 'UL duration and offset' field in DCI Format 1C, the following are applicable:

If the 'UL duration and offset' field indicates an 'UL offset' l and an 'UL duration' d for subframe n, then the scheduled UE may use channel access procedures Type 2 for transmissions in subframes n+l+i where i=0, 1, . . . d−1, irrespective of the channel access Type signalled in the UL grant for those subframes, if the end of UE transmission occurs in or before subframe n+l+d−1.

If the 'UL duration and offset' field indicates an 'UL offset' l and an 'UL duration' d for subframe n and the 'COT sharing indication for AUL' field is set to '1', then a UE configured with autonomous UL may use channel access procedures Type 2 for autonomous UL transmissions assuming any priority class in subframes n+l+i where i=0, 1, . . . d−1, if the end of UE autonomous UL transmission occurs in or before subframe n+l+d−1 and the autonomous UL transmission between n+l and n+l+d−1 shall be contiguous.

If the 'UL duration and offset' field indicates an 'UL offset' l and an 'UL duration' d for subframe n and the 'COT sharing indication for AUL' field is set to '0', then a UE configured with autonomous UL shall not transmit autonomous UL in subframes n+l+i where i=0, 1, . . . d−1.

If a UE determines the duration in time domain and the location in frequency domain of a remaining channel occupancy initiated by the gNB from a DCI format 2_0 as described in clause 11.1.1 of [7], the following is applicable:

The UE may switch from Type 1 channel access procedures as described in clause 4.2.1.1 to Type 2A channel access procedures as described in clause 4.2.1.2.1 for its corresponding UL transmissions within the determined duration in time and location in frequency domain of the remaining channel occupancy. In this case, if the UL transmissions are PUSCH transmissions on configured resources, the UE may assume any priority class for the channel occupancy shared with the gNB.

Regarding channel access procedures for consecutive UL transmission(s), for contiguous UL transmission(s), the following are applicable:

If a UE is scheduled to transmit a set of UL transmissions using one or more UL grant(s) or DL assignment(s), and if the UE cannot access the channel for a transmission in the set prior to the last transmission according to one of Type 1, Type 2, or Type 2A UL channel access procedures, the UE shall attempt to transmit the next transmission according to the channel access type indicated in the corresponding UL grant or DL assignment. Otherwise, if the UE cannot access the channel for a transmission in the set prior to the last transmission according to Type 2B UL channel access procedure, the UE shall attempt to transmit the next transmission according to Type 2A UL channel access procedure.

If a UE is scheduled by a gNB to transmit a set of UL transmissions including PUSCH or SRS symbol(s) using a UL grant, the UE shall not apply a CP extension for the remaining UL transmissions in the set after the first UL transmission after accessing the channel.

If a UE is scheduled to transmit a set of consecutive UL transmissions without gaps including PUSCH using one or more UL grant(s), PUCCH using one or more DL grant(s), or SRS with one or more DL grant(s) or UL grant(s) and the UE transmits one of the scheduled UL transmissions in the set after accessing the channel according to one of Type 1, Type 2, Type 2A, Type 2B or Type 2C UL channel access procedures, the UE may continue transmission of the remaining UL transmissions in the set, if any.

If a UE is configured to transmit a set of consecutive PUSCH or SRS transmissions on resources configured by the gNB, the time domain resource configuration defines multiple transmission occasions, and if the UE cannot access the channel according to Type 1 UL channel access procedure for transmitting in a transmission occasion prior to the last transmission occasion, the UE shall attempt to transmit in the next transmission occasion according to Type 1 UL channel access procedure. If the UE transmits in one of the multiple transmission occasions after accessing the channel according to Type 1 UL channel access procedure, the UE may continue transmission in the remaining transmission occasions in the set, wherein each transmission occasion starts at the starting symbol of a configured grant PUSCH within the duration of the COT.

If a UE is configured by the gNB to transmit a set of consecutive UL transmissions without gaps including PUSCH, periodic PUCCH, or periodic SRS and the UE transmits one of the configured UL transmissions in the set after accessing the channel according to Type 1 UL channel access procedures, the UE may continue transmission of the remaining UL transmissions in the set, if any.

A UE is not expected to be indicated with different channel access types for any consecutive UL transmissions without gaps in between the transmissions, except if Type 2B or Type 2C UL channel access procedures are identified for the first of the consecutive UL transmissions.

For UL transmission(s) with multiple starting positions scheduled by eNB, the following are applicable:

If a UE is scheduled by an eNB to transmit transmissions including PUSCH Mode 1 using the Type 1 channel access procedure indicated in DCI, and if the UE cannot access the channel for a transmission according to the PUSCH starting position indicated in the DCI, the UE shall attempt to make a transmission at symbol 7 in the same subframe according to Type 1 channel access procedure. There is no limit on the number of attempts the UE can make using Type 1 channel access procedure.

If a UE is scheduled by an eNB to transmit transmissions including PUSCH Mode 1 using the Type 2 channel access procedure indicated in DCI, and if the UE cannot access the channel for a transmission according to the PUSCH starting position indicated in the DCI, the UE may attempt to make a transmission at symbol 7 in the same subframe and according to Type 2 channel access procedure. The number of attempts the UE should make within the consecutively scheduled subframes including the transmission is limited to w+1, where w is the number of consecutively scheduled subframes using Type 2 channel access procedure.

For contiguous UL transmissions(s) including a transmission pause, the following are applicable:

If a UE is scheduled to transmit a set of consecutive UL transmissions without gaps using one or more UL grant(s), and if the UE has stopped transmitting during or before one of these UL transmissions in the set and prior to the last UL transmission in the set, and if the channel is sensed by the UE to be continuously idle after the UE has stopped transmitting, the UE may transmit a later UL transmission in the set using Type 2 channel access procedures or Type 2A UL channel access procedures without applying a CP extension.

If a channel sensed by a UE is not continuously idle after the UE has stopped transmitting, the UE may transmit a later UL transmission in the set using Type 1 channel access procedure with the UL channel access priority class indicated in the DCI corresponding to the UL transmission.

For UL transmission(s) following autonomous UL transmission(s), the following are applicable:

If a UE is scheduled by an eNB to transmit on channel $c_i$ by a UL grant received on channel $c_j$, $i \neq j$, and if the UE is transmitting using autonomous UL on channel $c_i$, the UE shall terminate the ongoing PUSCH transmissions using the autonomous UL at least one subframe before the UL transmission according to the received UL grant.

If a UE is scheduled by a UL grant received from an eNB on a channel to transmit a PUSCH transmission(s) starting from subframe n on the same channel using Type 1 channel access procedure and if at least for the first scheduled subframe occupies $$N_{RB}^{UL}$$

resource blocks and the indicated PUSCH starting position is OFDM symbol zero, and if the UE starts autonomous UL transmissions before subframe n using Type 1 channel access procedure on the same channel, the UE may transmit UL transmission(s) according to the received UL grant from subframe n without a gap, if the priority class value of the performed channel access procedure is larger than or equal to priority class value indicated in the UL grant, and the autonomous UL transmission in the subframe preceding subframe n shall end at the last OFDM symbol of the subframe regardless of the higher layer parameter ending-SymbolAUL. The sum of the lengths of the autonomous UL transmission(s) and the scheduled UL transmission(s) shall not exceed the maximum channel occupancy time corresponding to the priority class value used to perform the autonomous uplink channel access procedure. Otherwise, the UE shall terminate the ongoing autonomous UL transmission at least one subframe before the start of the UL transmission according to the received UL grant on the same channel.

For UL transmission(s) following configured grant UL transmission(s), the following are applicable:

If a UE is scheduled to transmit UL transmission(s) starting from symbol i in slot n using Type 1 channel access procedures without CP extension with a corresponding CAPC, and if the UE starts configured grant UL transmissions before symbol i in slot n using Type 1 channel access procedures with a corresponding CAPC, and the scheduled UL transmission(s) occupies all the RBs of the same channels occupied by the configured grant UL transmission(s) or all the RBs of a subset thereof, the UE may directly continue to transmit the scheduled UL transmission(s) to the corresponding CAPC from symbol i in slot n without a gap, if the CAPC value of the performed channel access procedure is larger than or equal to the CAPC value corresponding to the scheduled UL transmission(s). The sum of the transmission durations of the configured grant UL transmission(s) and the scheduled UL transmission(s) shall not exceed the MCOT duration corresponding to the CAPC value used to transmit the configured grant UL transmission(s). Otherwise, the UE shall terminate the configured grant UL transmission(s) by dropping the transmission on the symbols of at least the last configured grant UL transmission before symbol i in slot n and attempt to transmit the scheduled UL transmission(s) according to the corresponding CAPC. The symbols of the PUSCH transmission with a configured grant in a slot is dropped according to the mechanism in Clause 11.1 of TS 38.213 relative to a last symbol of a CORESET where the UE detected the scheduling DCL. In this case, if the UE cannot terminate the configured grant UL transmission(s), the UE ignores the scheduling DCI.

Regarding conditions for maintaining Type 1 UL channel access procedures, if a UE receives a DCI indicating a UL grant scheduling a PUSCH transmission using Type 1 channel access procedures or indicating a DL assignment scheduling a PUCCH transmission using Type 1 channel access procedures, and if the UE has an ongoing Type 1 channel access procedures before the PUSCH or PUCCH transmission starting time:

If the UL channel access priority class value $p_1$ used for the ongoing Type 1 channel access procedures is same or larger than the UL channel access priority class value $p_2$ indicated in the DCI, the UE may transmit the PUSCH transmission in response to the UL grant by accessing the channel by using the ongoing Type 1 channel access procedure.

If the UL channel access priority class value $p_1$ used for the ongoing Type 1 channel access procedure is smaller than the UL channel access priority class value $p_2$ indicated in the DCI, the UE shall terminate the ongoing channel access procedure.

The UE may transmit the PUCCH transmission in response to the DL grant by accessing the channel by using the ongoing Type 1 channel access procedures.

Regarding conditions for indicating Type 2 channel access procedures, An eNB/gNB may indicate Type 2 channel access procedures in the DCI of a UL grant or DL assignment scheduling transmission(s) including PUSCH on one or more channels or PUCCH on a channel, respectively, as follows:

If the UL transmissions occur within the time interval starting at to and ending at to $+T_{CO}$, where $$T_{CO} = T_{mcot,p} + T_g,$$

$t_0$ is the time instant when the eNB/gNB has started transmission on the carrier according to the channel access procedure described in clause 4.1.1, $T_{m\,cot,p}$ value is determined by the eNB/gNB as described in clause 4.1.1, $T_g$ is the total duration of all gaps of duration greater than 25 us that occur between the DL transmission of the eNB/gNB and UL transmissions scheduled by the eNB/gNB, and between any two UL transmissions scheduled by the eNB/gNB starting from $t_0$, then, the eNB/gNB may indicate Type 2 channel access procedures in the DCI if the eNB/gNB has transmitted on the channel(s) according to the channel access procedures described in clause 4.1.1 or the multi-channel access procedures in clause 4.1.6, or the eNB may indicate using the 'UL duration and offset' field that the UE may perform a Type 2 channel access procedure for transmissions(s) including PUSCH on a channel in a subframe n when the eNB has transmitted on the channel according to the channel access procedure described in clause 4.1.1, or the eNB may indicate using the 'UL duration and offset' field and 'COT sharing indication for AUL' field that a UE configured with autonomous UL may perform a Type 2 channel access procedure for autonomous UL transmissions(s) including PUSCH on a channel in subframe n when the eNB has transmitted on the channel according to the channel access procedure described in clause 4.1.1 and acquired the channel using the largest priority class value and the eNB transmission includes PDSCH, or the eNB/gNB may schedule UL transmissions on a channel, that follow a transmission by the eNB/gNB on that channel with Type 2A channel access procedures for the UL transmissions as described in clause 4.2.1.2.1 after a duration of 25 us.

The eNB/gNB shall schedule UL transmissions between to and to $+T_{CO}$ without gaps between consecutive UL transmissions if they can be scheduled contiguously. For a UL transmission on a channel that follows a transmission by the eNB/gNB on that channel using Type 2A channel access procedures as described in clause 4.2.1.2.1, the UE may use Type 2A channel access procedure for the UL transmission.

If the eNB/gNB indicates Type 2 channel access procedure for the UE in the DCI, the eNB/gNB indicates the channel access priority class used to obtain access to the channel in the DCL. For indicating a Type 2 channel access procedure, if the gap is at least 25 us, or equal to 16 us, or up to 16 us, the gNB may indicate Type 2A, or Type 2B, or Type 2C UL channel procedures, respectively, as described in clauses 4.2.1.2.

Regarding Channel access procedures for UL multi-channel transmission(s), if a UE is scheduled to transmit on a set of channels C, and if Type 1 channel access procedure is indicated by the UL scheduling grants for the UL transmissions on the set of channels C, and if the UL transmissions are scheduled to start transmissions at the same time on all channels in the set of channels C, or intends to perform an uplink transmission on configured resources on the set of channels C with Type 1 channel access procedure, and if UL transmissions are configured to start transmissions on the same time all channels in the set of channels C, and if the channel frequencies of set of channels C is a subset of one of the sets of channel frequencies the UE may transmit on channel $c_i \in C$ using Type 2 channel access procedure as described in clause 4.2.1.2, if Type 2 channel access procedure is performed on channel $c_i$ immediately before the UE transmission on channel $c_j \in C$, $i \neq j$, and if the UE has accessed channel $c_j$ using Type 1 channel access procedure as described in clause 4.2.1.1, where channel $c_j$ is selected by the UE uniformly randomly from the set of channels C before performing Type 1 channel access procedure on any channel in the set of channels C.

if a UE is configured without intra-cell guard band(s) on a UL bandwidth part ("BWP"), the UE may not transmit on a channel within the bandwidth of the carrier, if the UE fails to access any of the channels of the UL BWP.

otherwise, the UE may not transmit on channel $c_i \in C$ within the bandwidth of a carrier, if the UE fails to access any of the channels, of the carrier bandwidth, on which the UE is scheduled or configured by UL resources.

Regarding Type 1 UL channel access procedure, this clause describes channel access procedures by a UE where the time duration spanned by the sensing slots that are sensed to be idle before a UL transmission(s) is random. The clause is applicable to the following transmissions:

PUSCH/SRS transmission(s) scheduled or configured by eNB/gNB, or

PUCCH transmission(s) scheduled or configured by gNB, or

Transmission(s) related to random access procedure.

A UE may transmit the transmission using Type 1 channel access procedure after first sensing the channel to be idle during the slot durations of a defer duration $T_d$, and after the counter N is zero in step 4. The counter N is adjusted by sensing the channel for additional slot duration(s) according to the steps described below.

1. set $N=N_{init}$, where $N_{init}$ is a random number uniformly distributed between 0 and $CW_p$, and go to step 4;

2. if N>0 and the UE chooses to decrement the counter, set N=N−1;

3. sense the channel for an additional slot duration, and if the additional slot duration is idle, go to step 4; else, go to step 5;

4. if N=0, stop; else, go to step 2.

5. sense the channel until either a busy slot is detected within an additional defer duration $T_d$ or all the slots of the additional defer duration $T_d$ are detected to be idle;

6. if the channel is sensed to be idle during all the slot durations of the additional defer duration $T_d$, go to step 4; else, go to step 5.

If a UE has not transmitted a UL transmission on a channel on which UL transmission(s) are performed after step 4 in the procedure above, the UE may transmit a transmission on the channel, if the channel is sensed to be idle at least in a sensing slot duration $T_{sl}$ when the UE is ready to transmit the transmission and if the channel has been sensed to be idle during all the slot durations of a defer duration $T_d$ immediately before the transmission. If the channel has not been sensed to be idle in a sensing slot duration $T_{sl}$ when the UE first senses the channel after it is ready to transmit, or if the channel has not been sensed to be idle during any of the sensing slot durations of a defer duration $T_d$ immediately before the intended transmission, the UE proceeds to step 1 after sensing the channel to be idle during the slot durations of a defer duration $T_d$.

The defer duration $T_d$ consists of duration $T_f=16$ us immediately followed by $m_p$ consecutive slot durations where each slot duration is $T_{sl}=9$ us, and $T_f$ includes an idle slot duration $T_{sl}$ at start of $T_f$.

$CW_{min,p} \leq CW_p \leq CW_{max,p}$ is the contention window. $CW_p$ adjustment is described in clause 4.2.2. $CW_{min,p}$ and $CW_{max,p}$ are chosen before step 1 of the procedure above. $m_p$, $CW_{min,p}$, and $CW_{max,p}$ are based on a channel access priority class p as shown in Table 4.2.1-1, that is signalled to the UE.

Regarding Type 2 UL channel access procedure, this clause describes channel access procedures by UE where the time duration spanned by the sensing slots that are sensed to be idle before a UL transmission(s) is deterministic. If a UE is indicated by an eNB to perform Type 2 UL channel access procedures, the UE follows the procedures described below.

Regarding Type 2A UL channel access procedure, if a UE is indicated to perform Type 2A UL channel access procedures, the UE uses Type 2A UL channel access procedures for a UL transmission. The UE may transmit the transmission immediately after sensing the channel to be idle for at least a sensing interval $T_{short\_ul}=25$ us. $T_{short\_ul}$ consists of a duration $T_f=16$ us immediately followed by one slot sensing slot and $T_f$ includes a sensing slot at start of $T_f$. The channel is considered to be idle for $T_{short\_ul}$ if both sensing slots of $T_{short\_ul}$ are sensed to be idle.

Regarding Type 2B UL channel access procedure, if a UE is indicated to perform Type 2B UL channel access procedures, the UE uses Type 2B UL channel access procedure for a UL transmission. The UE may transmit the transmission immediately after sensing the channel to be idle within a duration of $T_f=16$ us. $T_f$ includes a sensing slot that occurs within the last 9 us of $T_f$. The channel is considered to be idle within the duration $T_f$ if the channel is sensed to be idle for total of at least 5 us with at least 4 us of sensing occurring in the sensing slot.

Regarding Type 2C UL channel access procedure, if a UE is indicated to perform Type 2C UL channel access procedures for a UL transmission, the UE does not sense the channel before the transmission. The duration of the corresponding UL transmission is at most 584 us.

Regarding contention window adjustment procedures, if a UE transmits transmissions using Type 1 channel access procedures that are associated with channel access priority class p on a channel, the UE maintains the contention window value $CW_p$ and adjusts $CW_p$ for those transmissions before step 1 of the procedure described in clause 4.2.1.1, as described in this clause.

Regarding contention window adjustment procedures for UL transmissions scheduled/configured by eNB, If a UE transmits transmissions using Type 1 channel access procedures that are associated with channel access priority class p on a channel, the UE maintains the contention window value $CW_p$ and adjusts $CW_p$ for those transmissions before step 1 of the procedure described in clause 4.2.1.1, using the following procedure:

If the UE receives an UL grant or an AUL-DFI, the contention window size for all the priority classes is adjusted as following:

If the NDI value for at least one HARQ process associated with HARQ_ID_ref is toggled, or if the HARQ-ACK value(s) for at least one of the HARQ processes associated with HARQ_ID_ref received in the earliest AUL-DFI after $n_{ref}+3$ indicates ACK, for every priority class $p \in \{1,2,3,4\}$, set $CW_p=CW_{min,p}$;

Otherwise, increase $CW_p$ for every priority class $p \in \{1,2,3,4\}$ to the next higher allowed value;

If there exists one or more previous transmissions $\{T_0, \ldots, T_n\}$ using Type 1 channel access procedure, from the start subframe(s) of the previous transmission(s) of which, N or more subframes have elapsed and neither UL grant nor AUL-DFI was received, where N=max (contentionWindowSize Timer, $T_i$ burst length+1) if contentionWindowSizeTimer>0 and N=0 otherwise, for each transmission $T_i$, $CW_p$ is adjusted as following:

increase $CW_p$ for every priority class $p \in \{1,2,3,4\}$ to the next higher allowed value;

The $CW_p$ is adjusted once

Else if the UE transmits transmissions using Type 1 channel access procedure before N subframes have elapsed from the start of previous UL transmission burst using Type 1 channel access procedure and neither UL grant nor AUL-DFI is received, the $CW_p$ is unchanged.

If the UE receives an UL grant or an AUL-DFI indicates feedback for one or more previous transmissions $\{T_0, \ldots, T_n\}$ using Type 1 channel access procedure, from the start subframe(s) of the previous transmission(s) of which, N or more subframes have elapsed and neither UL grant nor AUL-DFI was received, where $N = \max(\text{contentionWindowSizeTimer}, T_i \text{ burst length}+1)$ if contentionWindowSizeTimer>0 and N=0 otherwise, the UE may recompute $CW_p$ as follows:

The UE reverts $CW_p$ to the value used to transmit at $n_{T0}$ using Type 1 channel access procedure.

The UE updates $CW_p$ sequentially in the order of the transmission $\{T_0, \ldots, T_n\}$ If the NDI value for at least one HARQ process associated with HARQ_ID_ref is toggled, or if the HARQ-ACK value(s) for at least one of the HARQ processes associated with HARQ_ID_ref received in the earliest AUL-DFI after $n_{Ti}+3$ indicates ACK, for every priority class $p \in \{1,2,3,4\}$ set $CW_p = CW_{min, p}$.

Otherwise, increase $CW_p$ for every priority class $p \in \{1, 2,3,4\}$ to the next higher allowed value.

If the UE transmits transmissions using Type 1 channel access procedure before N subframes have elapsed from the start of previous UL transmission burst using Type 1 channel access procedure and neither UL grant nor AUL-DFI is received, $CW_p$ is unchanged.

HARQ_ID_ref is the HARQ process ID of UL-SCH in reference subframe $n_{ref}$. The reference subframe $n_{ref}$ is determined as follows If the UE receives an UL grant or an AUL-DFI in subframe $n_g$, subframe $n_w$ is the most recent subframe before subframe $n_g-3$ in which the UE has transmitted UL-SCH using Type 1 channel access procedure.

If the UE transmits transmissions including UL-SCH without gaps starting with subframe $n_0$ and in subframes $n_0, n_1, \ldots, n_w$ and the UL-SCH in subframe $n_0$ is not PUSCH Mode 1 that starts in the second slot of the subframe, reference subframe $n_{ref}$ is subframe $n_0$.

If the UE transmits transmissions including PUSCH Mode 1 without gaps starting with second slot of subframe $n_0$ and in subframes $n_0, n_1, \ldots, n_w$ and the, reference subframe $n_{ref}$ is subframe $n_0$ and $n_1$, otherwise, reference subframe $n_{ref}$ is subframe $n_w$.

HARQ_ID_ref is the HARQ process ID of UL-SCH in reference subframe $n_{Ti}$. The reference subframe $n_{Ti}$ is determined as the start subframe of a transmission $T_i$ using Type 1 channel access procedure and of which, N subframes have elapsed and neither UL grant nor AUL-DFI was received.

If the AUL-DFI with DCI format 0A is indicated to a UE that is activated with AUL transmission and transmission mode 2 is configured for the UE for grant-based uplink transmissions, the spatial HARQ-ACK bundling shall be performed by logical OR operation across multiple codewords for the HARQ process not configured for autonomous UL transmission.

If $CW_p$ changes during an ongoing channel access procedure, the UE shall draw a counter $N_{init}$ and applies it to the ongoing channel access procedure. The UE may keep the value of $CW_p$ unchanged for every priority class $p \in \{1,2,3,4\}$, if the UE scheduled to transmit transmissions without gaps including PUSCH in a set subframes $n_0, n_1, \ldots, n_{w-1}$ using Type 1 channel access procedure, and if the UE is not able to transmit any transmission including PUSCH in the set of subframes. The UE may keep the value of $CW_p$ for every priority class $p \in \{1,2,3,4\}$ the same as that for the last scheduled transmission including PUSCH using Type 1 channel access procedure, if the reference subframe for the last scheduled transmission is also $n_{ref}$.

Regarding contention window adjustment procedures for UL transmissions scheduled/configured by gNB, If a UE transmits transmissions using Type 1 channel access procedures that are associated with channel access priority class p on a channel, the UE maintains the contention window value $CW_p$ and adjusts $CW_p$ for those transmissions before step 1 of the procedure described in clause 4.2.1.1, using the following steps:

1. For every priority class $p \in \{1,2,3,4\}$, set $CW_p = CW_{min,p}$;

2. If HARQ-ACK feedback is available after the last update of $CW_p$, go to step 3. Otherwise, if the UE transmission after procedure described in clause 4.2.1.1 does not include a retransmission or is transmitted within a duration $T_w$ from the end of the reference duration corresponding to the earliest UL channel occupancy after the last update of $CW_p$, go to step 5; otherwise go to step 4.

3. The HARQ-ACK feedback(s) corresponding to PUSCH(s) in the reference duration for the latest UL channel occupancy for which HARQ-ACK feedback is available is used as follows:

a. If at least one HARQ-ACK feedback is 'ACK' for PUSCH(s) with transport block (TB) based feedback or at least 10% of HARQ-ACK feedbacks are 'ACK' for PUSCH CBGs transmitted at least partially on the channel with code block group (CBG) based feedback, go to step 1; otherwise go to step 4.

4. Increase $CW_p$ for every priority class $p \in \{1,2,3,4\}$ to the next higher allowed value;

5. For every priority class $p \in \{1,2,3,4\}$, maintain $CW_p$ as it is; go to step 2.

The HARQ-ACK feedback, reference duration and duration $T_w$ in the procedure above are defined as the following:

For the purpose of contention window adjustment in this clause, HARQ-ACK feedback for PUSCH(s) transmissions are expected to be provided to UE(s) explicitly or implicitly where explicit HARQ-ACK is determined based on the valid HARQ-ACK feedback in a corresponding CG-DFI, and implicit HARQ-ACK feedback is determined based on the indication for a new transmission or retransmission in the DCI scheduling PUSCH(s) as follows:

If a new transmission is indicated, 'ACK' is assumed for the transport blocks or code block groups in the corresponding PUSCH(s) for the TB-based and CBG-based transmission, respectively.

If a retransmission is indicated for TB-based transmissions, 'NACK' is assumed for the transport blocks in the corresponding PUSCH(s).

If a retransmission is indicated for CBG-based transmissions, if a bit value in the code block group transmission information (CBGTI) field is '0' or '1', 'ACK' or 'NACK' is assumed for the corresponding CBG in the corresponding PUSCH(s), respectively.

The reference duration corresponding to a channel occupancy initiated by the UE including transmission of PUSCH(s) is defined in this clause as a duration starting from the beginning of the channel occupancy until the end of the first slot where at least one PUSCH is transmitted over all the resources allocated for the PUSCH, or until the end of the first transmission burst by the UE that contains PUSCH(s) transmitted over all the resources allocated for the PUSCH, whichever occurs earlier. If the channel occupancy includes a PUSCH, but it does not include any PUSCH transmitted over all the resources allocated for that PUSCH, then, the duration of the first transmission burst by the UE within the channel occupancy that contains PUSCH(s) is the reference duration for CWS adjustment.

$T_w$=max ($T_A$, $T_B$+1 ms) where $T_B$ is the duration of the transmission burst from start of the reference duration in ms and $T_A$=5 ms if the absence of any other technology sharing the channel cannot be guaranteed on a long-term basis (e.g. by level of regulation), and $T_A$=10 ms otherwise.

If a UE transmits transmissions using Type 1 channel access procedures associated with the channel access priority class p on a channel and the transmissions are not associated with explicit or implicit HARQ-ACK feedbacks as described above in this clause, the UE adjusts $CW_p$ before step 1 in the procedures described in clause 4.2.1.1, using the latest $CW_p$ used for any UL transmissions on the channel using Type 1 channel access procedures associated with the channel access priority class p. If the corresponding channel access priority class p has not been for any UL transmission on the channel, $CW_p$=$CW_{min, p}$ is used.

Regarding common procedures for CWS adjustments for UL transmissions, the following applies to the procedures described in clauses 4.2.2.1 and 4.2.2.2:

If $CW_p$=$CW_{max,p}$, the next higher allowed value for adjusting $CW_p$ is $CW_{max,p}$.

If the $CW_p$=$CW_{max,p}$ is consecutively used K times for generation of $N_{init}$, $CW_p$ is reset to $CW_{min,p}$ only for that priority class p for which $CW_p$=$CW_{max,p}$ is consecutively used K times for generation of $N_{init}$. K is selected by UE from the set of values {1, 2, . . . , 8} for each priority class p∈{1,2,3,4}.

Regarding energy detection threshold adaptation procedure, a UE accessing a channel on which UL transmission(s) are performed, shall set the energy detection threshold ($X_{Thresh}$) to be less than or equal to the maximum energy detection threshold $X_{Thresh\_max}$. $X_{Thresh\_max}$ is determined as follows:

If the UE is configured with higher layer parameter maxEnergyDetectionThreshold-r14 or maxEnergyDetectionThreshold-r16, $X_{Thresh\_max}$ is set equal to the value signalled by the higher layer parameter;

otherwise the UE shall determine $X'_{Thresh\_max}$ according to the procedure described in clause 4.2.3.1;

if the UE is configured with higher layer parameter energyDetectionThresholdOffset-r14 or energyDetectionThresholdOffset-r16

$X_{Thresh\_max}$ is set by adjusting $X'_{Thresh\_max}$ according to the offset value signalled by the higher layer parameter;

otherwise the UE shall set $X_{Thresh\_max}$=$X'_{Thresh\_max}$.

If the higher layer parameter absenceOfAnyOtherTechnology-r16 is not configured to a UE, and the higher layer parameter ul-toDL-COT-SharingED-Threshold-r16 is configured to the UE, the gNB should use the gNB's transmit power in determining the resulting energy detection threshold ul-toDL-COT-SharingED-Threshold-r16.

For the case where a UE performs channel access procedures as described in clause 4.2.1.1 for a UL transmission and CG-UCI is absent in the UL transmission or CG-UCI is present in the UL transmission and indicates COT-sharing information other than 'COT sharing not available', $X_{Thresh\_max}$ is set equal to the value provided by the higher layer parameter ul-toDL-COT-SharingED-Threshold-r16, if provided.

Regarding default maximum energy detection threshold computation procedure, if the higher layer parameter absenceOfAnyOtherTechnology-r14 or absenceOfAnyOtherTechnology-r16 is provided $$X'_{Thresh\_max} = \min \left\{ \begin{array}{l} T_{max} + 10 \text{ dB} \\ X_r \end{array} \right\}$$

$X_r$ is Maximum energy detection threshold defined by regulatory requirements in dBm when such requirements are defined, otherwise $X_r$=$T_{max}$+10 dB otherwise $$X'_{Thresh\_max} =$$

$$\max \left\{ \begin{array}{l} -72 + 10 \cdot \log 10 (BWMHz/20 \text{ MHz}) \text{ dBm,} \\ \min \left\{ \begin{array}{l} T_{max}, \\ T_{max} - T_A + (P_H + 10 \cdot \log 10 (BWMHz/20 \text{ MHz}) - P_{TX}) \end{array} \right\} \end{array} \right\}$$

where $T_A$=10 dB;

$P_H$=23 dBm;

$P_{TX}$ is the set to the value of $P_{CMAX\_H,c}$ as defined in [3];

$T_{max}$ (dBm)=10·log 10 (3.16228·10$^{-8}$ (mW/MHz)· BWMHz (MHz));

BWMHz is the single channel bandwidth in MHz.

Regarding channel access procedures for semi-static channel occupancy, channel access procedures based on semi-static channel occupancy as described in this Clause, are intended for environments where the absence of other technologies is guaranteed e.g., by level of regulations, private premises policies, etc. If a gNB provides UE(s) with higher layer parameters ChannelAccessMode-r16 'semi-static' by SIB1 or dedicated configuration, a periodic channel occupancy can be initiated by the gNB every $T_x$ within every two consecutive radio frames, starting from the even indexed radio frame at i·$T_x$ with a maximum channel occupancy time $T_y$=0.95$T_x$, where $T_x$=period in ms, is a higher layer parameter provided in SemiStaticChannelAccessConfig and i∈

$$\left\{ 0, 1, \dots , \frac{20}{T_x} - 1 \right\}.$$

For determining a Channel Occupancy Time based on semi-static channel access procedures, duration of any transmission gap within $T_y$ is counted in the channel occupancy time.

In the following procedures in this clause, when a gNB or UE performs sensing for evaluating a channel availability, the sensing is performed at least during a sensing slot duration $T_{sl}$=9 us. The corresponding $X_{Thresh}$ adjustment for performing sensing by a gNB or a UE is described in clauses 4.1.5 and 4.2.3, respectively.

A channel occupancy initiated by a gNB and shared with UE(s) satisfies the following:

The gNB shall transmit a DL transmission burst starting at the beginning of the channel occupancy time immediately after sensing the channel to be idle for at least a sensing slot duration $T_{sl}$=9 us. If the channel is sensed to be busy, the gNB shall not perform any transmission during the current period.

The gNB may transmit a DL transmission burst(s) within the channel occupancy time immediately after sensing the channel to be idle for at least a sensing slot duration $T_{sl}$=9 us if the gap between the DL transmission burst(s) and any previous transmission burst is more than 16 us.

The gNB may transmit DL transmission burst(s) after UL transmission burst(s) within the channel occupancy time without sensing the channel if the gap between the DL and UL transmission bursts is at most 16 us.

A UE may transmit UL transmission burst(s) after detection of a DL transmission burst(s) within the channel occupancy time as follows:

If the gap between the UL and DL transmission bursts is at most 16 us, the UE may transmit UL transmission burst(s) after a DL transmission burst(s) within the channel occupancy time without sensing the channel.

If the gap between the UL and DL transmission bursts is more than 16 us, the UE may transmit UL transmission burst(s) after a DL transmission burst(s) within the channel occupancy time after sensing the channel to be idle for at least a sensing slot duration $T_{sl}$=9 us within a 25 us interval ending immediately before transmission.

A UE may be indicated by the gNB to transmit UL transmission burst(s) within the channel occupancy time without sensing the channel or after sensing the channel to be idle for at least a sensing slot duration $T_{sl}$=9 us within a 25 us interval ending immediately before transmission.

The gNB and UEs shall not transmit any transmissions in a set of consecutive symbols for a duration of at least $T_z$=max($0.05T_x$, 100 us) before the start of the next period.

If a UE fails to access the channel(s) prior to an intended UL transmission to a gNB, Layer 1 notifies higher layers about the channel access failure.

Figure 3A:
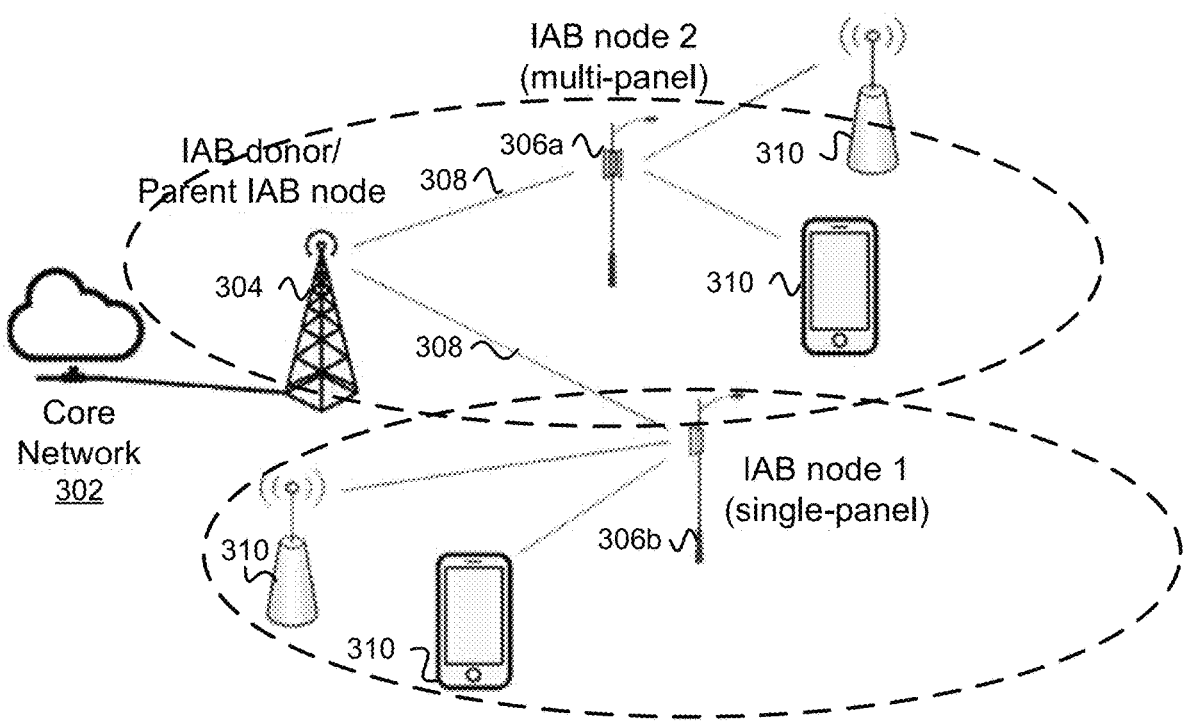
FIG. 3A illustrates an example of an IAB system with single-panel and multi-panel JAB nodes.

In general, an IAB system is connected to a core network 302 through one or multiple IAB donors 304. Each IAB node 306 may be connected to an IAB donor 304 and/or other IAB nodes 306 through wireless backhaul links 308. Each IAB donor/node 304 may also serve UEs 310. Consider the example IAB system illustrated in FIG. 3A.

| Case# | Architecture/ Capability | Simultaneous TX/RX Type | IAB-MT | IAB-DU | Scenario# |
|---|---|---|---|---|---|
| Case A/ | Single-panel | TX SDM | UL-TX | DL-TX | S3 |
| Case#1 | Multi-panel | TX MPTR/SDM | UL-TX | DL-TX | S7 |
| Case B/ | Single-panel | RX SDM | DL-RX | UL-RX | S1 |
| Case#2 | Multi-panel | RX MPTR/SDM | DL-RX | UL-RX | S5 |
| Case C/ | Single-panel | UL FD | UL-TX | UL-RX | S4 |
| Case#3 | Multi-panel | UL MPTR/FD | UL-TX | UL-RX | S8 |
| Case D/ | Single-panel | DL FD | DL-RX | DL-TX | S2 |
| Case#4 | Multi-panel | DL MPTR/FD | DL-RX | DL-TX | S6 |

There are various options with regards to the structure and multiplexing/duplexing capabilities of an IAB node 306. For example, each IAB node 306 may have one 306a or multiple 306b antenna panels, each connected to the baseband unit through an RF chain. The one or multiple antenna panels may be able to serve a wide spatial area of interest in a vicinity of the IAB node 306, or otherwise each antenna panel or each group of antenna panels may provide a partial coverage such as a "sector." An IAB node with multiple antenna panels 306a, each serving a separate spatial area or sector, may still be referred to as a single-panel IAB node 306b as it behaves similarly to a single-panel IAB node 306b for communications in each of the separate spatial areas or sectors.

Furthermore, each antenna panel may be half-duplex ("HD"), meaning that it is able to either transmit or receive signals in a frequency band at a time, or full-duplex ("FD"), meaning that it is able to both transmit and receive signals in a frequency band simultaneously. Unlike full-duplex radio, half-duplex radio is widely implemented and used in practice and is usually assumed as the default mode of operation in wireless systems.

The table above lists different duplexing scenarios of interest when multiplexing is not constrained to TDM. In this table, single-panel and multi-panel IAB nodes are considered for different cases of simultaneous transmission and/or reception. Spatial-division multiplexing ("SDM") refers to either transmission or reception on downlink (or downstream) and uplink (or upstream) simultaneously; full duplex ("FD") refers to simultaneous transmission and reception by a same antenna panel in a frequency band; and multi-panel transmission and reception ("MPTR") refers to simultaneous transmission and/or reception by multiple antenna panels where each antenna panel either transmits or receives in a frequency band at a time.

Figure 3B:
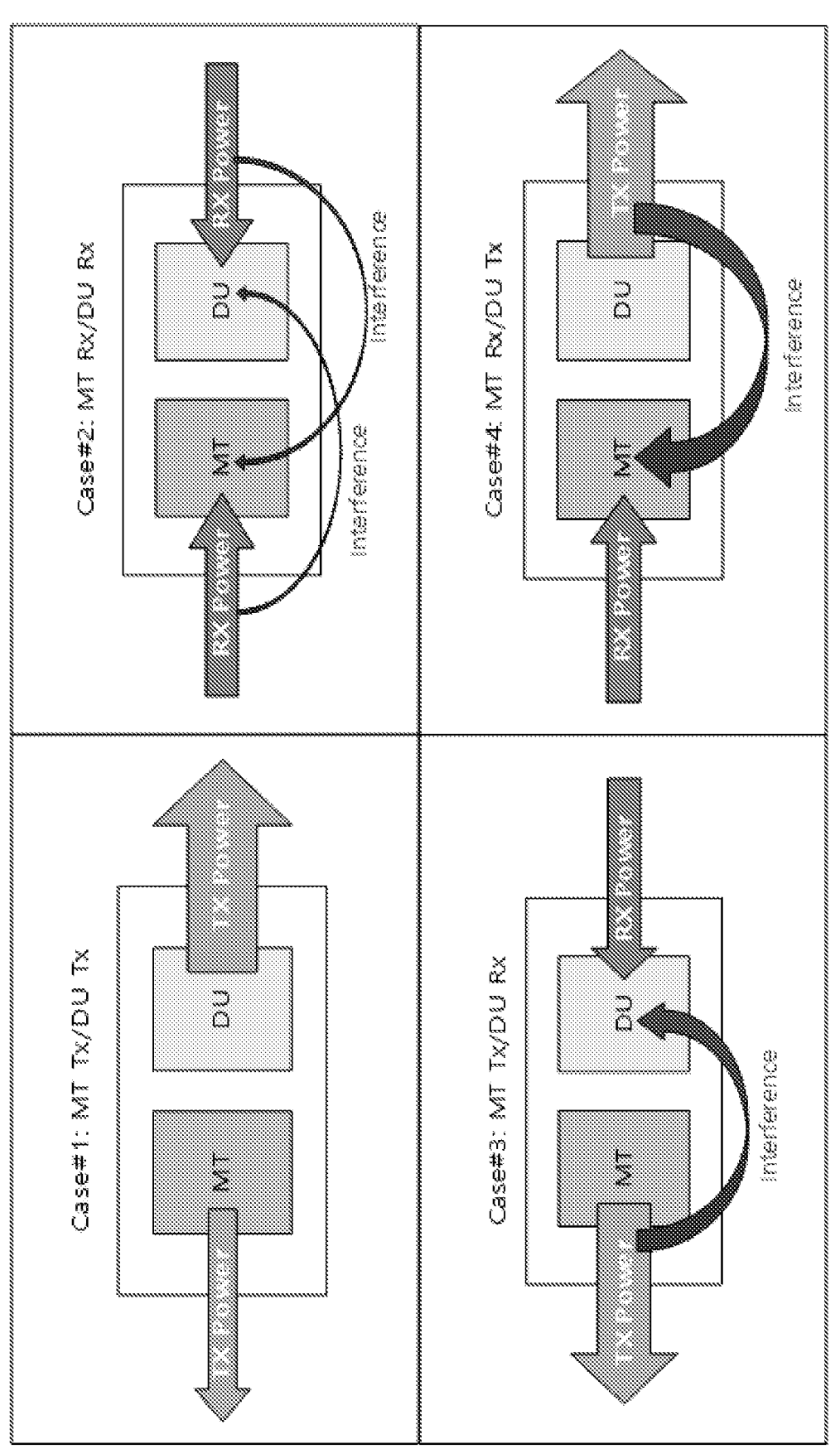
FIG. 3B illustrates scenarios of simultaneous transmission and/or reception operations.

In the above table, based on the type of simultaneous operations and the number of panels in an IAB node, the scenarios are called S1, S2, . . . , S8 in accordance with our previous disclosures, while the "Case" numbers (A/B/C/D or 1/2/3/4) are in accordance with the RAN1 #102-e agreements in the Chairman's Notes as illustrated in FIG. 3B.

In this disclosure, scenarios may be referred to by their Case #or Scenario #according to the presented table. In this section, systems and methods are proposed to take advantage of DU collocation for channel access in unlicensed spectrum.

Figure 4:
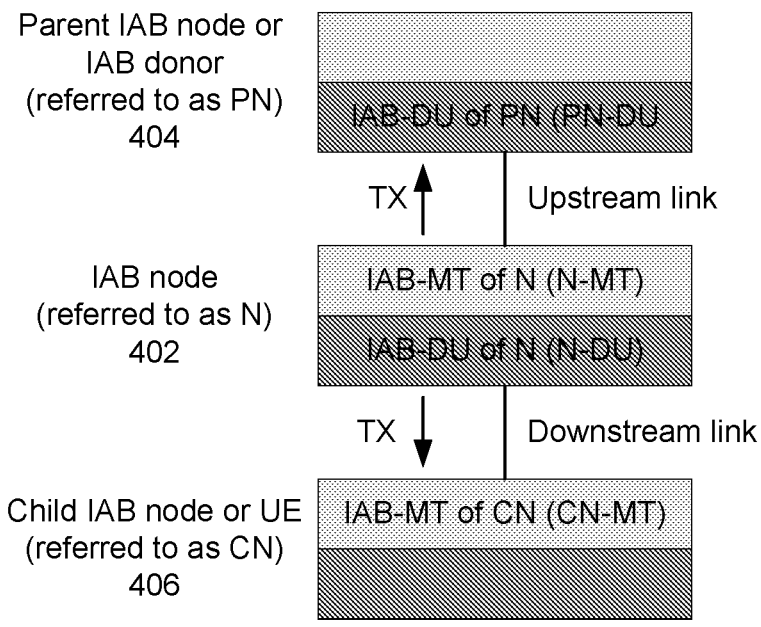
FIG. 4 illustrates an example scenario of a subject IAB node performing communications with a parent node or IAB donor in the IAB node's upstream and a child node or UE in the JAB node's downstream.

Consider the scenario illustrated in FIG. 4. In this scenario, an IAB node 402 communicates with a parent IAB node/donor 404 (referred to as the parent node herein) and a child IAB node 406 or UE (referred to as the child node herein). In the present disclosure:

the IAB node 402 may be connected to multiple parent nodes 404 and/or child nodes/UEs 406;

the IAB node 402 may comprise multiple IAB-MTs and/or multiple IAB-DUs;

the parent node 404, the IAB node 402, and the child node 406 may be referred to as PN, N, and CN, respectively;

an IAB-DU or PN, an IAB-MT of N, an IAB-DU of N, and an IAB-MT of CN may be referred to as PN-DU, N-MT, N-DU, and CN-MT, respectively.

In the next sections, N-DU and N-MT may be referred to as IAB-DU and IAB-MT, respectively.

Unless stated otherwise, definitions related to channel access such as those related to mechanisms for sensing, backoff, and transmission of signals are assumed according to how the terms are understood in the related literature including TS 37.213 as cited above. In some cases, a definition may be applied, but with a different value for a related parameter. One particular example is that the parameter values specified in TS 37.213 may be applied to one frequency band while other values may be applied for a millimeter-wave frequency band as proposed by embodiments of this disclosure.

Additionally, the following definitions and terms are used herein:

Instead of transmitting a transmission, which is a phrase recurringly used in some standard specification documents, transmitting a signal is used.

Instead of sensing a channel, sensing a medium is used more frequently in order to avoid confusing a channel according to the definition in TS 37.213 as a part of the spectrum with the more common definition of a channel in standard specifications such as physical control channels and physical shared channels.

A sensing/LBT/CCA/eCCA may be called successful if the medium/channel is sensed idle, while it may be called failed if the medium/channel is sensed busy. Definition of idle and busy may be determined by the standard according to a sensing process such as energy detection ("ED") with specified values for timing and ED threshold.

A symbol/slot "occurring" at a time may refer to a start time or end time of the symbol/slot occurring at the time, possibly plus or minus a tolerance interval. Particularly, a symbol may be called occurring at a time if the time is anytime from the start to the end of the symbol. The timing of a symbol may be determined with respect to a frame/subframe/slot timing determined with reference to synchronization signals, and possibly in association with a numerology parameter such as a subcarrier spacing ("SCS"), as specified in the standard.

Exponential-reset refers to a method of exponential increase of the contention window size in response to a continuing channel access failure, but a reset of the contention window size in response to a successful channel access.

Multiplicative-increase additive-decrease ("MIAD") is a possible alternative to exponential-reset, wherein the contention window size is multiplied by a factor in response to a channel access failure, but it is added to a negative value in response to a successful channel access.

Regarding methods for COT sharing, in various embodiments, a COT is shared between entities associated with one or multiple JAB nodes.

In some embodiments, the said entities may be functional entities such as an IAB-MT and an IAB-DU of an JAB node, multiple IAB-MTs, and/or multiple IAB-DUs.

In some embodiments, the said entities may be hardware entities such as transceivers comprising digital and/or analog components, e.g., baseband units, RF chains, and antennas. In several embodiments, the entities may or may not be collocated according to an implementation/deployment, signaling, and/or standard specification.

In some embodiment, the said entities may be frequency carriers, bandwidth parts (BWPs), channels, and/or signals distinguished by an attribute in a signal domain such as time, frequency, space, and/or code. Additionally, or alternatively, the said entities may be distinguished by an implementation, signaling, and/or standard specification.

In some embodiments, a combination of the above may be applicable. For example, a COT may be shared between a first channel associated with an IAB-MT and a second channel associated with an IAB-DU, wherein the IAB-MT and the IAB-DU may or may not share hardware such as a baseband unit, an RF channel, and/or an antenna.

Regarding DU-to-MT COT sharing, in some embodiments, two or more functional entities may share a COT. In one embodiment, in a first step, an IAB-DU may obtain a COT, wherein the obtaining of the COT may comprise at least one of the following:

a Cat1 access by the IAB-DU: In this case, the IAB-DU may obtain the COT by transmitting a downlink signal or burst without sensing the medium.

a Cat2 LBT by the IAB-DU: In this case, the IAB-DU may obtain the COT by transmitting a downlink signal or burst following a sensing by the IAB-DU without a random backoff.

a Cat3 LBT by the IAB-DU: In this case, the IAB-DU may obtain the COT by transmitting a downlink signal or burst following a sensing by the IAB-DU with a random backoff within a fixed contention window size ("CWS").

a Cat4 LBT by the IAB-DU: In this case, the IAB-DU may obtain the COT by transmitting a downlink signal or burst following a sensing by the IAB-DU with a random backoff within a variable CWS. The CWS adaptation may follow an exponential-reset scheme, a multiplicative-increase additive-decrease scheme, or the like.

a Cat2 LBT by a child IAB-MT ("CN-MT") or a UE: In this case, the IAB-DU may obtain the COT by transmitting a downlink signal or burst following a sensing by the CN-MT or UE without a random backoff.

a Cat3 LBT by a child IAB-MT ("CN-MT") or a UE: In this case, the IAB-DU may obtain the COT by transmitting a downlink signal or burst following a sensing by the CN-MT or UE with a random backoff within a fixed CWS.

a Cat4 LBT by a child IAB-MT ("CN-MT") or a UE: In this case, the IAB-DU may obtain the COT by transmitting a downlink signal or burst following a sensing by the CN-MT or UE with a random backoff within a variable CWS. The CWS adaptation may follow an exponential-reset scheme, a multiplicative-increase additive-decrease scheme, or the like.

In cases 5/6/7, the CN-MT or UE may perform the LBT following a standard specification, a configuration by an IAB-CU, a signaling by the IAB-DU, or a combination thereof.

In the first step, the signal or burst is normally in a downlink, i.e., to a child node or a UE. In cases 5/6/7, the child node or UE to which the IAB-DU transmits a signal or burst may be the same as the child node or UE that performs the sensing (LBT).

The COT may be constrained by a maximum channel occupancy time ("MCOT") $T_{m\ cot,p}$, which may be specified by the standard, configured by an IAB-CU, signaled by a parent node, or a combination thereof.

The IAB-DU continues to transmit the said downlink signal or burst, possibly followed by successive transmission(s) of more downlink signals or bursts.

Next, in a second step, an IAB-MT may use the COT by transmitting an uplink signal or burst to a parent node (PN-DU). Different realizations are possible such as the following examples.

Regarding realization with TDM, in some realizations, IAB-DU and IAB-MT transmissions are time-division multiplexed ("TDM"). In one such realization, resources may be partitioned among IAB-DU(s) and IAB-MT(s) of an IAB node in the time domain, for example by TDD-Config IEs from the IAB-CU, such that TDM among IAB-DU and IAB-MT transmissions is ensured by configuration. Then, if the IAB-DU obtains the COT in a first resource partition configured for the IAB-DU and the COT continues after the end of the first resource partition, the IAB-MT may obtain the remaining duration of the COT provided that a second resource partition configured for the IAB-MT follows the first resource partition and a starting symbol of the second partition occurs before the end of the COT.

In another realization, the IAB-MT may obtain the remaining duration of the COT if the starting symbol of a second resource partition configured for the IAB-MT occurs no later than a maximum gap after the last symbol of the first resource partition. The maximum gap (such as 16 us, 25 us, etc.) may be specified by the standard, configured by the network, indicated by an L1/L2 signaling, determined by whether another system using the same frequencies such as an IEEE 802.11ad/ay system exists in the vicinity, or a combination thereof.

In yet another realization, the IAB-MT may obtain the remaining duration of the COT if the starting symbol of an uplink signal or burst to be transmitted by the IAB-MT occurs no later than a maximum gap after the last symbol of a latest downlink signal or burst transmitted by the IAB-DU. The maximum gap (such as 16 us, 25 us, etc.) may be specified by the standard, configured by the network, indicated by an L1/L2 signaling, determined by whether another system such as an IEEE 802.11ad/ay system exists in the vicinity, or a combination thereof.

In yet another realization, the IAB-MT may obtain the remaining duration of the COT if the said remaining duration, or a subset of it overlapping with the second resource partition, is not smaller than a threshold. The threshold may be specified, configured, and/or signaled in order to ensure a minimum COT for the IAB-MT. If the remaining duration is smaller than the threshold, the IAB-MT may not obtain the remaining duration.

In some realizations, if an IAB-MT obtains the remaining duration of a COT, it may extend the COT. In one such realization, the IAB-MT may extend the COT to the end of a second resource partition configured for the IAB-MT. In another realization, the IAB-MT may extend the COT to the end of a currently ongoing transmission at the moment the remaining duration of the COT ends.

In yet another realization, the IAB-MT may extend the COT such that the total COT by the IAB-DU and the IAB-MT does not exceed an MCOT. In yet another realization, a combination of the above may be applicable. In some realizations, whether an IAB-MT obtains the remaining duration of the COT, and/or whether the remaining duration is extended, may depend on a quality of service ("QoS") indication associated with the uplink signal or burst to be transmitted by the IAB-MT.

In some realizations, a TDM between an IAB-DU transmission and an IAB-MT transmission may not be realized by radio resource control ("RRC")/F1 resource partitioning, but instead, it may be realized by scheduling or other LT/L2 signaling (e.g., PDCCH DCI, MAC-CE signaling). In this case, a COT obtained by the IAB-DU may be dynamically shared with the IAB-MT provided that the transmissions do not overlap in the time domain. In some cases, a COT sharing by the IAB-DU with the IAB-MT based on an indication e.g., from the IAB-DU, or IAB-CU.

In one realization, the IAB-MT may use a remaining duration of a COT obtained by the IAB-DU by transmitting an uplink signal or burst if the transmissions do not overlap in the time domain. In another realization, the IAB-MT may additionally perform an LBT prior to starting an uplink transmission in a COT obtained by the IAB-DU. Then, if the IAB-DU intends to start another transmission after the IAB-MT transmission, it may perform an LBT.

In a general method, a dynamic sharing of the COT between the IAB-DU and the IAB-MT may be allowed if each transmission of the IAB-MT following an IAB-DU transmission is preceded by an LBT by the IAB-MT, and conversely, each transmission of the IAB-DU following an IAB-MT transmission is preceded by an LBT by the IAB-DU. Furthermore, a maximum time gap between the last symbol of an IAB-DU transmission (respectively, IAB-MT transmission) and the first symbol of a successive IAB-MT transmission (respectively, IAB-DU transmission) may be applicable, i.e., the COT may not be shared if the gap between two successive transmissions exceeds the maximum time gap. The maximum time gap may be specified, configured, signaled, determined by existence of another system using the same frequencies such as an IEEE 802.1 lad/ay system, or a combination thereof.

Regarding realization with FDM/SDM, in some realizations, IAB-DU and IAB-MT transmissions may overlap in time, for example according to a frequency-division multiplexing ("FDM") or a spatial-division multiple ("SDM") as specified in 3GPP Rel-17.

In one such realization, resources configured for IAB-DU(s) and IAB-MT(s) of an IAB node may overlap in the time domain. Then, if the IAB-DU obtains the COT, the IAB-DU may share a subset or all of the COT with the IAB-MT.

In another realization, resources configured for IAB-DU(s) and IAB-MT(s) of an IAB node may overlap in the time domain. However, COT sharing between IAB-DU and IAB-MT transmissions may occur if a condition on power, time gap, guard band, and the like is satisfied. Examples of such conditions are presented shortly.

Furthermore, in any of the realizations, collocation conditions and/or spatial constraints may be applicable to simultaneous transmissions of the IAB-DU and the IAB-MT as explained shortly.

Regarding signaling and behavior, a method of DU-to-MT COT sharing, as proposed earlier and further explained through example realizations, may be enabled by a standard specification, a configuration by a higher layer at such as RRC at the IAB-CU, a signaling by a lower layer (e.g., L1/L2 signaling), or a combination thereof.

The configuration may comprise an indication JAB-COT-Sharing-Allowed to the IAB node that a DU-to-MT COT sharing is allowed for the IAB node. The configuration is referred to as IAB-COT-Sharing-Config in the rest of this section.

In one realization, the indication may be associated with resources configured for the IAB-DU and/or the IAB-MT. In this case, the IAB node is allowed to perform DU-to-MT COT sharing if the IAB-DU transmissions and/or IAB-MT transmissions are performed on the said resources.

In another realization, the indication may be associated with periodic time durations, which may be indicated by a period value T, a time offset Torrset for the start of the time duration in each period, and a time duration value $T_{CS}$. Then, in each period of T, a COT may be shared if the start and end of the COT occurs within the interval $(T_{offset}, T_{offset}+T_{CS})$ Alternatively, a COT may be shared if the start of the COT occurs within the interval $(T_{offset}, T_{offset}+T_{CS})$ in each period T.

In yet another realization, the indication may be associated with a frequency band, a carrier, a part of a carrier, a BWP, the active BWP at a time, or the like. Then, a COT may be shared if both IAB-DU and IAB-MT transmissions occur within the frequency band, carrier, part of the carrier, BWP, active BWP, or the like. Alternatively, the condition may be applicable to one of the two functional entities, not necessarily both. For example, a COT may be shared if the IAB-MT transmission occurs within the frequency band, carrier, part of the carrier, BWP, active BWP, or the like.

In yet another realization, a DU-to-MT COT sharing may be performed if a frequency gap between a first frequency associated with the IAB-DU transmission, for example a center frequency of the carrier or BWP in which the IAB-DU performs the transmission, and a second frequency associated with the IAB-MT transmission, for example a center frequency of the carrier or BWP in which the IAB-MT intends to perform a transmission, is not larger than a threshold. The threshold may be specified by the standard or configured by the network, e.g., by a parameter in IAB-COT-Sharing-Config.

The configuration IAB-COT-Sharing-Config may comprise an energy detection (ED) threshold JAB-COT-Sharing-ED-Threshold for performing LBT prior to obtaining a COT. Then, a COT obtained by the IAB-DU may be shared with the IAB-MT if an energy detected prior to obtaining the COT is smaller than IAB-COT-Sharing-ED-Threshold. Alternatively, or additionally, if configured with IAB-COT-Sharing-Config, the IAB node may determine an ED threshold value based on the IAB-DU transmission power or the IAB-MT transmission power, where the IAB-DU transmission power may be configured/specified to be higher than the IAB-MT transmission power, for example based on the class/type of the IAB node.

Alternatively, two ED thresholds may be indicated to the JAB node: a first ED threshold EDT1 associated with no-COT-sharing and a second ED threshold EDT2 associated with COT-sharing. Then, if an energy detected prior to obtaining the COT is smaller than EDT1, but not smaller than ED2, the COT obtained by the IAB-DU may not be shared with the IAB-MT. However, if the energy detected prior to obtaining the COT is smaller than both EDT1 and EDT2, then the COT obtained by the IAB-DU may be shared with the IAB-MT according to the methods proposed herein.

In some realizations, a DU-to-MT COT sharing may be performed if one or multiple constraints on transmission powers are satisfied.

In one realization, a total power constraint may be applicable in the case of simultaneous transmissions by both IAB-DU and IAB-MT. This constraint may be to control interference on coexisting systems that may share the same frequencies in the vicinity. The constraint may be indicated by a standard specification or a parameter in a configuration such as IAB-COT-Sharing-Config. Alternatively, the constraint may be applicable if it is indicated to the IAB node that other systems using the same frequencies such as an IEEE 802.11ad/ay exist in the vicinity. As yet another alternative, the constraint may not be applicable if it is NOT indicated to the JAB node that other systems using the same frequencies such as an IEEE 802.11ad/ay exist in the vicinity (e.g., with semi-static channel access mode—channel assess procedures based on semi-static channel occupancy).

In another realization, a minimum or maximum power constraint may be applicable to an IAB-MT transmission if it succeeds an IAB-DU transmission in the same COT. In this case, if the transmission power indicated to the IAB-MT by its parent node does not satisfy the constraint, a DU-to-MT COT sharing may not be allowed. In some examples, the minimum or maximum power may be function of the bandwidth of the channel sensed or access by the IAB-DU and/or the IAB-MT.

In some realizations, spatial constraints may be applied, especially at higher frequencies such as millimeter-wave (mmWave) where LBT and/or COT transmissions may be performed directionally. In one realization, a COT sharing may be performed if a first beam applied for the IAB-DU transmission is identical to a second beam applied for the IAB-MT transmission.

In another realization, a COT sharing may be performed if the first beam and the second beam overlap spatially according to a definition provided by the standard and/or a calibration measurement. In yet another realization, a COT sharing may be performed if the first beam and the second beam are associated with each other according to an indication in the IAB node (such as a capability indication), or alternatively, the first beam and the second beam are both associated with a third beam such as an SS/PBCH beam. The indication in each case may be spatial relation information comprising spatial quasi-collocation ("QCL") indication such the QCL Type D.

In some realizations, a DU-to-MT COT sharing may be performed if a collocation condition is satisfied. For example, an indication DU-MT-Collocated in the IAB node may indicate that the IAB-DU and the IAB-MT are collocated. This indication may depend on an implementation and/or a deployment, and it may be communicated to another entity such as an IAB-CU or a parent node. Alternatively, the indication DU-MT-Collocated may be signaled by another entity such as the IAB-CU.

In some realizations, a DU-to-MT COT sharing may be performed based on determining whether an FBE-based or an LBE-based system coexists, i.e., operates on the same spectrum in a vicinity. In one example, a DU-to-MT COT sharing may be performed in response to determining that an FBE-based system coexists in a vicinity or, alternatively, any coexisting system in the vicinity operates based on FBE. In another example, a DU-to-MT COT sharing may be performed in response to determining that an LBE-based system coexists in a vicinity or, alternatively, any coexisting system in the vicinity operates based on LBE. In each case, the determining may be based on an OTA detection of systems in the vicinity, a signaling between the systems, a regulation in the region, and the like.

Regarding MT-to-DU COT sharing, in some embodiments, two or more functional entities may share a COT. In one embodiment, in a first step, an IAB-MT may obtain a COT, wherein the obtaining of the COT may comprise at least one of the following:

a Cat1 access by the IAB-MT: In this case, the IAB-MT may obtain the COT by transmitting an uplink signal or burst without sensing the medium.

a Cat2 LBT by the IAB-MT: In this case, the IAB-MT may obtain the COT by transmitting an uplink signal or burst following a sensing by the IAB-MT without a random backoff.

a Cat3 LBT by the IAB-MT: In this case, the IAB-DU may obtain the COT by transmitting an uplink signal or burst following a sensing by the IAB-MT with a random backoff within a fixed CWS.

a Cat4 LBT by the IAB-MT: In this case, the IAB-MT may obtain the COT by transmitting an uplink signal or burst following a sensing by the IAB-MT with a random backoff within a variable CWS. The CWS adaptation may follow an exponential-reset scheme, a multiplicative-increase additive-decrease scheme, or the like.

a Cat2 LBT by a parent IAB-DU ("PN-DU"): In this case, the IAB-MT may obtain the COT by transmitting an uplink signal or burst following a sensing by the PN-DU without a random backoff.

a Cat3 LBT by a parent IAB-DU ("PN-DU"): In this case, the IAB-MT may obtain the COT by transmitting an uplink signal or burst following a sensing by the PN-DU with a random backoff within a fixed CWS.

a Cat4 LBT by a parent IAB-DU ("PN-DU"): In this case, the IAB-MT may obtain the COT by transmitting an uplink signal or burst following a sensing by the PN-DU with a random backoff within a variable CWS. The CWS adaptation may follow an exponential-reset scheme, a multiplicative-increase additive-decrease scheme, or the like.

In cases 5/6/7, the PN-DU may perform the LBT following a standard specification, a configuration by an IAB-CU, a signaling by the IAB-MT, or a combination thereof.

In the first step, the signal or burst is normally in an uplink, i.e., to a parent node. In cases 5/6/7, the parent node to which the IAB-MT transmits a signal or burst may be the same as the parent node that performs the sensing (LBT).

The COT may be constrained by a MCOT $T_{m\_cot,p}$, which may be specified by the standard, configured by an IAB-CU, signaled by a parent node, or a combination thereof. The IAB-MT continues to transmit the said uplink signal or burst, possibly followed by successive transmission(s) of more uplink signals or bursts.

Next, in a second step, an IAB-DU may use the COT by transmitting a downlink signal or burst to a CN-MT or a UE. Different realizations are possible such as the following examples.

Regarding realization with TDM, in some realizations, IAB-DU and IAB-MT transmissions are TDM'd. In one such realization, resources may be partitioned among IAB-DU(s) and IAB-MT(s) of an IAB node in the time domain, for example by TDD-Config IEs from the IAB-CU, such that TDM among IAB-DU and IAB-MT transmissions is ensured by configuration. Then, if the IAB-MT obtains the COT in a first resource partition configured for the IAB-MT and the COT continues after the end of the first resource partition, the IAB-DU may obtain the remaining duration of the COT provided that a second resource partition configured for the IAB-DU follows the first resource partition and a starting symbol of the second partition occurs before the end of the COT.

In another realization, the IAB-DU may obtain the remaining duration of the COT if the starting symbol of a second resource partition configured for the IAB-DU occurs no later than a maximum gap after the last symbol of the first resource partition. The maximum gap (such as 16 us, 25 us, etc.) may be specified by the standard, configured by the network, indicated by an L1/L2 signaling, determined by whether another system using the same frequencies such as an IEEE 802.1 lad/ay system exists in the vicinity, or a combination thereof.

In yet another realization, the IAB-DU may obtain the remaining duration of the COT if the starting symbol of an uplink signal or burst to be transmitted by the IAB-DU occurs no later than a maximum gap after the last symbol of a latest downlink signal or burst transmitted by the IAB-MT. The maximum gap (such as 16 us, 25 us, etc.) may be specified by the standard, configured by the network, indicated by an L1/L2 signaling, determined by whether another system such as an IEEE 802.11ad/ay system exists in the vicinity, or a combination thereof.

In yet another realization, the IAB-DU may obtain the remaining duration of the COT if the said remaining duration, or a subset of it overlapping with the second resource partition, is not smaller than a threshold. The threshold may be specified, configured, and/or signaled in order to ensure a minimum COT for the IAB-DU. If the remaining duration is smaller than the threshold, the IAB-DU may not obtain the remaining duration.

In some realizations, if an IAB-DU obtains the remaining duration of a COT, it may extend the COT. In one such realization, the IAB-DU may extend the COT to the end of a second resource partition configured for the IAB-DU.

In another realization, the IAB-DU may extend the COT to the end of a currently ongoing transmission at the moment the remaining duration of the COT ends. In yet another realization, the IAB-DU may extend the COT such that the total COT by the IAB-DU and the IAB-MT does not exceed an MCOT.

In yet another realization, a combination of the above may be applicable. In some realizations, whether an IAB-DU obtains the remaining duration of the COT, and/or whether the remaining duration is extended, may depend on a QoS indication associated with the uplink signal or burst to be transmitted by the IAB-DU.

In some realizations, a TDM between an IAB-DU transmission and an IAB-MT transmission may not be realized by RRC/F1 resource partitioning, but instead, it may be realized by scheduling or other LT/L2 signaling. In this case, a COT obtained by the IAB-MT may be dynamically shared with the IAB-DU provided that the transmissions do not overlap in the time domain. In one realization, the IAB-DU may use a remaining duration of a COT obtained by the IAB-MT by transmitting a downlink signal or burst if the transmissions do not overlap in the time domain.

In another realization, the IAB-DU may additionally perform an LBT prior to starting a downlink transmission in a COT obtained by the IAB-MT. Then, if the IAB-MT intends to start another transmission after the IAB-DU transmission, it may perform an LBT.

In a general method, a dynamic sharing of the COT between the IAB-DU and the IAB-MT may be allowed if each transmission of the IAB-MT following an IAB-DU transmission is preceded by an LBT by the IAB-MT, and conversely, each transmission of the IAB-DU following an IAB-MT transmission is preceded by an LBT by the IAB-DU. Furthermore, a maximum time gap between the last symbol of an IAB-DU transmission (respectively, IAB-MT transmission) and the first symbol of a successive IAB-MT transmission (respectively, IAB-DU transmission) may be applicable, i.e., the COT may not be shared if the gap between two successive transmissions exceeds the maximum time gap. The maximum time gap may be specified, configured, signaled, determined by existence of another system using the same frequencies such as an IEEE 802.1 lad/ay system, or a combination thereof.

Regarding realization with FDM/SDM, in some realizations, IAB-DU and IAB-MT transmissions may overlap in time, for example according to a FDM or a spatial-division multiple (SDM) as specified in 3GPP Rel-17.

In one such realization, resources configured for IAB-DU(s) and IAB-MT(s) of an IAB node may overlap in the time domain. Then, if the IAB-MT obtains the COT, the IAB-MT may share a subset or all of the COT with the IAB-DU.

In another realization, resources configured for IAB-DU(s) and IAB-MT(s) of an IAB node may overlap in the time domain. However, COT sharing between IAB-DU and IAB-MT transmissions may occur if a condition on power, time gap, guard band, and the like is satisfied. Examples of such conditions are presented shortly.

Furthermore, in any of the realizations, collocation conditions and/or spatial constraints may be applicable to simultaneous transmissions of the IAB-DU and the IAB-MT as explained shortly.

Regarding signaling and behavior, a method of MT-to-DU COT sharing, as proposed earlier and further explained through example realizations, may be enabled by a standard specification, a configuration by a higher layer at such as RRC at the IAB-CU, a signaling by a lower layer, or a combination thereof.

The configuration may comprise an indication IAB-COT-Sharing-Allowed to the IAB node that a MT-to-DU COT sharing is allowed for the IAB node. The configuration is referred to as IAB-COT-Sharing-Config in the rest of this section.

In one realization, the indication may be associated with resources configured for the IAB-DU and/or the IAB-MT. In this case, the IAB node is allowed to perform MT-to-DU COT sharing if the IAB-DU transmission and/or IAB-MT transmissions are performed on the said resources.

In another realization, the indication may be associated with periodic time durations, which may be indicated by a period value T, a time offset $T_{offset}$ for the start of the time duration in each period, and a time duration value $T_{CS}$. Then, in each period of T, a COT may be shared if the start and end of the COT occurs within the interval ($T_{offset}$, $T_{offset}+T_{CS}$). Alternatively, a COT may be shared if the start of the COT occurs within the interval ($T_{offset}$, $T_{offset}+T_{CS}$) in each period T.

In yet another realization, the indication may be associated with a frequency band, a carrier, a part of a carrier, a bandwidth part (BWP), the active BWP at a time, or the like. Then, a COT may be shared if both IAB-DU and IAB-MT transmissions occur within the frequency band, carrier, part of the carrier, BWP, active BWP, or the like. Alternatively, the condition may be applicable to one of the two functional entities, not necessarily both. For example, a COT may be shared if the IAB-DU transmission occurs within the frequency band, carrier, part of the carrier, BWP, active BWP, or the like.

In yet another realization, a MT-to-DU COT sharing may be performed if a frequency gap between a first frequency associated with the IAB-MT transmission, for example a center frequency of the carrier or BWP in which the IAB-MT performs the transmission, and a second frequency associated with the IAB-DU transmission, for example a center frequency of the carrier or BWP in which the IAB-DU intends to perform a transmission, is not larger than a threshold. The threshold may be specified by the standard or configured by the network, e.g., by a parameter in IAB-COT-Sharing-Config.

The configuration IAB-COT-Sharing-Config may comprise an energy detection (ED) threshold JAB-COT-Sharing-ED-Threshold for performing LBT prior to obtaining a COT. Then, a COT obtained by the IAB-MT may be shared with the IAB-DU if an energy detected prior to obtaining the COT is smaller than JAB-COT-Sharing-ED-Threshold. Alternatively, or additionally, if configured with JAB-COT-Sharing-Config, the IAB node may determine an ED threshold value based on the IAB-DU transmission power or the IAB-MT transmission power, where the IAB-DU transmission power may be configured/specified to be higher than the IAB-MT transmission power, for example based on the class/type of the IAB node.

Alternatively, two ED thresholds may be indicated to the JAB node: a first ED threshold EDT1 associated with no-COT-sharing and a second ED threshold EDT2 associated with COT-sharing. Then, if an energy detected prior to obtaining the COT is smaller than EDT1, but not smaller than ED2, the COT obtained by the IAB-MT may not be shared with the IAB-DU. However, if the energy detected prior to obtaining the COT is smaller than both EDT1 and EDT2, then the COT obtained by the IAB-MT may be shared with the IAB-DU according to the methods proposed herein.

In some realizations, a MT-to-DU COT sharing may be performed if one or multiple constraints on transmission powers are satisfied.

In one realization, a total power constraint may be applicable in the case of simultaneous transmissions by both IAB-DU and IAB-MT. This constraint may be to control interference on coexisting systems that may share the same frequencies in the vicinity. The constraint may be indicated by a standard specification or a parameter in a configuration such as IAB-COT-Sharing-Config. Alternatively, the constraint may be applicable if it is indicated to the IAB node that other systems using the same frequencies such as an IEEE 802.11ad/ay exist in the vicinity. As yet another alternative, the constraint may not be applicable if it is NOT indicated to the JAB node that other systems using the same frequencies such as an IEEE 802.1 lad/ay exist in the vicinity.

In another realization, a minimum or maximum power constraint may be applicable to an IAB-DU transmission if it succeeds an IAB-MT transmission in the same COT. In this case, if the transmission power indicated to the IAB-DU by its parent node does not satisfy the constraint, a MT-to-DU COT sharing may not be allowed. In some examples, minimum or maximum power may be function of the bandwidth of the channel sensed or access by the IAB-DU and/or the IAB-MT.

In some realizations, spatial constraints may be applied, especially at higher frequencies such as millimeter-wave (mmWave) where LBT and/or COT transmissions may be performed directionally.

In one realization, a COT sharing may be performed if a first beam applied for the IAB-MT transmission is identical to a second beam applied for the IAB-DU transmission.

In another realization, a COT sharing may be performed if the first beam and the second beam overlap spatially according to a definition provided by the standard and/or a calibration measurement.

In yet another realization, a COT sharing may be performed if the first beam and the second beam are associated with each other according to an indication in the IAB node (such as a capability indication), or alternatively, the first beam and the second beam are both associated with a third beam such as an SS/PBCH beam. The indication in each case may be spatial quasi-collocation (QCL) indication such the QCL Type D.

In some realizations, a MT-to-DU COT sharing may be performed if a collocation condition is satisfied. For example, an indication DU-MT-Collocated in the IAB node may indicate that the IAB-DU and the IAB-MT are collocated. This indication may depend on an implementation and/or a deployment, and it may be communicated to another entity such as an IAB-CU or a parent node. Alternatively, the indication DU-MT-Collocated may be signaled by another entity such as the IAB-CU.

In some realizations, a MT-to-DU COT sharing may be performed based on determining whether an FBE-based or an LBE-based system coexists, i.e., operates on the same spectrum in a vicinity. In one example, a MT-to-DU COT sharing may be performed in response to determining that an FBE-based system coexists in a vicinity or, alternatively, any coexisting system in the vicinity operates based on FBE. In another example, a MT-to-DU COT sharing may be performed in response to determining that an LBE-based system coexists in a vicinity or, alternatively, any coexisting system in the vicinity operates based on LBE. In each case, the determining may be based on an OTA detection of systems in the vicinity, a signaling between the systems, a regulation in the region, and the like.

Additionally, in some realizations, an MT-to-DU COT sharing may be performed upon determining that the IAB-DU resources intended for the downlink transmission comprises one or multiple soft resources that are indicated available through an availability indication (AI) message from a parent node. The parent node transmitting the AI message may be identical to the parent node to which the IAB-MT transmitted the uplink signal or burst and/or the parent node that performed LBT in cases 5/6/7.

Regarding other COT sharing cases, in a general case, an IAB node may comprise multiple functionalities including one or multiple IAB-DUs and one or multiple IAB-MTs. Methods proposed thus far for DU-to-MT COT sharing and MT-to-DU COT sharing may be extended to other cases such as the following:

DU-to-DU COT sharing, wherein a COT obtained by a first IAB-DU may be shared with a second IAB-DU. In a typical case, the first IAB-DU and the second IAB-DU are comprised by a same IAB node.

MT-to-MT COT sharing, wherein a COT obtained by a first IAB-MT may be shared with a second IAB-MT. In a typical case, the first IAB-MT and the second IAB-MT are comprised by a same IAB node.

More general cases wherein a COT obtained by an IAB-DU, an IAB-MT, a UE, or other such entity may be shared with multiple other functionalities including other IAB-DUs, IAB-MTs, and/or UEs. Similar to the conditions and constraints described for DU-to-MT and MT-to-DU COT sharing, conditions and constraints on time, frequency, spatial beamforming, transmission power, and collocation may be applicable for any functionality with which the COT may be shared.

COT sharing among functionalities of multiple IAB nodes. For example, JAB node configured by a same IAB donor may be share a COT.

As an illustrative example, consider an IAB node comprising 4 IAB-DUs and 2 IAB-MTs. A COT sharing scenario denoted DU1→DU2→MT1/MT2→DU1/DU4 may comprise the following steps:

IAB-DU1 obtains the COT by transmitting a downlink signal, possibly following an LBT by IAB-DU1 or a child node or a UE served by IAB-DU1.

Once IAB-DU1 transmission is finished, the COT is then shared with IAB-DU2 for another downlink transmission.

Next, the COT is shared with IAB-MT1 and IAB-MT2 for uplink transmissions.

Finally, the COT is shared with IAB-DU1 and IAB-DU4 for further downlink transmissions.

In this example, conditions and constraints such as one or multiple of the following may be applied:

Time constraints: The total duration of the COT from the start of the first downlink transmission by IAB-DU1 until the end of the last transmissions by IAB-DU1 and/or IAB-DU4 may be constrained by a maximum channel occupancy time (MCOT). Furthermore, the COT may be constrained to a certain interval, which may be configured in a periodic manner.

Frequency constraints: The frequencies at which each or any of the transmissions by the IAB-DUs and/or IAB-MTs may be constrained to a frequency band, sub-band, carrier, BWP, or the like. Additionally, or alternatively, a frequency associated with each or any of the transmissions by the IAB-DUs and/or IAB-MTs, such as a center frequency, maximum frequency, or minimum frequency, may be constrained to a maximum from a frequency associated with IAB-DU1 (e.g., LBT frequency or transmission frequency of IAB-DU1).

Spatial constraints: There may be constraints on beams, beam angles, beam-widths, QCL relationships, EIRP of beams, etc. associated with each or any of the IAB-DU and/or IAB-MT transmissions in the COT.

In a relatively strict case, each or any of the beams applied for performing an IAB-DU and/or IAB-MT transmission shall be identical to the beam applied by IAB-DU1 when performing the first downlink transmission in the COT.

Alternatively, each or any of the beams applied for performing an IAB-DU and/or IAB-MT transmission shall be associated to the beam applied by IAB-DU1 when performing the LBT prior to obtaining the COT. The association may be transmit-receive beam correspondence if propagation characteristics of the channel is considered reciprocal. The association may be determined according to an implementation and/or signaling.

As yet another alternative, at least one of a beam direction or a beam-width associated with each or any of the IAB-DU and/or IAB-MT transmissions may be identical or associated with abeam direction or a beam-width applied by IAB-DU1 when performing LBT prior to obtaining the COT or performing a downlink transmission in the COT.

As yet another alternative, a beam applied by each or any of the IAB-DU and/or IAB-MT transmissions may be indicated quasi-collocated in a spatial sense, for example QCL Type D, with a transmitter ("Tx") beam applied by the IAB-DU1 for transmitting a downlink signal in the COT. Alternatively, a beam applied by each or any of the IAB-DU and/or IAB-MT transmissions may be indicated quasi-collocated in a spatial sense, for example QCL Type D, with a Tx beam that has a transmit-receive correspondence with a receiver ("Rx") beam applied by the IAB-DU1 for performing LBT prior to obtaining the COT. The latter case may be applicable if propagation characteristics of the channel is considered reciprocal.

The transmit-receive correspondence may be determined according to an implementation and/or signaling.

Transmission power: The total transmission power of simultaneous transmissions by IAB-MT1 and IAB-MT2, and/or IAB-DU1 and IAB-DU4, may be constrained by maximum and/or minimum threshold. The threshold may be determined according to a regional regulation, a standard specification, a configuration by the network, a signaling by another IAB node such as a parent node, a power offset with respect to the transmission power associated with the first IAB-DU1 transmission in the COT, a relationship with the ED threshold applied for an LBT prior to obtaining the COT, or a combination thereof.

Collocation: Each or any of the functional entities with which a COT is shared, namely IAB-DU2, IAB-DU4, IAB-MT1, and IAB-MT2, may be constrained by a collocation condition with respect to IAB-DU1.

In a strict case, the said entities shall use same hardware (e.g., RF chain(s) and antenna(s)) used for the first IAB-DU1 downlink transmission in the COT or an LBT prior to the COT.

Alternatively, the said entities may use other hardware if the hardware is in a vicinity of the hardware used for the first IAB-DU1 transmission or LBT.

As yet another alternative, the said entities may use hardware that is considered not to interfere with coexisting systems albeit the hardware may not be in the vicinity.

Below is a list of various COT-sharing scenarios including the method used and a description of the scenario:

Method: COT sharing, sensing on Tx side, IAB-DU initiating

IAB-DU performs sensing with beam Bdu1

If the sensing is successful

IAB-DU occupies the channel with Bdu1

Upon switching from IAB-DU Tx to IAB-MT Tx, if time is remained from the COT

IAB-MT occupies the channel with Bmt1, which is associated with Bdu1

Description: In an embodiment, an IAB-DU performs sensing with a first IAB-DU beam, which may be associated with a downlink reference signal such as an SS/PBCH block or a CSI-RS. If the channel is sensed idle, the IAB-DU performs downlink transmission to at least one child node and/or UE through a second IAB-DU beam associated with the first IAB-DU beam. Then, upon switching from IAB-DU transmission duration or resources to IAB-MT transmission duration or resources, the IAB-MT may perform an uplink transmission to a parent node with an IAB-MT beam, wherein the IAB-MT beam may be associated with the first IAB-DU beam or the second IAB-DU beam.

In this embodiment, an association between any combination of the first IAB-DU beam, the second IAB-DU beam, and the IAB-MT beam may be determined by a configuration from the network, by a signaling from the IAB node, by an implementation in the IAB node, or a combination thereof.

Method: COT sharing, sensing on Tx side, IAB-MT initiating

IAB-MT performs sensing with beam Bmt1

If the sensing is successful:

IAB-MT occupies the channel with Bmt1

Upon switching from IAB-MT Tx to IAB-DU Tx, if time is remained from the COT

IAB-DU occupies the channel with Bdu1, which is associated with Bmt1

Description: In an embodiment, an IAB-MT performs sensing with a first IAB-MT beam, which may be associated with an uplink reference signal such as an SRS. If the channel is sensed idle, the IAB-MT performs uplink transmission to a parent node through a second IAB-MT beam associated with the first IAB-MT beam. Then, upon switching from IAB-MT transmission duration or resources to IAB-DU transmission duration or resources, the IAB-DU may perform a downlink transmission to at least one child node and/or UE with an IAB-DU beam, wherein the IAB-DU beam may be associated with the first IAB-MT beam or the second IAB-MT beam.

In this embodiment, an association between any combination of the first IAB-MT beam, the second IAB-MT beam, and the IAB-DU beam may be determined by a configuration from the network, by a signaling from the IAB node, by an implementation in the IAB node, or a combination thereof.

Method: COT sharing, sensing on Rx side, IAB-DU initiating

IAB-DU requests sensing on Rx side

CN-MT performs sensing with beam Bcn1 associated with IAB-DU

If the sensing is successful

CN-MT informs IAB-DU of sensing success

IAB-DU occupies the channel with Bdu1 associated with Bcn1

Upon switching from IAB-DU Tx to IAB-MT Tx, if time is remained from the COT

IAB-MT occupies the channel with Bmt1, which is associated with Bdu1

Description: In an embodiment, an IAB-DU requests a sensing on the receiver side. In response, a child node or UE performs sensing with a CN-MT beam, which may be associated with an uplink reference signal such as an SRS or downlink reference signal such as an SS/PBCH block or CSI-RS. If the channel is sensed idle, the child node or UE informs the IAB-DU of the sensing success. Next, the IAB-DU performs a downlink transmission to at least a child node through an IAB-DU beam associated with the CN-MT beam. Then, upon switching from IAB-DU transmission duration or resources to IAB-MT transmission duration or resources, the IAB-MT may perform an uplink transmission to a parent node with an IAB-MT beam, wherein the IAB-MT beam may be associated with the IAB-DU beam.

In this embodiment, an association between any combination of the CN-MT beam, IAB-DU beam, and the IAB-MT beam may be determined by a configuration from the network, by a signaling from the IAB node, by an implementation in the IAB node, or a combination thereof.

Method: COT sharing, sensing on Rx side, IAB-MT initiating

IAB-MT requests sensing on Rx side

PN-DU performs sensing with beam Bpn1 associated with IAB-MT

If the sensing is successful

PN-MT informs IAB-MT of sensing success

IAB-MT occupies the channel with Bmt1 associated with Bpn1

Upon switching from IAB-MT Tx to IAB-DU Tx, if time is remained from the COT

IAB-DU occupies the channel with B1, which is associated with Bdu1

Description: In an embodiment, an IAB-MT requests a sensing on the receiver side. In response, a parent node performs sensing with a PN-DU beam, which may be associated with a downlink reference signal such as an SS/PBCH block or CSI-RS or an uplink reference signal such as an SRS. If the channel is sensed idle, the parent node informs the IAB-MT of the sensing success. Next, the IAB-MT performs an uplink transmission to the parent node through an IAB-MT beam associated with the PN-DU beam. Then, upon switching from IAB-MT transmission duration or resources to IAB-DU transmission duration or resources, the IAB-DU may perform a downlink transmission to at least a child node or UE with an IAB-DU beam, wherein the IAB-DU beam may be associated with the IAB-MT beam.

In this embodiment, an association between any combination of the PN-DU beam, IAB-MT beam, and the IAB-DU beam may be determined by a configuration from the network, by a signaling from the IAB node, by an implementation in the IAB node, or a combination thereof.

Regarding methods for sensing sharing, when accessing a shared medium without a prior scheduling, a communication device (such as a network node or a UE) may sense the channel in search of any transmissions currently in progress on the medium among other devices. The information obtained from the sensing may then help the device decide whether to access the medium immediately or, instead, wait for the ongoing transmission to end; which antenna/beam to use to mitigate interference or avoid a "collision" with the other transmission; and so on. This sensing-before-transmission approach:

is in contrast with Aloha-type of medium access control ("MAC") protocols whereby a wireless device accesses the medium without sensing, which may result in a sharp drop in efficiency in moderate to high network loads;

is the basis for carrier-sensing multiple-access ("CSMA") family of MAC protocols, widely employed in wireless local area networks ("WLANs") such as IEEE 802.11 distributed coordination function ("DCF") operating in unlicensed spectrum;

is known as LBT in the context of cellular systems such as LTE and 5G NR.

A wireless device accessing the medium based on CSMA or LBT senses the medium according to methods such as energy detection (ED) or preamble detection in order to determine whether there are ongoing transmissions in the vicinity and the level of interference they may cause on a receiver. If the medium is sensed "idle," the device may proceed with initiating the new transmission. Otherwise, if the medium is sensed "busy," the device may continue to sense the medium while waiting for the medium to become idle. In CSMA/LBT-based MAC protocols with "backoff," the device may continue to sense the medium in order to determine whether to decrement a backoff timer:

if the medium is idle, then decrement the backoff timer;

if the medium is busy, then freeze the backoff timer.

Therefore, in a CSMA/LBT-based MAC protocol, the device may need to continue sensing the medium over an extended period of time, e.g., milliseconds, which may be orders of magnitude longer than the duration of one sensing, e.g., microseconds.

In conventional systems, the device may simply keep its RF/antenna circuitry on in order to sense the medium while not transmitting. The only consideration may be power saving.

In an IAB system, however, an IAB node is split into multiple functionalities such as an IAB-DU and an IAB-MT. The question is whether and how the continuous sensing for accessing the shared spectrum may work at an IAB node if it shares the RF/antenna hardware for the multiple functionalities, if there is a switch from IAB-DU to IAB-MT in the middle of medium sensing, etc.

Similar to the methods proposed for COT sharing among IAB functionalities, the sensing mechanism may also be "shared" by multiple functionalities. This approach may find its preferred use case in TDM-based operation among collocated IAB-DU and/or IAB-MT functionalities.

In the methods proposed herein, an IAB-DU or an IAB-MT may be referred to as a functional entity such that the methods may be described for a general case that may be applied to DU-to-MT sensing sharing, MT-to-DU sensing sharing, DU-to-DU sensing sharing, and/or MT-to-MT sensing sharing.

In some embodiments, sharing a sensing mechanism may comprise sharing a sensing of sensing slots, each sensing slot with a duration $T_{sl}$ (e.g., in microseconds). In one example, if an IAB-MT has started a sensing mechanism by setting $N=N_{init}$ and then decrementing the backoff counter N every time the IAB-MT senses the medium idle for a duration of a sensing slot, if N is still nonzero, an IAB-DU may continue the sensing by decrementing the same backoff counter N every time the IAB-DU senses the medium idle for a duration of sensing slot.

In another example, if an IAB-DU has started a sensing mechanism by setting $N=N_{init}$ and then decrementing the backoff counter N every time the IAB-DU senses the medium idle for a duration of a sensing slot, if N is still nonzero, an IAB-MT may continue the sensing by decrementing the same backoff counter N every time the IAB-MT senses the medium idle for a duration of sensing slot.

In some embodiments, sharing a sensing mechanism may comprise sharing a defer duration $T_d$. In one example, if an IAB-DU has started a defer duration after a sensing and continues to sense the medium for a fraction of the defer duration, $T_{d1}$, wherein $T_{d1}<T_d$, an IAB-MT may continue sensing for a duration $T_d-T_{d1}$ before accessing the channel.

In another example, if an IAB-MT has started a defer duration after a sensing and continues to sense the medium for a fraction of the defer duration, $T_{d1}$, wherein $T_{d1}<T_d$, an IAB-DU may continue sensing for a duration $T_d-T_{d1}$ before accessing the channel.

In some embodiments, sharing a sensing mechanism may comprise sharing a sensing of sensing slots, but not a defer duration. In one example, if an IAB-DU has started a defer duration after a sensing and continues to sense the medium for a fraction of the defer duration, $T_{d1}$, wherein $T_{d1}<T_d$, an IAB-MT may start sensing the medium for a full defer duration $T_d$ before accessing the channel.

In one example, if an IAB-MT has started a defer duration after a sensing and continues to sense the medium for a fraction of the defer duration, $T_{d1}$, wherein $T_{d1}<T_d$, an IAB-DU may start sensing the medium for a full defer duration $T_d$ before accessing the channel.

In some embodiments, determining whether to perform a DU-to-MT sensing sharing or an MT-to-DU sensing sharing may comprise comparing a first priority class associated with the sensing at the IAB-DU with a second priority class associated with the sensing at the IAB-MT. In one example, the sensing may be shared if the said priority classes are equal, e.g., both have a value of 1, or both have a value of 2, and so on. In another example, the sensing may be shared if the first priority class is equal to or greater than the second priory class. In yet another example, the sensing may be shared if the first priority class is equal to or smaller than the second priory class.

In alternative embodiments, instead of the value of the priority class p, a parameter associated with the priority class is considered. In one example, maximum contention window sizes are compared, e.g., a sensing may be shared from a first entity to a second entity if a first maximum contention window size associated with the first priority class is not smaller than a second maximum contention window size associated with the second entity. In another example, contention window sizes are compared, e.g., a sensing may be shared from a first entity to a second entity if a first contention window size associated with the first priority class is not smaller than a second contention window size associated with the second entity.

In some embodiments, a method of contention window (CW) adjustment may be shared. In one example, in order to determine a value for a $CW_p$ for a priority class p, a duration $T_w$ or a reference duration may be computed based on time values associated with transmissions by both an IAB-DU and an IAB-MT. In some realizations, the transmissions are associated with the priority class p.

In another example, in order to determine a value for a $CW_p$ for a priority class p, a success ('ACK') rate for HARQ-ACK feedback may be computed based on HARQ- ACK feedbacks for both PDSCH transmissions by the IAB-DU and PUSCH transmissions by the IAB-MT. In some realizations, the PDSCH and PUSCH transmissions are associated with the priority class p.

In yet another example, a process of resetting a value for a $CW_p$ for a priority class p may be shared between an IAB-DU and an IAB-MT. For instance, a value of K as the number of consecutive times that $CW_p$ is set to $CW_{max,p}$ may be include the number of times $CW_p$ is set to $CW_{max,p}$ by any of the IAB-DU and the IAB-MT.

In some embodiments, determining whether to perform a DU-to-MT sensing sharing or an MT-to-DU sensing sharing may comprise determining whether an IAB-DU and an IAB-MT are collocated. The determining may be based on a configuration, a control signalling, an implementation, and/or a deployment.

Regarding realization with TDM, in various realizations, an IAB-DU may start sensing the medium. If the IAB-DU determines that the medium is idle, it may proceed with occupying the channel, i.e., obtaining a COT. However, if the IAB-DU determines that the medium is busy, it may continue sensing the medium until it becomes idle.

Furthermore, during a backoff period such as in Cat3 and Cat4 LBT, when a the IAB-DU senses the medium idle, it may decrement a backoff timer while it is determined idle. In this case, too, the IAB-DU may continue sensing the medium until it the backoff timer reaches zero (which is an indication that the medium may be accessed).

Meanwhile, in either of the above cases, if the sensing continues until the IAB node ends IAB-DU communication temporarily and switches to IAB-MT communication, the IAB-MT may continue the sensing.

In some realizations, resources partitions are configured for the IAB-DU and the IAB-MT by an IAB-CU, wherein the resource partitions do not overlap in the time domain. This is an example of realizing TDM between IAB-DU and IAB-MT functionalities, possibly as a result of the IAB node indicating to the network that it is capable of performing TDM. Resource partitioning may be realized by RRC configurations such as TDD configurations.

In other realizations, a TDM may not be guaranteed by configuration, but instead by other means such as lower layer signaling, scheduling, and availability indication for soft resources.

In either case, it may be possible to determine, at any moment, whether the IAB node is at one of the following states:

IAB-DU operation
IAB-MT operation
Transition from IAB-DU to IAB-MT or vice versa, e.g., a guard period, guard symbol, etc.
None of the above, e.g., a DRX mode, an RRC Inactive or Idle mode, etc.

In one realization, upon switching from IAB-DU state to IAB-MT state, or vice versa, the IAB node may continue the sensing.

In another realization, upon switching from IAB-DU state to IAB-MT state, or vice versa, the IAB node may continue the sensing if a transition period from IAB-DU state to IAB-MT state, or vice versa, is not longer than a threshold. The threshold may be specified by the standard or configured by the network. Alternatively, or additionally, the threshold may depend on whether another system such as an IEEE 802.11ad/ay system may share the same frequencies in a vicinity.

In one example of this realization, if the last symbol of a first resource partition occurs immediately before the first symbol of a second resource partition, then a second functional entity (such as an IAB-MT by an IAB node) may continue sensing the medium during the interval associated with second resource partition if a first functional entity (such as an IAB-DU comprised by the IAB node) is sensing the medium during the interval associated with the first resource partition.

In another example, if there is a time gap (such as a transition period) between the last symbol of the first resource partition and the first symbol of the second resource partition, the second functional entity may continue sensing the medium if the time gap does not exceed the threshold. Otherwise, if the time gap is longer than the threshold, the sensing may not continue, e.g., IAB node may reset the backoff timer.

In some realizations, an IAB node may have separate backoff timers for IAB-DU and IAB-MT states. Then, if a sensing at the IAB-DU state is paused because the IAB node does continue sensing at the IAB-MT state, then the IAB-DU backoff timer is frozen. Similarly, if a sensing at the IAB-MT state is paused because the IAB node does continue sensing at the IAB-DU state, then the IAB-MT backoff timer is frozen. In either case, sensing associated with the frozen backoff timer may resume once the IAB node switches back to the associated state, resumes sensing the medium, and determines that the medium is idle.

In those realizations, the duration of a state in which a functional entity is not operating may be considered as a "busy" medium state for the associated backoff process.

In this context, the following terms can be defined for an IAB node comprising an IAB-DU and an IAB-MT:

Sensing as the IAB-DU: The sensing process (including a backoff process in the case of Cat3 and Cat4 LBT) as the IAB-DU functional entity and/or in the IAB-DU state.

Sensing as the IAB-MT: The sensing process (including a backoff process in the case of Cat3 and Cat4 LBT) as the IAB-MT functional entity and/or in the IAB-MT state.

Then, by definition, the realization described above may be rephrased as follows:

The IAB node may decrement a backoff timer associated with the IAB-DU state if the IAB node senses the medium as the IAB-DU and determines that the medium is idle.

The IAB node may decrement a backoff timer associated with the IAB-MT state if the IAB node senses the medium as the IAB-MT and determines that the medium is idle.

Alternatively, in some realizations, the IAB node may have separate backoff timers for IAB-DU and IAB-MT states, but with the following behavior:

The IAB node may decrement a backoff timer associated with the IAB-DU state if the IAB node senses the medium according to at least one of the following and determines that the medium is idle:

Sensing the medium as the IAB-DU,

Sensing the medium with Rx parameters associated with the IAB-DU while the IAB node is at the IAB-MT state or another state.

The IAB node may decrement a backoff timer associated with the IAB-MT state if the IAB node senses the medium according to at least one of the following and determines that the medium is idle:

Sensing the medium as the IAB-MT,

Sensing the medium with Rx parameters associated with the IAB-MT while the IAB node is at the IAB-MT state or another state.

In those realizations, the IAB node may be capable of performing sensing with Rx parameters associated with IAB-DU while at the IAB-MT state if, for example, one or multiple of the following hold:

The IAB node has separate RF chains and antennas for IAB-DU and IAB-MT functionalities.

The IAB node is not performing a transmission while at the IAB-MT state.

The Rx parameters associated with an IAB-MT reception is identical or similar with the Rx parameters associated with sensing the medium as IAB-DU.

The IAB node is capable of full-duplex operation.

Similar conditions may hold for allowing the IAB node to perform sensing with Rx parameters associated with IAB-MT while at the IAB-DU state. In those realizations, the IAB node may continue sensing the medium as the IAB-DU (resp. IAB-MT) and decrementing the associated backoff timer if the medium is idle, even if the IAB node is not at the IAB-DU (resp. IAB-MT) state. The said Rx parameters may include an Rx beam, an ED threshold, and the like. These parameters will be discussed shortly.

Regarding realization with FDM/SDM, if an IAB node is capable of simultaneous operations, for example with FDM and/or SDM, the IAB node may be capable of operating at IAB-DU and IAB-MT states simultaneously. Simultaneous operations may follow configuration and signaling as well determining that certain conditions on timing alignment, transmission power, and interference hold at a moment.

In one realization, an IAB node may have one backoff timer for a sensing process shared among IAB-DU and IAB-MT functionalities. In another realization, an IAB node may have multiple backoff timers for sensing, each associated with a different functional entity such as an IAB-DU or an IAB-MT comprised by the IAB node.

When multiple backoff timers are available, the IAB node may access the medium if any of the backoff timers reach zero. In some examples, the IAB node may do so if Rx parameters for sensing are identical among the associated functional entities, or otherwise if the Rx parameters for sensing are associated in some sense. Examples of identical or associated Rx parameters are as follows.

Beams for sensing are identical.

Beams for sensing have an identical direction and/or beamwidth, or otherwise, the angle between the directions is not larger than a threshold. A more elaborate description of association between beams is provided later in this disclosure.

ED thresholds are identical, or otherwise the difference between the ED thresholds is not larger than a threshold.

The difference between transmission powers associated with IAB-DU and IAB-MT operations is not larger than a threshold. It should be noted that the IAB-MT transmission power is fully or partially controlled by a parent node of the IAB node, while the IAB-DU transmission power determines a cell coverage. Therefore, the IAB node may not have full control over the transmission powers to satisfy this condition. In some examples, if the IAB node determines that the difference between the associated transmission powers is not larger than the said threshold, or the transmission powers may be changed to satisfy the said condition, then the IAB node may access the medium when either of the backoff timers reaches zero.

The functional entities are collocated in some sense, for example they share same RF/antenna hardware, or they are deployed in a vicinity, e.g., on a same pole.

The IAB node is configured or signaled to use a minimum of multiple backoff timers to determine when to access the medium.

In yet another realization, an IAB node may have multiple backoff timers for sensing, each associated with a different resource partition, time period, frequency range (such as carrier or BWP), beam or group of beams, functional entity such as an IAB-DU or an IAB-MT, or a combination thereof. Components of each LBT process including the backoff timer may be distinguished by specification, configuration, signaling, implementation, or a combination thereof.

In yet another realization, an IAB node may use a single backoff timer N for sensing different spatial directions, where an IAB-DU and an IAB-MT, respectively, perform sensing while applying different Rx spatial parameters. Depending on respective channel sensing results, both the IAB-DU and the IAB-MT, one of them, or neither of them may access the channel. Additionally, or alternatively, the IAB-DU and the IAB-MT may perform sensing on different frequency sub-bands based on the single backoff timer and may determine channel access to the respective frequency sub-bands based on respective channel sensing results.

Regarding conditions and constraints, a method of sensing sharing, as proposed earlier and further explained through example realizations, may be enabled by a standard specification, a configuration by a higher layer at such as RRC at the IAB-CU, a signaling by a lower layer, or a combination thereof.

The configuration may comprise an indication to the IAB node that a sensing sharing is allowed for the IAB node. The configuration is referred to as JAB-Sensing-Sharing-Config in the rest of this section.

In one realization, the indication may be associated with resources configured for the IAB-DU and/or the IAB-MT. In this case, the IAB node is allowed to perform sensing sharing if the IAB-DU and/or IAB-MT transmissions are performed on the said resources.

In another realization, the indication may be associated with periodic time durations, which may be indicated by a period value T, a time offset $T_{offset}$ for the start of the time duration in each period, and a time duration value $T_{CS}$. Then, in each period of T, a sensing may be shared if the start and end of the sensing or an associated COT occurs within the interval $(T_{offset}, T_{offset}+T_{CS})$. Alternatively, a sensing may be shared if the start of the sensing or an associated COT occurs within the interval $(T_{offset}, T_{offset}+T_{CS})$ in each period T.

In yet another realization, the indication may be associated with a frequency band, a carrier, a part of a carrier, a BWP, the active BWP at a time, or the like. Then, a sensing may be shared if both IAB-DU and IAB-MT transmissions occur within the frequency band, carrier, part of the carrier, BWP, active BWP, or the like. Alternatively, the condition may be applicable to one of the two functional entities, not necessarily both. For example, a sensing may be shared if the associated transmission occurs within the frequency band, carrier, part of the carrier, BWP, active BWP, or the like.

In yet another realization, a sensing sharing may be performed if a frequency gap between a first frequency associated with the IAB-DU transmission, for example a center frequency of the carrier or BWP in which the IAB-DU performs the transmission, and a second frequency associated with the IAB-MT transmission, for example a center frequency of the carrier or BWP in which the IAB-MT intends to perform a transmission, is not larger than a threshold. The threshold may be specified by the standard or configured by the network, e.g., by a parameter in IAB-Sensing-Sharing-Config.

The configuration IAB-Sensing-Sharing-Config may comprise an energy detection (ED) threshold for performing sensing/LBT prior to obtaining a COT. Then, the sensing may be shared if an energy detected for the LBT/sensing is smaller than the ED threshold.

Alternatively, two ED thresholds may be indicated to the IAB node: a first ED threshold EDT1 associated with no-sensing-sharing and a second ED threshold EDT2 associated with sensing-sharing. Then, if an energy detected for the sensing is smaller than EDT1, but not smaller than ED2, the sensing may not be shared. However, if the energy detected for the sensing is smaller than both EDT1 and EDT2, then the sensing may be shared according to the methods proposed herein.

In some realizations, spatial constraints may be applied, especially at higher frequencies such as millimeter-wave (mmWave) where LBT and/or COT transmissions may be performed directionally. In one realization, a sensing sharing may be performed if a first beam applied for the IAB-DU sensing is identical to a second beam applied for the IAB-MT sensing. In another realization, a sensing sharing may be performed if the first beam and the second beam overlap spatially according to a definition provided by the standard and/or a calibration measurement.

In yet another realization, a sensing sharing may be performed if the first beam and the second beam are associated with each other according to an indication in the IAB node (such as a capability indication), or alternatively, the first beam and the second beam are both associated with a third beam such as an SS/PBCH beam. The indication in each case may be spatial quasi-collocation (QCL) indication such the QCL Type D.

In some realizations, a sensing sharing may be performed if a collocation condition is satisfied. For example, an indication in the IAB node may indicate that the IAB-DU and the IAB-MT are collocated. This indication may depend on an implementation and/or a deployment. Alternatively, the indication may be signaled by another entity such as the IAB-CU.

In some realizations, a sensing sharing may be performed based on determining whether an FBE-based or an LBE-based system coexists, i.e., operates on the same spectrum in a vicinity. In one example, a sensing sharing may be performed in response to determining that an FBE-based system coexists in a vicinity or, alternatively, any coexisting system in the vicinity operates based on FBE. In another example, a sensing sharing may be performed in response to determining that an LBE-based system coexists in a vicinity or, alternatively, any coexisting system in the vicinity operates based on LBE. In each case, the determining may be based on an OTA detection of systems in the vicinity, a signaling between the systems, a regulation in the region, and the like.

Below is a list of various sensing-sharing scenarios:
Method: sensing sharing, sensing on Tx side, IAB-DU initiating
IAB-DU performs sensing with beam Bdu1
Upon switching from IAB-DU Tx to IAB-MT Tx, IAB-MT continues sensing with Bmt1, which is associated with Bdu1

If the sensing is successful
IAB-MT occupies the channel with Bmt1
Method: sensing sharing, sensing on Tx side, IAB-MT initiating
IAB-MT performs sensing with beam Bmt1
Upon switching from IAB-MT Tx to IAB-DU Tx, IAB-DU continues sensing with Bdu1, which is associated with Bmt1
If the sensing is successful
IAB-DU occupies the channel with Bdu1
Method: sensing sharing, sensing on Rx side, IAB-DU initiating
IAB-DU requests sensing on Rx side
CN-MT performs sensing with beam Bcn1 associated with IAB-DU
Upon switching from IAB-DU Tx to IAB-MT Tx, IAB-MT requests sensing on Rx side
PN-DU continues sensing with Bpn1, which is associated with Bcn1
If the sensing is successful
IAB-MT occupies the channel with Bmt1, which is associated with Bpn1
Method: COT sharing, sensing on Rx side, IAB-MT initiating
IAB-MT requests sensing on Rx side
PN-DU performs sensing with beam Bdu1 associated with IAB-MT
Upon switching from IAB-MT Tx to IAB-DU Tx, IAB-DU requests sensing on Rx side
CN-MT continues sensing with Bcn1, which is associated with Bpn1
If the sensing is successful
IAB-DU occupies the channel with Bdu1, which is associated with Bcn1

Regarding methods for consistent LBT failure detection, the current consistent LBT failure detection mechanism introduces a counter/timer: lbt-FailureDetectionTimer. The counter is first reset to 0. Then, every time an LBT failure is detected by L1, the timer is incremented. Any time that the UE does not experience LBT failure, the counter is reset to 0. However, if the counter reaches a threshold lbt-Failure-InstanceMaxCount, the UE reports a consistent LBT failure to the higher layers.

Here, LBT failure does not mean a sensing/LBT mechanism that returns channel 'busy.' Instead, it refers to a case where LBT fails to allow channel/medium access, according to the specification/signalling, within a certain time period.

The agreements made thus far in 3GPP work unambiguously when omnidirectional sensing is used. However, with directional LBT at FR2/4, the question is whether a consistent LBT failure detection needs to be enhanced if/when multiple beams are used for sensing the channel. Furthermore, in the case of IAB, it is uncertain whether JAB sensing sharing should be enhanced to accommodate sensing failure by IAB-DU and IAB-MT of an JAB node.

In one embodiment, one counter/timer lbt-FailureDetectionTimer is used for directional LBT. In another embodiment, multiple such counters are used for directional LBT, wherein each counter is associated with an Rx beam used for sensing, or generally, a beam used for sensing. In yet another embodiment, one or multiple such counters are used for directional LBT, wherein each counter is associated with one or multiple associated Rx beams used for sensing. The association between Rx beams may be defined such that, e.g.:

The angle between any of the Rx beams and a reference angle is not larger than a threshold. The reference angle may be hypothetical, or instead, associated with a reference Rx beam.

The beam-widths associated with the Rx beams are identical, or otherwise the difference between the beam-widths is not larger than a threshold. In the case that beam-widths are not identical, a method of ED threshold adaptation may be used so as to compensate the variation of antenna gain associated with the change of beam-width.

The Rx beams are each associated with another beam such as an SS/PBCH (SSB) beam or periodic TRS beam, e.g., SSB or periodic TRS is the QCL source RS with spatial QCL indication such the QCL Type D.

In yet another embodiment, multiple such counters are used, wherein each counter is associated with a Tx beam used for channel access after sensing. In yet another embodiment, one or multiple such counters are used, wherein each counter is associated with one or multiple associated Tx beams used for channel access after sensing. The association between Tx beams may be defined such that, e.g.:

The angle between any of the Tx beams and a reference angle is not larger than a threshold. The reference angle may be hypothetical, or instead, associated with a reference Tx beam.

The beam-widths associated with the Tx beams are identical, or otherwise the difference between the beam-widths is not larger than a threshold. In the case that beam-widths are not identical, a method of ED threshold adaptation may be used so as to compensate the variation of antenna gain associated with the change of beam-width.

The Tx beams are each associated with another beam such as an SS/PBCH (SSB) beam or periodic TRS beam, e.g., SSB or periodic TRS is the QCL source RS with spatial QCL indication such the QCL Type D.

In yet another embodiment, a node/entity sensing a channel with different beams is configured with one lbt-Failure-DetectionTimer. The node increments the lbt-FailureDetectionTimer by one, when LBT fails in all beam directions where sensing is performed. If the node has a successful LBT in at least one beam direction, the node resets the lbt-FailureDetectionTimer to zero.

By extension, in yet another embodiment, a node/entity sensing a channel with different beams is configured with one lbt-FailureDetectionTimer. The node increments the lbt-FailureDetectionTimer by one, when LBT fails in at least M beam directions where sensing is performed. Otherwise, the node resets the lbt-FailureDetectionTimer to zero. The value of M may be configured or signalled as a fixed number, or alternatively, it may be configured or signalled as a ratio of the total number of beams used for the said sensing.

Regarding antenna panel, antenna port, quasi-collocation, TCI state, and spatial relation, in some embodiments, the terms antenna, panel, and antenna panel are used interchangeably. An antenna panel may be a hardware that is used for transmitting and/or receiving radio signals at frequencies lower than 6 GHz, e.g., frequency range 1 ("FR1"), or higher than 6 GHz, e.g., frequency range 2 ("FR2") or millimeter wave (mmWave). In some embodiments, an antenna panel may comprise an array of antenna elements, wherein each antenna element is connected to hardware such as a phase shifter that allows a control module to apply spatial parameters for transmission and/or reception of signals. The resulting radiation pattern may be called a beam, which may or may not be unimodal and may allow the device (e.g., UE, node) to amplify signals that are transmitted or received from one or multiple spatial directions.

In some embodiments, an antenna panel may or may not be virtualized as an antenna port in the specifications. An antenna panel may be connected to a baseband processing module through an RF chain for each of transmission (egress) and reception (ingress) directions. A capability of a device in terms of the number of antenna panels, their duplexing capabilities, their beamforming capabilities, and so on, may or may not be transparent to other devices. In some embodiments, capability information may be communicated via signaling or, in some embodiments, capability information may be provided to devices without a need for signaling. In the case that such information is available to other devices such as a CU, it can be used for signaling or local decision making.

In some embodiments, an antenna panel may be a physical or logical antenna array comprising a set of antenna elements or antenna ports that share a common or a significant portion of an RF chain (e.g., in-phase/quadrature ("I/Q") modulator, analog to digital ("A/D") converter, local oscillator, phase shift network). The antenna panel may be a logical entity with physical antennas mapped to the logical entity. The mapping of physical antennas to the logical entity may be up to implementation. Communicating (receiving or transmitting) on at least a subset of antenna elements or antenna ports active for radiating energy (also referred to herein as active elements) of an antenna panel requires biasing or powering on of the RF chain which results in current drain or power consumption in the device (e.g., node) associated with the antenna panel (including power amplifier/low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In some embodiments, depending on implementation, a "panel" can have at least one of the following functionalities as an operational role of Unit of antenna group to control its Tx beam independently, Unit of antenna group to control its transmission power independently, Unit of antenna group to control its transmission timing independently. The "panel" may be transparent to another node (e.g., next hop neighbor node). For certain condition(s), another node or network entity can assume the mapping between device's physical antennas to the logical entity "panel" may not be changed. For example, the condition may include until the next update or report from device or comprise a duration of time over which the network entity assumes there will be no change to the mapping. Device may report its capability with respect to the "panel" to the network entity. The device capability may include at least the number of "panels". In one implementation, the device may support transmission from one beam within a panel; with multiple panels, more than one beam (one beam per panel) may be used for transmission. In another implementation, more than one beam per panel may be supported/used for transmission.

In some of the embodiments described, an antenna port is defined such that the channel over which a symbol on the antenna port is conveyed can be inferred from the channel over which another symbol on the same antenna port is conveyed.

Two antenna ports are said to be QCL'd if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters. Two antenna ports may be quasi-located with respect to a subset of the large-scale properties and different subset of large-scale properties may be indicated by a QCL Type. The QCL Type can indicate which channel properties are the same between the two reference signals (e.g., on the two antenna ports). Thus, the reference signals can be linked to each other with respect to what the device can assume about their channel statistics or QCL properties. For example, qcl-Type may take one of the following values. Other qcl-Types may be defined based on combination of one or large-scale properties:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}.

Spatial Rx parameters may include one or more of: angle of arrival ("AoA") Dominant AoA, average AoA, angular spread, Power Angular Spectrum ("PAS") of AoA, average AoD (angle of departure), PAS of AoD, transmit/receive channel correlation, transmit/receive beamforming, spatial channel correlation etc.

The QCL-TypeA, QCL-TypeB and QCL-TypeC may be applicable for all carrier frequencies, but the QCL-TypeD may be applicable only in higher carrier frequencies (e.g., mmWave, FR2 and beyond), where essentially the device may not be able to perform omni-directional transmission, i.e. the device would need to form beams for directional transmission. A QCL-TypeD between two reference signals A and B, the reference signal A is considered to be spatially co-located with reference signal B and the device may assume that the reference signals A and B can be received with the same spatial filter (e.g., with the same RX beamforming weights).

An "antenna port" according to an embodiment may be a logical port that may correspond to a beam (resulting from beamforming) or may correspond to a physical antenna on a device. In some embodiments, a physical antenna may map directly to a single antenna port, in which an antenna port corresponds to an actual physical antenna. Alternately, a set or subset of physical antennas, or antenna set or antenna array or antenna sub-array, may be mapped to one or more antenna ports after applying complex weights, a cyclic delay, or both to the signal on each physical antenna. The physical antenna set may have antennas from a single module or panel or from multiple modules or panels. The weights may be fixed as in an antenna virtualization scheme, such as cyclic delay diversity (CDD). The procedure used to derive antenna ports from physical antennas may be specific to a device implementation and transparent to other devices.

In some of the embodiments described, a TCI-state (Transmission Configuration Indication) associated with a target transmission can indicate parameters for configuring a quasi-collocation relationship between the target transmission (e.g., target RS of DM-RS ports of the target transmission during a transmission occasion) and a source reference signal(s) (e.g., SSB/CSI-RS/SRS) with respect to quasi co-location type parameter(s) indicated in the corresponding TCI state. The TCI describes which reference signals are used as QCL source, and what QCL properties can be derived from each reference signal. A device can receive a configuration of a plurality of transmission configuration indicator states for a serving cell for transmissions on the serving cell (e.g., between an IAB-DU of a parent JAB node and an IAB-MT of a child JAB node). In some of the embodiments described, a TCI state comprises at least one source RS to provide a reference (device assumption) for determining QCL and/or spatial filter.

In some of the embodiments described, a UL TCI state is provided if a device is configured with separate DL/UL TCI by RRC signaling. The UL TCI state may comprise a source reference signal which provides a reference for determining UL spatial domain transmission filter for the UL transmission (e.g., dynamic-grant/configured-grant based PUSCH, dedicated PUCCH resources) in a CC or across a set of configured CCs/BWPs.

In some of the embodiments described, a joint DL/UL TCI state is provided if the device is configured with joint DL/UL TCI by RRC signaling (e.g., configuration of joint TCI or separate DL/UL TCI is based on RRC signaling). The joint DL/UL TCI state refers to at least a common source reference RS used for determining both the DL QCL information and the UL spatial transmission filter. The source RS determined from the indicated joint (or common) TCI state provides QCL Type-D indication (e.g., for device-dedicated PDCCH/PDSCH) and is used to determine UL spatial transmission filter (e.g., for UE-dedicated PUSCH/PUCCH) for a CC or across a set of configured CCs/BWPs. In one example, the UL spatial transmission filter is derived from the RS of DL QCL Type D in the joint TCI state. The spatial setting of the UL transmission may be according to the spatial relation with a reference to the source RS configured with qcl-Type set to 'typeD' in the joint TCI state.

In some of the embodiments described, a spatial relation information associated with a target transmission can indicate parameters for configuring a spatial setting between the target transmission and a reference RS (e.g., SSB/CSI-RS/SRS). For example, the device may transmit the target transmission with the same spatial domain filter used for reception the reference RS (e.g., DL RS such as SSB/CSI-RS). In another example, the device may transmit the target transmission with the same spatial domain transmission filter used for the transmission of the reference RS (e.g., UL RS such as SRS). A device can receive a configuration of a plurality of spatial relation information configurations for a serving cell for transmissions on the serving cell.

Figure 5:
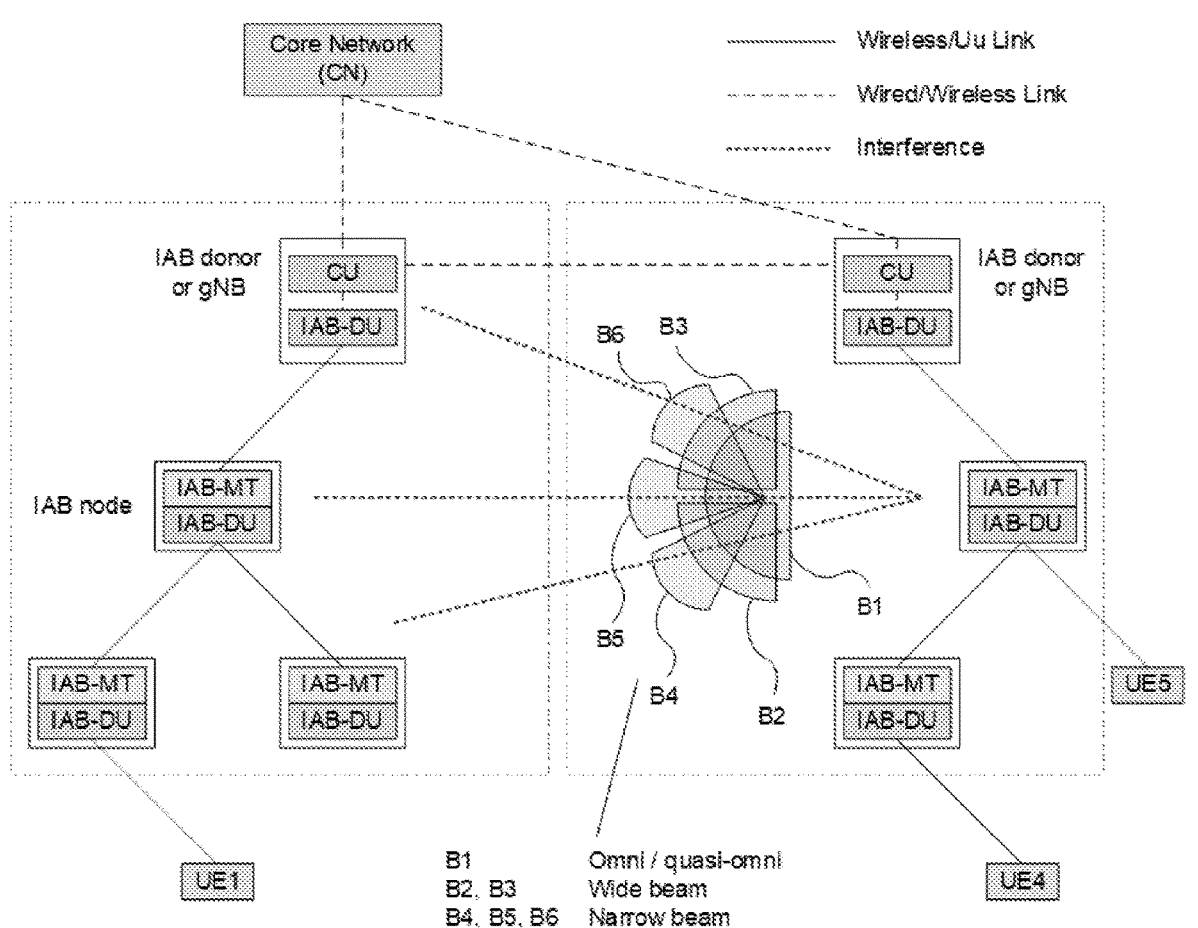
FIG. 5 illustrates an example scenario for beam association.

Reference is made in the present disclosure to association between beams in the context of spatial constraints for COT sharing and/or sensing sharing. Consider the example scenario illustrated in FIG. 5.

In this disclosure, an association between a first beam and a second beam may be an identity relationship, i.e., the first beam is identical to the second beam, e.g., both beams have a QCL Type D relationship with a reference signal transmitted or received through B2 in the figure. Alternatively, the first beam may have a coverage overlap or a significant coverage overlap with the second beam, e.g., B2 and B5 in the figure. As a special case, the first beam may have a first coverage and the second beam may have a second coverage, wherein the first coverage is a subset of the first coverage, or conversely, the second coverage is a subset of the first coverage, e.g., beams B2 and B4 in the figure. An association between beams may be determined based on:

beam angles of the first beam and the second beam, e.g., beams B2 and B4 in the figure;

beam-widths of the first beam and the second beam, e.g., beams B4 and B5 in the figure;

a spatial QCL relationship such as a QCL Type D

The association may be determined according to an implementation, deployment, capability signaling, configuration, control signaling, or a combination thereof.

The following should be noted throughout this disclosure:

Although the entities are referred to as IAB nodes, the same methods can be applied to IAB donors, which are the IAB entities connecting the core network to the JAB network, with minimum or zero modifications.

The different steps described for the example embodiments, in the text and in the flowcharts, may be permuted.

Each configuration may be provided by one or multiple configurations in practice. An earlier configuration may provide a subset of parameters while a later configuration may provide another subset of parameters. Alternatively, a later configuration may override values provided by an earlier configuration or a pre-configuration.

A configuration may be provided by a RRC signaling, a MAC signaling, a physical layer signaling such as a DCI message, a combination thereof, or other methods. A configuration may include a pre-configuration or a semi-static configuration provided by the standard, by the vendor, and/or by the network/operator. Each parameter value received through configuration or indication may override previous values for a similar parameter.

Despite frequent references to IAB, the proposed solutions may be applicable to wireless relay nodes and other types of wireless communication entities.

L1/L2 control signaling may refer to control signaling in layer 1 (physical layer) or layer 2 (data link layer). Particularly, an L1/L2 control signaling may refer to an L1 control signaling such as a DCI message or a UCI message, an L2 control signaling such as a MAC message, or a combination thereof. A format and an interpretation of an L1/L2 control signaling may be determined by the standard, a configuration, other control signaling, or a combination thereof.

Any parameter discussed in this disclosure may appear, in practice, as a linear function of that parameter in signaling or specifications.

It was discussed in 3GPP RAN to allow a vendor (manufacturing JAB systems/devices) and an operator (deploying the IAB systems/devices) to negotiate capabilities of the systems/devices. This means that some of the information assumed to need signaling between entities may readily be available to the devices, for example, by storing the information on a memory unit such as a read-only memory (ROM), exchanging the information by proprietary signaling methods, providing the information by a (pre)configuration, or otherwise taking the information into account when creating hardware and/or software of the IAB systems/devices or other entities in the network. In this case, methods described in this disclosure that comprise exchanging the information can be extended to similar methods wherein the information is obtained by those said other methods.

Methods and systems proposed for an IAB-MT may be adopted by a UE as well. If a method or system requires a capability that is not supported by a legacy UE, a UE enhanced to possess the capability may be used. In this case, the UE may be referred to as an enhanced UE or an IAB-enhanced UE and may convey its information of its enhanced capability to the network for proper configuration and operation.

In this disclosure, a node or a wireless node may refer to an IAB node, an IAB-DU, an IAB-MT, a UE, a base station or a gNB or a transmit-receive point ("TRP") or an IAB donor, and so on. The examples embodiments provided with an emphasis on the type of nodes are not meant to limit the scope of the invention.

There is an emphasis in the description of the methods proposed in this disclosure to perform measurements for beam training on reference signals. Alternatively, in some embodiments, a measurement may be performed on resources that are not necessarily configured for reference signals, but rather a node may measure a receive signal power and obtain a receive signal strength indicator ("RSSI") or the like.

In the present disclosure, reference is frequently made to beam indication. In practice, according to a standard specification, a beam indication may refer to an indication of a reference signal by an ID or indicator, a resource associated with a reference signal, a spatial relation information comprising information of a reference signal or a reciprocal of a reference signal (in the case of beam correspondence).

Figure 6:
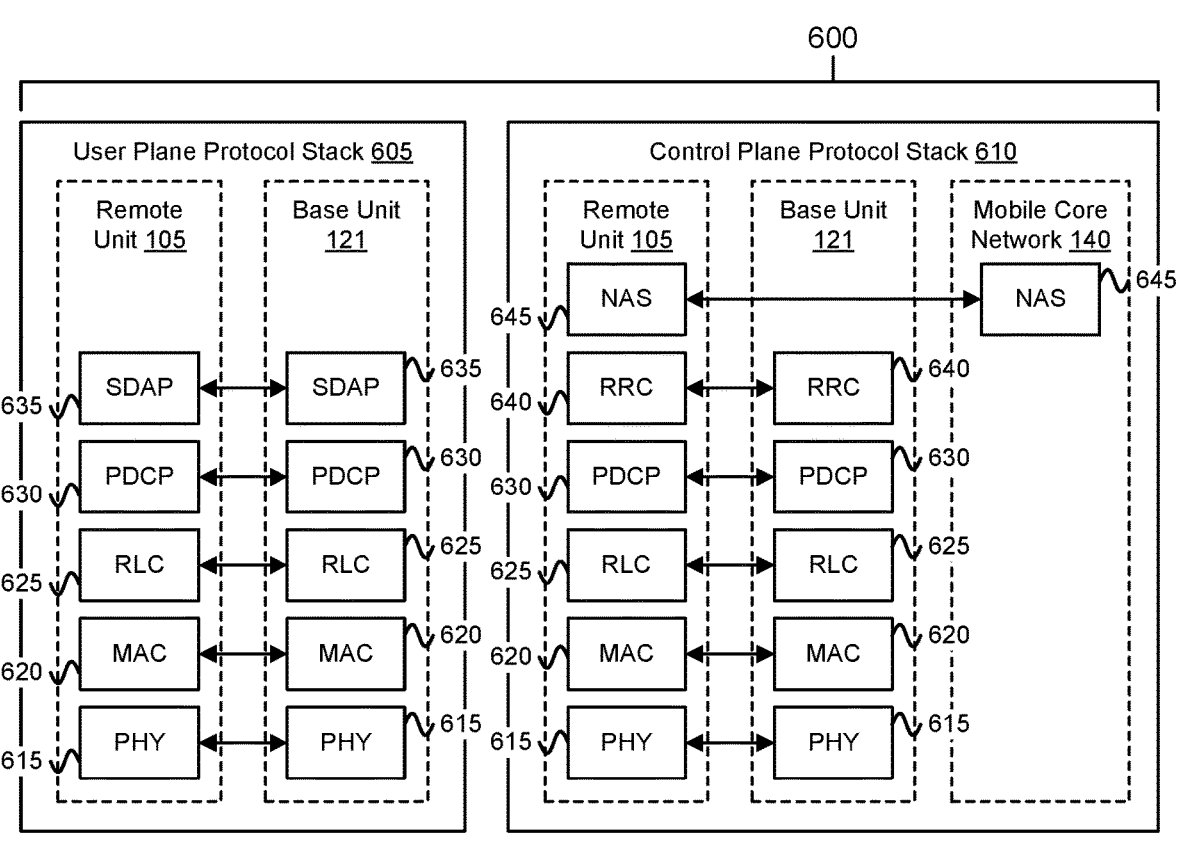
FIG. 6 is a diagram illustrating one embodiment of a NR protocol stack.

FIG. 6 depicts a NR protocol stack 600, according to embodiments of the disclosure. While FIG. 6 shows the remote unit 105, the base unit 121 and the mobile core network 130, these are representative of a set of UEs interacting with a RAN node and a NF (e.g., AMF) in a core network. As depicted, the protocol stack 600 comprises a User Plane protocol stack 605 and a Control Plane protocol stack 610. The User Plane protocol stack 605 includes a physical ("PHY") layer 615, a Medium Access Control ("MAC") sublayer 620, a Radio Link Control ("RLC") sublayer 625, a Packet Data Convergence Protocol ("PDCP") sublayer 630, and Service Data Adaptation Protocol ("SDAP") layer 635. The Control Plane protocol stack 610 also includes a physical layer 615, a MAC sublayer 620, a RLC sublayer 625, and a PDCP sublayer 630. The Control Place protocol stack 610 also includes a Radio Resource Control ("RRC") layer and a Non-Access Stratum ("NAS") layer 645.

The AS protocol stack for the Control Plane protocol stack 610 consists of at least RRC, PDCP, RLC and MAC sublayers, and the physical layer. The AS protocol stack for the User Plane protocol stack 605 consists of at least SDAP, PDCP, RLC and MAC sublayers, and the physical layer. The Layer-2 ("L2") is split into the SDAP, PDCP, RLC and MAC sublayers. The Layer-3 ("L3") includes the RRC sublayer 640 and the NAS layer 645 for the control plane and includes, e.g., an Internet Protocol ("IP") layer or PDU Layer (note depicted) for the user plane. L1 and L2 are referred to as "lower layers" such as PUCCH/PUSCH or MAC CE, while L3 and above (e.g., transport layer, application layer) are referred to as "higher layers" or "upper layers" such as RRC.

The physical layer 615 offers transport channels to the MAC sublayer 620. The MAC sublayer 620 offers logical channels to the RLC sublayer 625. The RLC sublayer 625 offers RLC channels to the PDCP sublayer 630. The PDCP sublayer 630 offers radio bearers to the SDAP sublayer 635 and/or RRC layer 640. The SDAP sublayer 635 offers QoS flows to the mobile core network 130 (e.g., 5GC). The RRC layer 640 provides for the addition, modification, and release of Carrier Aggregation and/or Dual Connectivity. The RRC layer 640 also manages the establishment, configuration, maintenance, and release of Signaling Radio Bearers ("SRBs") and Data Radio Bearers ("DRBs"). In certain embodiments, a RRC entity functions for detection of and recovery from radio link failure.

Figure 7:
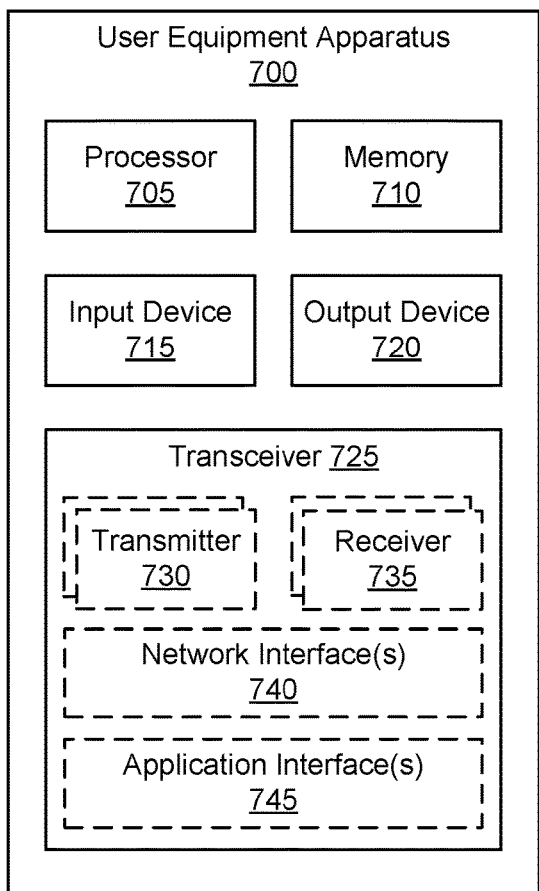
FIG. 7 is a block diagram illustrating one embodiment of a user equipment apparatus that may be used for unlicensed spectrum access in integrated access and backhaul.

FIG. 7 depicts a user equipment apparatus 700 that may be used for unlicensed spectrum access in integrated access and backhaul, according to embodiments of the disclosure. In various embodiments, the user equipment apparatus 700 is used to implement one or more of the solutions described above. The user equipment apparatus 700 may be one embodiment of a UE, such as the remote unit 105 and/or the UE 205, as described above. Furthermore, the user equipment apparatus 700 may include a processor 705, a memory 710, an input device 715, an output device 720, and a transceiver 725. In some embodiments, the input device 715 and the output device 720 are combined into a single device, such as a touchscreen. In certain embodiments, the user equipment apparatus 700 may not include any input device 715 and/or output device 720. In various embodiments, the user equipment apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. Here, the transceiver 725 communicates with one or more base units 121. Additionally, the transceiver 725 may support at least one network interface 740 and/or application interface 745. The application interface(s) 745 may support one or more APIs. The network interface(s) 740 may support 3GPP reference points, such as Uu and PC5. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), a digital signal processor ("DSP"), a co-processor, an application-specific processor, or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725. In certain embodiments, the processor 705 may include an application processor (also known as "main processor") which manages application-domain and operating system ("OS") functions and a baseband processor (also known as "baseband radio processor") which manages radio functions.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to unlicensed spectrum access in integrated access and backhaul. For example, the memory 710 may store parameters, configurations, resource assignments, policies, and the like as described above. In certain embodiments, the memory 710 also stores program code and related data, such as an operating system or other controller algorithms operating on the user equipment apparatus 700, and one or more software applications.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the user equipment apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 includes at least transmitter 730 and at least one receiver 735. The transceiver 725 may be used to provide UL communication signals to a base unit 121 and to receive DL communication signals from the base unit 121, as described herein. Similarly, the transceiver 725 may be used to transmit and receive SL signals (e.g., V2X communication), as described herein. Although only one transmitter 730 and one receiver 735 are illustrated, the user equipment apparatus 700 may have any suitable number of transmitters 730 and receivers 735. Further, the transmitter(s) 730 and the receiver(s) 735 may be any suitable type of transmitters and receivers. In one embodiment, the transceiver 725 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 725, transmitters 730, and receivers 735 may be implemented as physically separate components that access a shared hardware resource and/or software resource, such as for example, the network interface 740.

In various embodiments, one or more transmitters 730 and/or one or more receivers 735 may be implemented and/or integrated into a single hardware component, such as a multi-transceiver chip, a system-on-a-chip, an ASIC, or other type of hardware component. In certain embodiments, one or more transmitters 730 and/or one or more receivers 735 may be implemented and/or integrated into a multi-chip module. In some embodiments, other components such as the network interface 740 or other hardware components/ circuits may be integrated with any number of transmitters 730 and/or receivers 735 into a single chip. In such embodiment, the transmitters 730 and receivers 735 may be logically configured as a transceiver 725 that uses one more common control signals or as modular transmitters 730 and receivers 735 implemented in the same hardware chip or in a multi-chip module.

In one embodiment, the processor 705 is configured to cause the apparatus 700 to sense a shared medium by using a first entity of the apparatus 700. In one embodiment, the processor 705 is configured to cause the apparatus 700 to transmit, using the first entity of the apparatus 700, a first plurality of signals for a first duration and over the shared medium in response to the sensed shared medium being in an idle state. In one embodiment, the processor 705 is configured to cause the apparatus 700 to transmit, based at least in part on a second entity of the apparatus 700 being allowed to use the shared medium without sensing the shared medium, a second plurality of signals for a second duration and over the shared medium using the second entity of the apparatus 700.

In one embodiment, the processor 705 is configured to determine that the second entity is allowed to transmit the second plurality of signals without sensing the shared medium based at least in part on that the first duration is less than a threshold, or a sum of the first duration and the second duration is less than or equal to the threshold, or both.

In one embodiment, the processor 705 is configured to determine that the second entity is allowed to transmit the second plurality of signals without sensing the shared medium based at least in part on that the first duration is less than a first threshold, or a sum of the first duration and the second duration is less than a second threshold, wherein the second threshold is different from the first threshold.

In one embodiment, the processor 705 is configured to determine that the second entity is allowed to transmit the second plurality of signals without sensing the shared medium based at least in part on a first spatial parameter associated with transmission of the first plurality of signals being identical to a second spatial parameter associated with transmission of the second plurality of signals.

In one embodiment, the processor 705 is configured to determine that the second entity is allowed to transmit the second plurality of signals without sensing the shared medium based at least in part on an angular relationship between a first beam associated with transmission of the first plurality of signals and a second beam associated with transmission of the second plurality of signals, the angular relationship comprising the first beam overlapping with the second beam, a first coverage of one of the first beam and the second beam being a subset of a second coverage of the other of the first beam and the second beam, a first relationship between beam angles of the first beam and the second beam, a second relationship between widths of the first beam and the second beam, or a combination thereof.

In one embodiment, the processor 705 is configured to determine that the second entity is allowed to transmit the second plurality of signals without sensing the shared medium based at least in part on one or more first hardware associated with the first entity being collocated with one or more second hardware associated with the second entity.

In one embodiment, the processor 705 is configured to receive control signaling indicating a channel access configuration comprising an indication that the second entity is allowed to transmit the second plurality of signals without sensing the shared medium.

In one embodiment, the processor 705 is configured to determine whether the second entity is allowed to transmit the second plurality of signals based at least in part on a first QoS requirement associated with the first plurality of signals, a second QoS requirement associated with the second plurality of signals, or both.

In one embodiment, the processor 705 is configured to receive signaling indicating at least one of the first duration, the second duration, a sum of the first duration and the second duration, a maximum of the first duration, a maximum of the second duration, or a maximum of the sum of the first duration and the second duration, wherein the signaling comprises a RRC message, a PHY layer signaling, a MAC signaling, or a combination thereof.

In one embodiment, the processor 705 is configured to multiplex the first plurality of signals and the second plurality of signals according to a TDM scheme.

In one embodiment, the first plurality of signals and the second plurality of signals overlap in a time domain according to an FDM, an SDM scheme, or a combination thereof.

In one embodiment, wherein to sense the shared medium is based on a first energy detection threshold in response to that the second entity is not allowed to transmit the second plurality of signals without sensing the shared medium, and sense the shared medium is based on a second energy detection threshold in response to that the second entity is allowed to transmit a second plurality of signals without sensing the medium, and wherein the second energy detection threshold is different from the first energy detection threshold.

In one embodiment, the apparatus 700 is a wireless IAB node, the first entity is at least one of an IAB-DU or an IAB-MT, and the second entity is at least one of the IAB-MT or the IAB-DU.

In one embodiment, the processor 705 is configured to cause the wireless network node to sense, using one of an IAB-DU and an IAB-MT, a shared medium. In one embodiment, the processor 705 is configured to transmit, using the one of the IAB-DU and the IAB-MT, a first plurality of signals for a first duration and over the shared medium in response to the sensed shared medium being in an idle state. In one embodiment, the processor 705 is configured to transmit, based at least in part on the other of the one of the IAB-DU and the IAB-MT being allowed to use the shared medium without sensing the shared medium, a second plurality of signals for a second duration and over the shared medium using the other of the one of the IAB-DU and the IAB-MT.

Figure 8:
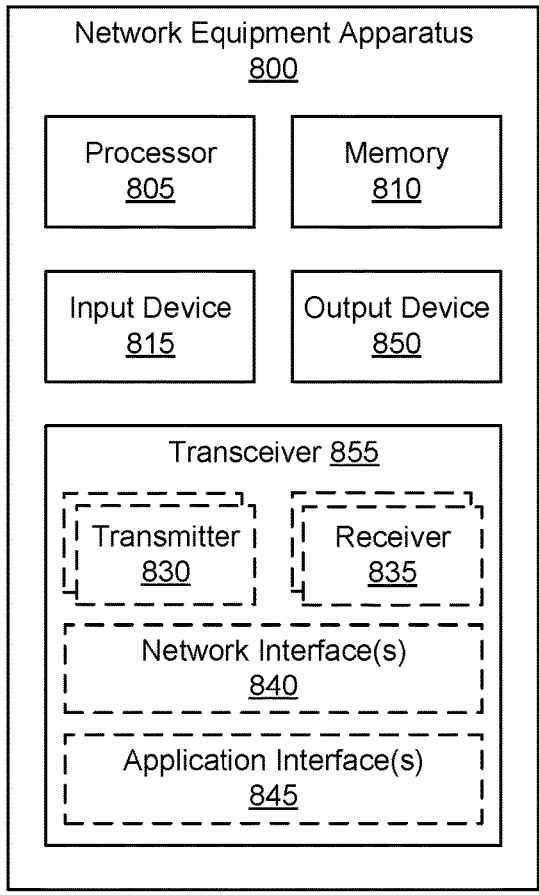
FIG. 8 is a block diagram illustrating one embodiment of a network apparatus that may be used for unlicensed spectrum access in integrated access and backhaul.

FIG. 8 depicts one embodiment of a network apparatus 800 that may be used for unlicensed spectrum access in integrated access and backhaul, according to embodiments of the disclosure. In some embodiments, the network apparatus 800 may be one embodiment of a RAN node and its supporting hardware, such as the base unit 121 and/or gNB, described above. Furthermore, network apparatus 800 may include a processor 805, a memory 810, an input device 815, an output device 820, and a transceiver 825. In certain embodiments, the network apparatus 800 does not include any input device 815 and/or output device 820.

As depicted, the transceiver 825 includes at least one transmitter 830 and at least one receiver 835. Here, the transceiver 825 communicates with one or more remote units 105. Additionally, the transceiver 825 may support at least one network interface 840 and/or application interface 845. The application interface(s) 845 may support one or more APIs. The network interface(s) 840 may support 3GPP reference points, such as Uu, N1, N2, N3, N5, N6 and/or N7 interfaces. Other network interfaces 840 may be supported, as understood by one of ordinary skill in the art.

When implementing an NEF, the network interface(s) 840 may include an interface for communicating with an application function (i.e., N5) and with at least one network function (e.g., UDR, SFC function, UPF) in a mobile communication network, such as the mobile core network 130.

The processor 805, in one embodiment, may include any known controller capable of executing computer-readable instructions and/or capable of performing logical operations. For example, the processor 805 may be a microcontroller, a microprocessor, a CPU, a GPU, an auxiliary processing unit, an FPGA, a DSP, a co-processor, an application-specific processor, or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825. In certain embodiments, the processor 805 may include an application processor (also known as "main processor") which manages application-domain and OS functions and a baseband processor (also known as "baseband radio processor") which manages radio function. In various embodiments, the processor 805 controls the network apparatus 800 to implement the above described network entity behaviors (e.g., of the gNB) for unlicensed spectrum access in integrated access and backhaul.

The memory 810, in one embodiment, is a computer readable storage medium. In some embodiments, the memory 810 includes volatile computer storage media. For example, the memory 810 may include a RAM, including DRAM, SDRAM, and/or SRAM. In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data relating to unlicensed spectrum access in integrated access and backhaul. For example, the memory 810 may store parameters, configurations, resource assignments, policies, and the like as described above. In certain embodiments, the memory 810 also stores program code and related data, such as an OS or other controller algorithms operating on the network apparatus 800, and one or more software applications.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, may include any known electronically controllable display or display device. The output device 820 may be designed to output visual, audible, and/or haptic signals. In some embodiments, the output device 820 includes an electronic display capable of outputting visual data to a user. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, all or portions of the output device 820 may be located near the input device 815.

As discussed above, the transceiver 825 may communicate with one or more remote units and/or with one or more interworking functions that provide access to one or more PLMNs. The transceiver 825 may also communicate with one or more network functions (e.g., in the mobile core network 80). The transceiver 825 operates under the control of the processor 805 to transmit messages, data, and other signals and also to receive messages, data, and other signals. For example, the processor 805 may selectively activate the transceiver (or portions thereof) at particular times in order to send and receive messages.

The transceiver 825 may include one or more transmitters 830 and one or more receivers 835. In certain embodiments, the one or more transmitters 830 and/or the one or more receivers 835 may share transceiver hardware and/or circuitry. For example, the one or more transmitters 830 and/or the one or more receivers 835 may share antenna(s), antenna tuner(s), amplifier(s), filter(s), oscillator(s), mixer(s), modulator/demodulator(s), power supply, and the like. In one embodiment, the transceiver 825 implements multiple logical transceivers using different communication protocols or protocol stacks, while using common physical hardware.

In one embodiment, the processor 805 is configured to cause the apparatus 800 to sense a shared medium by using a first entity of the apparatus 800. In one embodiment, the processor 805 is configured to cause the apparatus 800 to transmit, using the first entity of the apparatus 800, a first plurality of signals for a first duration and over the shared medium in response to the sensed shared medium being in an idle state. In one embodiment, the processor 805 is configured to cause the apparatus 800 to transmit, based at least in part on a second entity of the apparatus 800 being allowed to use the shared medium without sensing the shared medium, a second plurality of signals for a second duration and over the shared medium using the second entity of the apparatus 800.

In one embodiment, the processor 805 is configured to determine that the second entity is allowed to transmit the second plurality of signals without sensing the shared medium based at least in part on that the first duration is less than a threshold, or a sum of the first duration and the second duration is less than or equal to the threshold, or both.

In one embodiment, the processor 805 is configured to determine that the second entity is allowed to transmit the second plurality of signals without sensing the shared medium based at least in part on that the first duration is less than a first threshold, or a sum of the first duration and the second duration is less than a second threshold, wherein the second threshold is different from the first threshold.

In one embodiment, the processor 805 is configured to determine that the second entity is allowed to transmit the second plurality of signals without sensing the shared medium based at least in part on a first spatial parameter associated with transmission of the first plurality of signals being identical to a second spatial parameter associated with transmission of the second plurality of signals.

In one embodiment, the processor 805 is configured to determine that the second entity is allowed to transmit the second plurality of signals without sensing the shared medium based at least in part on an angular relationship between a first beam associated with transmission of the first plurality of signals and a second beam associated with transmission of the second plurality of signals, the angular relationship comprising the first beam overlapping with the second beam, a first coverage of one of the first beam and the second beam being a subset of a second coverage of the other of the first beam and the second beam, a first relationship between beam angles of the first beam and the second beam, a second relationship between widths of the first beam and the second beam, or a combination thereof.

In one embodiment, the processor 805 is configured to determine that the second entity is allowed to transmit the second plurality of signals without sensing the shared medium based at least in part on one or more first hardware associated with the first entity being collocated with one or more second hardware associated with the second entity.

In one embodiment, the processor 805 is configured to receive control signaling indicating a channel access configuration comprising an indication that the second entity is allowed to transmit the second plurality of signals without sensing the shared medium.

In one embodiment, the processor 805 is configured to determine whether the second entity is allowed to transmit the second plurality of signals based at least in part on a first QoS requirement associated with the first plurality of signals, a second QoS requirement associated with the second plurality of signals, or both.

In one embodiment, the processor 805 is configured to receive signaling indicating at least one of the first duration, the second duration, a sum of the first duration and the second duration, a maximum of the first duration, a maximum of the second duration, or a maximum of the sum of the first duration and the second duration, wherein the signaling comprises a RRC message, a PHY layer signaling, a MAC signaling, or a combination thereof.

In one embodiment, the processor 805 is configured to multiplex the first plurality of signals and the second plurality of signals according to a TDM scheme.

In one embodiment, the first plurality of signals and the second plurality of signals overlap in a time domain according to an FDM, an SDM scheme, or a combination thereof.

In one embodiment, wherein to sense the shared medium is based on a first energy detection threshold in response to that the second entity is not allowed to transmit the second plurality of signals without sensing the shared medium, and sense the shared medium is based on a second energy detection threshold in response to that the second entity is allowed to transmit a second plurality of signals without sensing the medium, and wherein the second energy detection threshold is different from the first energy detection threshold.

In one embodiment, the apparatus 800 is a wireless IAB node, the first entity is at least one of an IAB-DU or an IAB-MT, and the second entity is at least one of the IAB-MT or the IAB-DU.

In one embodiment, the processor 805 is configured to cause the wireless network node to sense, using one of an IAB-DU and an IAB-MT, a shared medium. In one embodiment, the processor 805 is configured to transmit, using the one of the IAB-DU and the IAB-MT, a first plurality of signals for a first duration and over the shared medium in response to the sensed shared medium being in an idle state. In one embodiment, the processor 805 is configured to transmit, based at least in part on the other of the one of the IAB-DU and the IAB-MT being allowed to use the shared medium without sensing the shared medium, a second plurality of signals for a second duration and over the shared medium using the other of the one of the IAB-DU and the IAB-MT.

FIG. 9 is a flowchart diagram of a method 900 for unlicensed spectrum access in integrated access and backhaul. The method 900 may be performed by a UE as described herein, for example, the remote unit 105 and/or the user equipment apparatus 700. The method 900 may be performed by a network entity such as a base station, a gNb, and/or the network equipment apparatus 800. In some embodiments, the method 900 may be performed by a processor executing program code, for example, a microcontroller, a microprocessor, a CPU, a GPU, an auxiliary processing unit, a FPGA, or the like.

In one embodiment, the method 900 begins and senses 905 a shared medium by using a first entity of a wireless node. In one embodiment, the first method transmits 910, using the first entity of the wireless node, a first plurality of signals for a first duration and over the shared medium in response to the sensed shared medium being in an idle state. In one embodiment, the first method transmits, based at least in part on a second entity of the wireless node being allowed to use the shared medium without sensing the shared medium, a second plurality of signals for a second duration and over the shared medium using the second entity of the wireless node, and the method 900 ends.

FIG. 10 is a flowchart diagram of a method 1000 for unlicensed spectrum access in integrated access and backhaul. The method 1000 may be performed by a UE as described herein, for example, the remote unit 105 and/or the user equipment apparatus 700. The method 1000 may be performed by a network entity such as a base station, a gNb, and/or the network equipment apparatus 800. In some embodiments, the method 1000 may be performed by a processor executing program code, for example, a microcontroller, a microprocessor, a CPU, a GPU, an auxiliary processing unit, a FPGA, or the like.

In one embodiment, the method 1000 begins and senses 1005, using one of an IAB-DU and an IAB-MT, a shared medium. In one embodiment, the method 1000 transmits 1010, using the one of the IAB-DU and the IAB-MT, a first plurality of signals for a first duration and over the shared medium in response to the sensed shared medium being in an idle state. In one embodiment, the method 1000 transmits 1015, based at least in part on the other of the one of the IAB-DU and the IAB-MT being allowed to use the shared medium without sensing the shared medium, a second plurality of signals for a second duration and over the shared medium using the other of the one of the IAB-DU and the IAB-MT, and the method 1000 ends.

A first apparatus is disclosed for unlicensed spectrum access in integrated access and backhaul. The first apparatus may include a UE as described herein, for example, the remote unit 105 and/or the user equipment apparatus 700. The first apparatus may include a network entity such as a base station, a gNb, and/or the network equipment apparatus 800. In some embodiments, the first apparatus includes a processor executing program code, for example, a microcontroller, a microprocessor, a CPU, a GPU, an auxiliary processing unit, a FPGA, or the like.

In one embodiment, the first apparatus includes a processor and a memory coupled to the processor. In one embodiment, the processor is configured to cause the apparatus to sense a shared medium by using a first entity of the apparatus. In one embodiment, the processor is configured to cause the apparatus to transmit, using the first entity of the apparatus, a first plurality of signals for a first duration and over the shared medium in response to the sensed shared medium being in an idle state. In one embodiment, the processor is configured to cause the apparatus to transmit, based at least in part on a second entity of the apparatus being allowed to use the shared medium without sensing the shared medium, a second plurality of signals for a second duration and over the shared medium using the second entity of the apparatus.

In one embodiment, the processor is configured to determine that the second entity is allowed to transmit the second plurality of signals without sensing the shared medium based at least in part on that the first duration is less than a threshold, or a sum of the first duration and the second duration is less than or equal to the threshold, or both.

In one embodiment, the processor is configured to determine that the second entity is allowed to transmit the second plurality of signals without sensing the shared medium based at least in part on that the first duration is less than a first threshold, or a sum of the first duration and the second duration is less than a second threshold, wherein the second threshold is different from the first threshold.

In one embodiment, the processor is configured to determine that the second entity is allowed to transmit the second plurality of signals without sensing the shared medium based at least in part on a first spatial parameter associated with transmission of the first plurality of signals being identical to a second spatial parameter associated with transmission of the second plurality of signals.

In one embodiment, the processor is configured to determine that the second entity is allowed to transmit the second plurality of signals without sensing the shared medium based at least in part on an angular relationship between a first beam associated with transmission of the first plurality of signals and a second beam associated with transmission of the second plurality of signals, the angular relationship comprising the first beam overlapping with the second beam, a first coverage of one of the first beam and the second beam being a subset of a second coverage of the other of the first beam and the second beam, a first relationship between beam angles of the first beam and the second beam, a second relationship between widths of the first beam and the second beam, or a combination thereof.

In one embodiment, the processor is configured to determine that the second entity is allowed to transmit the second plurality of signals without sensing the shared medium based at least in part on one or more first hardware associated with the first entity being collocated with one or more second hardware associated with the second entity.

In one embodiment, the processor is configured to receive control signaling indicating a channel access configuration comprising an indication that the second entity is allowed to transmit the second plurality of signals without sensing the shared medium.

In one embodiment, the processor is configured to determine whether the second entity is allowed to transmit the second plurality of signals based at least in part on a first QoS requirement associated with the first plurality of signals, a second QoS requirement associated with the second plurality of signals, or both.

In one embodiment, the processor is configured to receive signaling indicating at least one of the first duration, the second duration, a sum of the first duration and the second duration, a maximum of the first duration, a maximum of the second duration, or a maximum of the sum of the first duration and the second duration, wherein the signaling comprises a RRC message, a PHY layer signaling, a MAC signaling, or a combination thereof.

In one embodiment, the processor is configured to multiplex the first plurality of signals and the second plurality of signals according to a TDM scheme.

In one embodiment, the first plurality of signals and the second plurality of signals overlap in a time domain according to an FDM, an SDM scheme, or a combination thereof.

In one embodiment, wherein to sense the shared medium is based on a first energy detection threshold in response to that the second entity is not allowed to transmit the second plurality of signals without sensing the shared medium, and sense the shared medium is based on a second energy detection threshold in response to that the second entity is allowed to transmit a second plurality of signals without sensing the medium, and wherein the second energy detection threshold is different from the first energy detection threshold.

In one embodiment, the apparatus is a wireless IAB node, the first entity is at least one of an IAB-DU or an IAB-MT, and the second entity is at least one of the IAB-MT or the IAB-DU.

A first method is disclosed for unlicensed spectrum access in integrated access and backhaul. The first method may be performed by a UE as described herein, for example, the remote unit 105 and/or the user equipment apparatus 700. The first method may be performed by a network entity such as a base station, a gNb, and/or the network equipment apparatus 800. In some embodiments, the first method may be performed by a processor executing program code, for example, a microcontroller, a microprocessor, a CPU, a GPU, an auxiliary processing unit, a FPGA, or the like.

In one embodiment, the first method senses a shared medium by using a first entity of a wireless node. In one embodiment, the first method transmits, using the first entity of the wireless node, a first plurality of signals for a first duration and over the shared medium in response to the sensed shared medium being in an idle state. In one embodiment, the first method transmits, based at least in part on a second entity of the wireless node being allowed to use the shared medium without sensing the shared medium, a second plurality of signals for a second duration and over the shared medium using the second entity of the wireless node.

In one embodiment, the first method determines that the second entity is allowed to transmit the second plurality of signals without sensing the shared medium based at least in part on that the first duration is less than a threshold, or a sum of the first duration and the second duration is less than or equal to the threshold, or both.

In one embodiment, the first method determines that the second entity is allowed to transmit the second plurality of signals without sensing the shared medium based at least in part on that the first duration is less than a first threshold, or a sum of the first duration and the second duration is less than a second threshold, wherein the second threshold is different from the first threshold.

In one embodiment, the first method determines that the second entity is allowed to transmit the second plurality of signals without sensing the shared medium based at least in part on a first spatial parameter associated with transmission of the first plurality of signals being identical to a second spatial parameter associated with transmission of the second plurality of signals.

In one embodiment, the first method determines that the second entity is allowed to transmit the second plurality of signals without sensing the shared medium based at least in part on an angular relationship between a first beam associated with transmission of the first plurality of signals and a second beam associated with transmission of the second plurality of signals, the angular relationship comprising the first beam overlapping with the second beam, a first coverage of one of the first beam and the second beam being a subset of a second coverage of the other of the first beam and the second beam, a first relationship between beam angles of the first beam and the second beam, a second relationship between widths of the first beam and the second beam, or a combination thereof.

In one embodiment, the first method determines that the second entity is allowed to transmit the second plurality of signals without sensing the shared medium based at least in part on one or more first hardware associated with the first entity being collocated with one or more second hardware associated with the second entity.

In one embodiment, the first method receives control signaling indicating a channel access configuration comprising an indication that the second entity is allowed to transmit the second plurality of signals without sensing the shared medium.

In one embodiment, the first method determines whether the second entity is allowed to transmit the second plurality of signals based at least in part on a first QoS requirement associated with the first plurality of signals, a second QoS requirement associated with the second plurality of signals, or both.

In one embodiment, the first method receives signaling indicating at least one of the first duration, the second duration, a sum of the first duration and the second duration, a maximum of the first duration, a maximum of the second duration, or a maximum of the sum of the first duration and the second duration, wherein the signaling comprises a RRC message, a PHY layer signaling, a MAC signaling, or a combination thereof.

In one embodiment, the first method multiplexes the first plurality of signals and the second plurality of signals according to a TDM scheme.

In one embodiment, the first plurality of signals and the second plurality of signals overlap in a time domain according to an FDM, an SDM scheme, or a combination thereof.

In one embodiment, wherein to sense the shared medium is based on a first energy detection threshold in response to that the second entity is not allowed to transmit the second plurality of signals without sensing the shared medium, and sense the shared medium is based on a second energy detection threshold in response to that the second entity is allowed to transmit a second plurality of signals without sensing the medium, and wherein the second energy detection threshold is different from the first energy detection threshold.

In one embodiment, the wireless node is a wireless IAB node, the first entity is at least one of an IAB-DU or an IAB-MT, and the second entity is at least one of the IAB-MT or the IAB-DU.

A second apparatus is disclosed for unlicensed spectrum access in integrated access and backhaul. The second apparatus may include a UE as described herein, for example, the remote unit 105 and/or the user equipment apparatus 700. The first apparatus may include a network entity such as a base station, a gNb, and/or the network equipment apparatus 800. In some embodiments, the second apparatus includes a processor executing program code, for example, a microcontroller, a microprocessor, a CPU, a GPU, an auxiliary processing unit, a FPGA, or the like.

In one embodiment, the second apparatus includes a processor and a memory coupled to the processor. In one embodiment, the processor is configured to cause the wireless network node to sense, using one of an IAB-DU and an IAB-MT, a shared medium. In one embodiment, the processor is configured to transmit, using the one of the IAB-DU and the IAB-MT, a first plurality of signals for a first duration and over the shared medium in response to the sensed shared medium being in an idle state. In one embodiment, the processor is configured to transmit, based at least in part on the other of the one of the IAB-DU and the IAB-MT being allowed to use the shared medium without sensing the shared medium, a second plurality of signals for a second duration and over the shared medium using the other of the one of the IAB-DU and the IAB-MT.

A second method is disclosed for unlicensed spectrum access in integrated access and backhaul. The second method may be performed by a UE as described herein, for example, the remote unit 105 and/or the user equipment apparatus 700. The second method may be performed by a network entity such as a base station, a gNb, and/or the network equipment apparatus 800. In some embodiments, the second method may be performed by a processor executing program code, for example, a microcontroller, a microprocessor, a CPU, a GPU, an auxiliary processing unit, a FPGA, or the like.

In one embodiment, the second method senses, using one of an IAB-DU and an IAB-MT, a shared medium. In one embodiment, the second method transmits, using the one of the IAB-DU and the IAB-MT, a first plurality of signals for a first duration and over the shared medium in response to the sensed shared medium being in an idle state. In one embodiment, the second method transmits, based at least in part on the other of the one of the IAB-DU and the IAB-MT being allowed to use the shared medium without sensing the shared medium, a second plurality of signals for a second duration and over the shared medium using the other of the one of the IAB-DU and the IAB-MT.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A network equipment ("NE"), comprising:
at least one memory; and
at least one processor coupled with the at least one memory and configured to cause the NE to:
  sense a shared medium using a first entity of the NE;
  transmit, using the first entity, a first plurality of signals for a first duration and over the shared medium in response to the shared medium being in an idle state; and
  transmit, using a second entity of the NE that is collocated with the first entity, a second plurality of signals for a second duration and over the shared medium without sensing the shared medium.

2. The NE of claim 1, wherein the at least one processor is configured to cause the NE to:
  determine that the second entity is allowed to transmit the second plurality of signals without sensing the shared medium based at least in part on that the first duration is less than a threshold, or a sum of the first duration and the second duration is less than or equal to the threshold, or both.

3. The NE of claim 1, wherein the at least one processor is configured to cause the NE to:
  determine that the second entity is allowed to transmit the second plurality of signals without sensing the shared medium based at least in part on that the first duration is less than a first threshold, or a sum of the first duration and the second duration is less than a second threshold, wherein the second threshold is different from the first threshold.

4. The NE of claim 1, wherein the at least one processor is configured to cause the NE to:
  determine that the second entity is allowed to transmit the second plurality of signals without sensing the shared medium based at least in part on a first spatial parameter associated with transmission of the first plurality of signals being identical to a second spatial parameter associated with transmission of the second plurality of signals.

5. The NE of claim 1, wherein the at least one processor is configured to cause the NE to:
  determine that the second entity is allowed to transmit the second plurality of signals without sensing the shared medium based at least in part on an angular relationship between a first beam associated with transmission of the first plurality of signals and a second beam associated with transmission of the second plurality of signals, the angular relationship comprising the first beam overlapping with the second beam, a first coverage of one of the first beam and the second beam being a subset of a second coverage of the other of the first beam and the second beam, a first relationship between beam angles of the first beam and the second beam, a second relationship between widths of the first beam and the second beam, or a combination thereof.

6. The NE of claim 1, wherein the at least one processor is configured to cause the NE to:
  receive control signaling indicating a channel access configuration comprising an indication that the second entity is allowed to transmit the second plurality of signals without sensing the shared medium.

7. The NE of claim 1, wherein the at least one processor is configured to cause the NE to:

determine whether the second entity is allowed to transmit the second plurality of signals based at least in part on a first quality of service ("QoS") requirement associated with the first plurality of signals, a second QoS requirement associated with the second plurality of signals, or both.

8. The NE of claim 1, wherein the at least one processor is configured to cause the NE to:
  receive signaling indicating at least one of the first duration, the second duration, a sum of the first duration and the second duration, a maximum of the first duration, a maximum of the second duration, or a maximum of the sum of the first duration and the second duration,
  wherein the signaling comprises a radio resource control ("RRC") message, a physical ("PHY") layer signaling, a medium access control ("MAC") signaling, or a combination thereof.

9. The NE of claim 1, wherein the at least one processor is configured to cause the NE to:
  multiplex the first plurality of signals and the second plurality of signals according to a time-division multiplexing ("TDM") scheme.

10. The NE of claim 1, wherein the first plurality of signals and the second plurality of signals overlap in a time domain according to a frequency-division multiplexing ("FDM") scheme, a spatial-division multiple ("SDM") scheme, or a combination thereof.

11. The NE of claim 1, wherein to:
  sense the shared medium is based on a first energy detection threshold in response to that the second entity is not allowed to transmit the second plurality of signals without sensing the shared medium; and
  sense the shared medium is based on a second energy detection threshold in response to that the second entity is allowed to transmit a second plurality of signals without sensing the medium, and wherein the second energy detection threshold is different from the first energy detection threshold.

12. The NE of claim 1, wherein:
  the NE is a wireless integrated access and backhaul ("IAB") node;
  the first entity is at least one of an IAB-distributed unit ("DU") or an IAB-mobile terminal ("MT"); and
  the second entity is at least one of the IAB-MT or the IAB-DU.

13. A method performed by a network equipment ("NE"), comprising:
  sensing, using a first entity of a wireless node, a shared medium;
  transmitting, using the first entity, a first plurality of signals for a first duration and over the shared medium in response to the shared medium being in an idle state; and
  transmitting, using a second entity of the NE that is collocated with the first entity, a second plurality of signals for a second duration and over the shared medium without sensing the shared medium.

14. The method of claim 13, further comprising determining that the second entity is allowed to transmit the second plurality of signals without sensing the shared medium based at least in part on that the first duration is less than a threshold, or a sum of the first duration and the second duration is less than or equal to the threshold, or both.

15. The method of claim 14, further comprising determining that the second entity is allowed to transmit the second plurality of signals without sensing the shared medium based at least in part on that the first duration is less than a first threshold, or a sum of the first duration and the second duration is less than a second threshold, wherein the second threshold is different from the first threshold.

16. The method of claim 13, further comprising determining that the second entity is allowed to transmit the second plurality of signals without sensing the shared medium based at least in part on a first spatial parameter associated with transmission of the first plurality of signals being identical to a second spatial parameter associated with transmission of the second plurality of signals.

17. The method of claim 13, further comprising determining that the second entity is allowed to transmit the second plurality of signals without sensing the shared medium based at least in part on an angular relationship between a first beam associated with transmission of the first plurality of signals and a second beam associated with transmission of the second plurality of signals, the angular relationship comprising the first beam overlapping with the second beam, a first coverage of one of the first beam and the second beam being a subset of a second coverage of the other of the first beam and the second beam, a first relationship between beam angles of the first beam and the second beam, a second relationship between widths of the first beam and the second beam, or a combination thereof.

18. The method of claim 13, further comprising receiving control signaling indicating a channel access configuration comprising an indication that the second entity is allowed to transmit the second plurality of signals without sensing the shared medium.

19. A wireless network node comprising:

at least one memory; and at least one processor coupled with the at least one memory and, configured to cause the wireless network node to:

sense a shared medium using one of an integrated access and backhaul distributed unit ("IAB-DU") or an IAB-mobile terminal ("MT"), wherein the IAB-DU and the IAB-MT are collocated within the wireless network node and cooperate for channel access;

transmit, using the IAB-DU or the IAB-MT, a first plurality of signals for a first duration and over the shared medium in response to the shared medium being in an idle state; and transmit, based at least in part on the other of the IAB-DU or the IAB-MT being allowed to use the shared medium without sensing the shared medium, a second plurality of signals for a second duration and over the shared medium using the other of the one of the IAB-DU and the IAB-MT.

20. A method performed by a wireless network node, comprising:

sensing a shared medium using one of an integrated access and backhaul distributed unit ("IAB-DU") and or an IAB-mobile terminal ("MT"), wherein the IAB-DU and the IAB-MT are collocated within the wireless network node and cooperate for channel access;

transmitting, using the IAB-DU or the IAB-MT, a first plurality of signals for a first duration and over the shared medium in response to the shared medium being in an idle state; and transmitting, based at least in part on the other of the IAB-DU or the IAB-MT being allowed to use the shared medium without sensing the shared medium, a second plurality of signals for a second duration and over the shared medium using the other of the one of the IAB-DU and the IAB-MT.

\* \* \* \* \*